RANDOM ACCESS-DATA EDITING COMMUNICATION NETWORK

Filed Aug. 25, 1967 65 Sheets-Sheet 1

INVENTOR.
ALLEN B.J. CUCCIO
BY
Warren F.B. Lindsley
ATTORNEY

CHARACTER AND COMMAND CODES

| BIT NUMBER | | | $B_7$ | 0 | 0 | 0 | 0 | 1 | 1 | 1 | 1 |
|---|---|---|---|---|---|---|---|---|---|---|---|
| | | | $B_6$ | 0 | 0 | 1 | 1 | 0 | 0 | 1 | 1 |
| | | | $B_5$ | 0 | 1 | 0 | 1 | 0 | 1 | 0 | 1 |
| $B_4$ | $B_3$ | $B_2$ | $B_1$ | COMMANDS | | CHARACTERS | | | | NO MEANING | |
| 0 | 0 | 0 | 0 | NULL | | SP | 0 | | P | | |
| 0 | 0 | 0 | 1 | | RLF | ! | 1 | A | Q | | |
| 0 | 0 | 1 | 0 | STX | FS | " | 2 | B | R | | |
| 0 | 0 | 1 | 1 | ETX | | # | 3 | C | S | | |
| 0 | 1 | 0 | 0 | | PR | \$ | 4 | D | T | | |
| 0 | 1 | 0 | 1 | ENQ | | % | 5 | E | U | | |
| 0 | 1 | 1 | 0 | | | & | 6 | F | V | | |
| 0 | 1 | 1 | 1 | | | ' | 7 | G | W | | |
| 1 | 0 | 0 | 0 | BS | | ( | 8 | H | X | | |
| 1 | 0 | 0 | 1 | | | ) | 9 | I | Y | | |
| 1 | 0 | 1 | 0 | LF | | * | : | J | Z | | |
| 1 | 0 | 1 | 1 | | | + | ; | K | \| | | |
| 1 | 1 | 0 | 0 | FF | | , | < | L | — | | |
| 1 | 1 | 0 | 1 | CR | | − | = | M | \| | | |
| 1 | 1 | 1 | 0 | | | . | > | N | blk | | |
| 1 | 1 | 1 | 1 | | | / | ? | O | ┌ | | |

FIG. 2.

COMMAND FUNCTIONS

| COMMAND | FUNCTIONAL GROUP |
|---|---|
| STX<br>ETX<br>TX<br>ENQ | TRANSMIT CONTROL |
| FS<br>BS<br>LF<br>RLF<br>PR<br>CR<br>TAB | MARKER MOVEMENT |
| FF | CLEAR AND RESET |

FIG. 3.

TRUTH TABLE FOR FLIP-FLOP MODULE

| OUTPUT STATE (PRIOR TO TOGGLE INPUT) | | | INPUTS | | OUTPUT STATE (SUBSEQUENT TO TOGGLE) | | |
|---|---|---|---|---|---|---|---|
| LEVELS "1" | LEVELS "0" | STATE | S | C | LEVELS "1" | LEVELS "0" | STATE |
| L | H | SET | H | H | L | H | SET |
| | | | L | H | L | H | SET |
| | | | H | L | H | L | RESET |
| | | | L | L | H | L | RESET |
| H | L | RESET | H | H | H | L | RESET |
| | | | L | H | L | H | SET |
| | | | H | L | H | L | RESET |
| | | | L | L | L | H | SET |
| ANY STATE, IF UNCONDITIONAL-SET INPUT HIGH | | | | | L | H | SET |

BUFFER MODULE SCHEMATIC DIAGRAM

MASTER CLOCK GENERATOR-FUNCTIONAL BLOCK DIAGRAM

March 10, 1970 A. B. J. CUCCIO 3,500,335

RANDOM ACCESS-DATA EDITING COMMUNICATION NETWORK

Filed Aug. 25, 1967

65 Sheets-Sheet 11

MEMORY PARTITIONING DIAGRAM

| MEMORY ROW NUMBER | MEMORY ROW ADDRESS IN BINARY | | | | | S8 | | S4 | | S2 | | S1 | |
|---|---|---|---|---|---|---|---|---|---|---|---|---|---|
| | AR11 | AR10 | AR09 | AR08 | AR07 | DISPLAY ROW NUMBER | DISPLAY TERM. NUMBER | DISPLAY ROW NUMBER | DISPLAY TERM. NUMBER | DISPLAY ROW NUMBER | DISPLAY TERM. NUMBER | DISPLAY ROW NUMBER | DISPLAY TERM. NUMBER |
| 1 | 0 | 0 | 0 | 0 | 0 | *1 | DT1 | *1 | DT1 | *1 | DT1 | *1 | DT1 |
| 2 | 0 | 0 | 0 | 0 | 1 | 2 | | 2 | | 2 | | 2 | |
| 3 | 0 | 0 | 0 | 1 | 0 | 3 | | 3 | | 3 | | 3 | |
| 4 | 0 | 0 | 0 | 1 | 1 | 4 | | 4 | | 4 | | 4 | |
| 5 | 0 | 0 | 1 | 0 | 0 | *1 | DT2 | 5 | | 5 | | 5 | |
| 6 | 0 | 0 | 1 | 0 | 1 | 2 | | 6 | | 6 | | 6 | |
| 7 | 0 | 0 | 1 | 1 | 0 | 3 | | 7 | | 7 | | 7 | |
| 8 | 0 | 0 | 1 | 1 | 1 | 4 | | 8 | | 8 | | 8 | |
| 9 | 0 | 1 | 0 | 0 | 0 | *1 | DT3 | *1 | DT2 | 9 | | 9 | |
| 10 | 0 | 1 | 0 | 0 | 1 | 2 | | 2 | | 10 | | 10 | |
| 11 | 0 | 1 | 0 | 1 | 0 | 3 | | 3 | | 11 | | 11 | |
| 12 | 0 | 1 | 0 | 1 | 1 | 4 | | 4 | | 12 | | 12 | |
| 13 | 0 | 1 | 1 | 0 | 0 | *1 | DT4 | 5 | | 13 | | 13 | |
| 14 | 0 | 1 | 1 | 0 | 1 | 2 | | 6 | | 14 | | 14 | |
| 15 | 0 | 1 | 1 | 1 | 0 | 3 | | 7 | | 15 | | 15 | |
| 16 | 0 | 1 | 1 | 1 | 1 | 4 | | 8 | | 16 | | 16 | |
| 17 | 1 | 0 | 0 | 0 | 0 | *1 | DT5 | *1 | DT3 | *1 | DT2 | 17 | |
| 18 | 1 | 0 | 0 | 0 | 1 | 2 | | 2 | | 2 | | 18 | |
| 19 | 1 | 0 | 0 | 1 | 0 | 3 | | 3 | | 3 | | 19 | |
| 20 | 1 | 0 | 0 | 1 | 1 | 4 | | 4 | | 4 | | 20 | |
| 21 | 1 | 0 | 1 | 0 | 0 | *1 | DT6 | 5 | | 5 | | 21 | |
| 22 | 1 | 0 | 1 | 0 | 1 | 2 | | 6 | | 6 | | 22 | |
| 23 | 1 | 0 | 1 | 1 | 0 | 3 | | 7 | | 7 | | 23 | |
| 24 | 1 | 0 | 1 | 1 | 1 | 4 | | 8 | | 8 | | 24 | |
| 25 | 1 | 1 | 0 | 0 | 0 | *1 | DT7 | *1 | DT4 | 9 | | 25 | |
| 26 | 1 | 1 | 0 | 0 | 1 | 2 | | 2 | | 10 | | 26 | |
| 27 | 1 | 1 | 0 | 1 | 0 | 3 | | 3 | | 11 | | | |
| 28 | 1 | 1 | 0 | 1 | 1 | 4 | | 4 | | 12 | | | |
| 29 | 1 | 1 | 1 | 0 | 0 | *1 | DT8 | 5 | | 13 | | | |
| 30 | 1 | 1 | 1 | 0 | 1 | 2 | | 6 | | 14 | | | |
| 31 | 1 | 1 | 1 | 1 | 0 | 3 | | 7 | | 15 | | | |
| 32 | 1 | 1 | 1 | 1 | 1 | 4 | | 8 | | 16 | | | |
| 33 | NOT USED | | | | | | | | | | | | |

FIG. 10a

March 10, 1970 A. B. J. CUCCIO 3,500,335

RANDOM ACCESS-DATA EDITING COMMUNICATION NETWORK

Filed Aug. 25, 1967 65 Sheets-Sheet 13

CHARACTER FORMAT

VIDEO CHARACTER GENERATION

VIDEO CHARACTER REPERTOIRE

March 10, 1970 A. B. J. CUCCIO 3,500,335

RANDOM ACCESS-DATA EDITING COMMUNICATION NETWORK

Filed Aug. 25, 1967 65 Sheets-Sheet 20

SFT EA PULSE COUNTING AND TIMING CHART

SHIFT PULSE DECODER 127

PORTION OF ADDER/SUBTRACTOR CONTROL 129

ENTRY ADDRESS PRESET LOGIC 132

| INPUTS | | | | OUTPUTS | |
|---|---|---|---|---|---|
| ADD=1 SUB=0 | T | EAI | C+B | S+D | $(C+B)^{N+1}$ |
| 1 | 0 | 0 | 0 | 0 | 0 |
| 1 | 0 | 0 | 1 | 1 | 0 |
| 1 | 0 | 1 | 0 | 1 | 0 |
| 1 | 0 | 1 | 1 | 0 | 1 |
| 1 | 1 | 0 | 0 | 1 | 0 |
| 1 | 1 | 0 | 1 | X | X |
| 1 | 1 | 1 | 0 | 0 | 1 |
| 1 | 1 | 1 | 1 | X | X |
| 0 | 0 | 0 | 0 | 0 | 0 |
| 0 | 0 | 0 | 1 | 1 | 1 |
| 0 | 0 | 1 | 0 | 1 | 0 |
| 0 | 0 | 1 | 1 | 0 | 0 |
| 0 | 1 | 0 | 0 | 1 | 1 |
| 0 | 1 | 0 | 1 | X | X |
| 0 | 1 | 1 | 0 | 0 | 0 |
| 0 | 1 | 1 | 1 | X | X |

*ADDER SUBTRACTOR TRUTH TABLE*

*ADDER SUBTRACTOR 128*

BUFFER AND SHIFT REGISTERS 222,224

March 10, 1970 A. B. J. CUCCIO 3,500,335

RANDOM ACCESS-DATA EDITING COMMUNICATION NETWORK

Filed Aug. 25, 1967 65 Sheets-Sheet 36

MAIN DELAY LINE TIMING

March 10, 1970 A. B. J. CUCCIO 3,500,335

RANDOM ACCESS-DATA EDITING COMMUNICATION NETWORK

Filed Aug. 25, 1967 65 Sheets-Sheet 39

HORIZONTAL SYNCHRONIZING GENERATOR 321

LINE COUNTER 320

ROW COUNTER 322 OUTPUT TABLE

| | BINARY WEIGHTS | | | | | | | |
|---|---|---|---|---|---|---|---|---|
| | →AR12 | →AR08 | →AR07 | →AR11 | →AR10 | →AR09 | | |
| STATE | 32 | 2 | 1 | 16 | 8 | 4 | BINARY VALUE | MEMORY ROW NUMBER |
| 1 | 0 | 0 | 0 | 0 | 0 | 0 | 0 | 1 |
| 2 | 0 | 0 | 1 | 1 | 1 | 1 | 29 | 30 |
| 3 | 0 | 0 | 1 | 1 | 1 | 0 | 25 | 26 |
| 4 | 0 | 0 | 1 | 1 | 0 | 1 | 21 | 22 |
| 5 | 0 | 0 | 1 | 1 | 0 | 0 | 17 | 18 |
| 6 | 0 | 0 | 1 | 0 | 1 | 1 | 13 | 14 |
| 7 | 0 | 0 | 1 | 0 | 1 | 0 | 9 | 10 |
| 8 | 0 | 0 | 1 | 0 | 0 | 1 | 5 | 6 |
| 9 | 0 | 0 | 1 | 0 | 0 | 0 | 1 | 2 |
| 10 | 0 | 1 | 0 | 1 | 1 | 1 | 30 | 31 |
| 11 | 0 | 1 | 0 | 1 | 1 | 0 | 26 | 27 |
| 12 | 0 | 1 | 0 | 1 | 0 | 1 | 22 | 23 |
| 13 | 0 | 1 | 0 | 1 | 0 | 0 | 18 | 19 |
| 14 | 0 | 1 | 0 | 0 | 1 | 1 | 14 | 15 |
| 15 | 0 | 1 | 0 | 0 | 1 | 0 | 10 | 11 |
| 16 | 0 | 1 | 0 | 0 | 0 | 1 | 6 | 7 |
| 17 | 0 | 1 | 0 | 0 | 0 | 0 | 2 | 3 |
| 18 | 0 | 1 | 1 | 1 | 1 | 1 | 31 | 32 |
| 19 | 0 | 1 | 1 | 1 | 1 | 0 | 27 | 28 |
| 20 | 0 | 1 | 1 | 1 | 0 | 1 | 23 | 24 |
| 21 | 0 | 1 | 1 | 1 | 0 | 0 | 19 | 20 |
| 22 | 0 | 1 | 1 | 0 | 1 | 1 | 15 | 16 |
| 23 | 0 | 1 | 1 | 0 | 1 | 0 | 11 | 12 |
| 24 | 0 | 1 | 1 | 0 | 0 | 1 | 7 | 8 |
| 25 | 0 | 1 | 1 | 0 | 0 | 0 | 3 | 4 |
| 26 | 1 | 0 | 0 | 0 | 0 | 0 | 32 | 33 |
| 27 | 0 | 0 | 0 | 1 | 1 | 1 | 28 | 29 |
| 28 | 0 | 0 | 0 | 1 | 1 | 0 | 24 | 25 |
| 29 | 0 | 0 | 0 | 1 | 0 | 1 | 20 | 21 |
| 30 | 0 | 0 | 0 | 1 | 0 | 0 | 16 | 17 |
| 31 | 0 | 0 | 0 | 0 | 1 | 1 | 12 | 13 |
| 32 | 0 | 0 | 0 | 0 | 1 | 0 | 8 | 9 |
| 33 | 0 | 0 | 0 | 0 | 0 | 1 | 4 | 5 |
| 1 | 0 | 0 | 0 | 0 | 0 | 0 | 0 | 1 |

FIG. 42.

| MEMORY ROW | DISPLAY ROW | V. S. NO. | TERMINAL NUMBER | | | |
|---|---|---|---|---|---|---|
| | | | 1 DT | 2 DT | 4 DT | 8 DT |
| 13 | 17 | V.S.8 | | | 1 | 1 |
| 17 | 21 | V.S. 1 | | | | 2 |
| 21 | 25 | V.S. 2 | | 1 | 2 | 3 |
| 25 | 29 | V.S. 3 | 1 | | | 4 |
| 29 | 33 | V.S.4 | | | 3 | 5 |
| 1 | 5 | V.S.5 | | | | 6 |
| 5 | 9 | V.S.6 | | 2 | 4 | 7 |
| 9 | 11 | V.S.7 | | | | 8 |

VERTICAL SYNC. TABLE

PART OF VERTICAL SYNC. GENERATOR 324

VIDEO DISTRIBUTION TIMING DIAGRAM

FIELD AND BLINK COUNTERS 325,326

CHARACTER GENERATOR 34

PORTION OF LINE DECODER 403

PORTION OF VERTICAL WORD GENERATOR 404

PORTION OF CHARACTER DECODER 402

RANDOM ACCESS-DATA EDITING COMMUNICATION NETWORK

Filed Aug. 25, 1967

VIDEO REGISTER 422

BLINK, BLANK CONTROL 407

COLOR CONTROL 408

ENTRY MARKER INTENSITY AND UNDERLINE CONTROL 409

VIDEO AMPLIFIER AND MIXER

PAGE PRINT CONTROLLER INPUT BUFFER 478

United States Patent Office

3,500,335
Patented Mar. 10, 1970

3,500,335

RANDOM ACCESS-DATA EDITING COMMUNICATION NETWORK

Allen B. J. Cuccio, Oklahoma City, Okla., assignor to General Electric Company, a corporation of New York

Filed Aug. 25, 1967, Ser. No. 663,410
Int. Cl. G11b *13/00;* G08d *23/00;* G06f *1/00*
U.S. Cl. 340—172.5 19 Claims

ABSTRACT OF THE DISCLOSURE

A network system utilizing a data processor and a plurality of remotely located visual display terminals for random access and data editing display of coded information.

TABLE OF CONTENTS

| | Column |
|---|---|
| (I) ABSTRACT OF THE DISCLOSURE | 1 |
| (II) BACKGROUND OF THE INVENTION | 2 |
| (1) Field of the Invention | 2 |
| (2) Description of the Prior Art | 2 |
| (III) SUMMARY OF THE INVENTION | 2 |
| (IV) BRIEF DESCRIPTION OF THE DRAWINGS | 3 |
| (V) GLOSSARY AND INDEX OF SIGNALS | 6 |
| (VI) SYSTEM DESCRIPTION OF PREFERRED EMBODIMENT | 9 |
| (1) Data Communication Line Operation | 10 |
| (a) Line direction control | 10 |
| (b) Data transmit sequence | 11 |
| (c) Data receive sequence | 11 |
| (d) Transmission of 5, 6, 7 and 8 level codes | 11 |
| (e) Checking parity | 11 |
| (2) Display Terminal Arrangement | 11 |
| (3) Modified Display Terminal Arrangement | 12 |
| (4) Display Controller | 13 |
| (5) Display Monitor | 14 |
| (6) Keyboard Unit | 14 |
| (7) Logic Components | 14 |
| (a) AND gate modules | 14 |
| (b) OR-gate modules | 14 |
| (c) Flip-flop modules | 15 |
| (d) Inverter (buffer module) | 15 |
| (8) Master Clock and Timing Circuits | 15 |
| (9) Character Display | 17 |
| (a) Character generator | 18 |
| (b) Character composition | 18 |
| (10) Page Print Controller | 21 |
| (VII) DETAILED FUNCTIONAL ANALYSIS | 21 |
| (1) Keyboard Input Multiplexer | 22 |
| (a) Keyboard input register | 23 |
| (b) Keyboard memory register | 23 |
| (c) Keyboard input gates | 24 |
| (d) Memory read gates | 24 |
| (e) Keyboard memory write control | 24 |
| (f) Command decoder | 25 |
| (g) Entry address control | 25 |
| (g. 1) Entry address selector | 26 |
| (g. 2) 4 stage counter | 27 |
| (g. 3) Shift pulse decoder | 28 |
| (g. 4) Adder/subtracter control | 28 |
| (g. 5) Entry address preset logic | 28 |
| (g. 6) Automatic CR, LF, PR generator | 29 |
| (g. 7) Entry address entry register | 30 |
| (g. 8) Adder/subtracter | 30 |
| (h) Entry address register | 31 |
| (i) Comparator | 31 |
| (2) Keyboard Logic | 31 |
| (a) Keyboard switches and encoder | 33 |
| (b) Keyboard control logic | 34 |
| (c) Buffer and shift registers | 36 |
| (3) Communication Data Line Interface | 36 |
| (a) Receive mode | 37 |
| (b) Transmit mode | 38 |
| (4) Main Memory | 39 |
| (a) Memory input gates | 40 |
| (b) Memory output gates | 41 |
| (c) Memory data organization | 41 |
| (5) Display Timing Logic | 43 |
| (a) Character counter | 44 |
| (b) Horizontal synchronizing generator | 44 |
| (c) Line counter | 45 |
| (d) Row counter | 45 |
| (e) Vertical synchronizing generator | 45 |
| (f) Field counter | 47 |
| (g) Blink counter | 47 |
| (h) Display terminal and TMU gating logic | 48 |
| (6) Buffer Memory | 49 |
| (a) Buffer memory input/output circuits | 49 |
| (7) Character Generator | 50 |
| (a) Line decoder | 51 |
| (b) Vertical word generator | 51 |
| (c) Character decoder | 51 |
| (d) Word selector | 51 |

TABLE OF CONTENTS—Continued

| | Column |
|---|---|
| (8) Video Distributor | 52 |
| (a) Video mixing and gating logic | 53 |
| (b) CTS generator | 54 |
| (c) Video register | 55 |
| (d) Blink/blank control | 55 |
| (e) Color control | 56 |
| (f) Entry marker intensity and underline control | 56 |
| (g) Video output drivers | 57 |
| (9) Page Print Controller | 57 |
| (a) Page print controller input buffer | 59 |
| (b) Output buffer | 59 |
| (c) Page print controller timing logic | 59 |
| (d) Page print controller control logic | 60 |

BACKGROUND OF THE INVENTION

This invention relates to a system for converting coded information having a binary or digital form into an intelligible visual display on one or more television monitors, and more particularly to an improved network system for random accessing, editing and displaying of character or symbolic data and images on one or more television monitors or other visual raster display devices.

Field of the invention

The invention is particularly directed to an integrated display network system arranged for information retrieval and data editing functions. The system is capable of generating an alphanumeric display on one or more standard television monitors with its symbol repertoire including alphabetics, numerics, punctuation marks and special symbols which aid in the presentation of bar charts, business tables, block diagrams, and textual data.

The system disclosed employs a common display controller and a plurality of remotely located visual display terminals. The display terminals are arranged to communicate with a processing system via a communication network.

Description of the prior art

One of the significant contributions of this invention is the digital to television raster scan conversion feature utilized to minimize memory capacity requirements of the system. This minimizes the complexity, size and cost of the associated digital display equipment and makes it possible to use standard, mass-produced, low cost television monitors rather than other display systems using shaped beam tubes, random position displays, etc.

At present, digital to television raster scan conversion systems require very large capacity storage mediums which store each picture element appearing on the television display. In a typical prior art digital to raster scan conversion system, a high capacity magnetic drum is utilized for storing over two million bits of information. The present invention minimizes such memory requirements by eliminating the need for storing every picture element of the display and requires only the capability of storing several thousand bits of information.

SUMMARY OF THE INVENTION

In accordance with the invention claimed, a new and improved system is provided for displaying and editing data on a network of television monitors. This system may comprise a man-computer oriented communication system which is adapted to receive information from a plurality of data entry and retrieval stations. These stations may be dispersed over any geographic area and interconnected by means of communication networks to an on-line data processing system. Input messages may be composed, verified, corrected, if necessary, and transmitted automatically via communication networks to the data processing system. Instantaneous responses are presented in alphanumeric form on one or more display monitors. The data received from the various sources is stored in digital character form and converted into television video signals when needed. The conversion process utilizes buffer memory logic for extracting signals representing one line or row of characters from storage for display on the television monitor. The buffer memory logic retains the signals representing a row of characters during the time a television beam is scanning through that row of text on the display. While the buffer memory logic retains the signals, it presents them to a character generator in a cyclic manner which converts these signals into video words of information. These video words are then combined into a television-like video signal along with horizontal and vertical synchronizing signals and transmitted to the display devices.

It is therefore one object of this invention to provide an improved multi-terminal system for converting coded data into intelligible visual displays.

Another object of this invention is to provide an improved system for multiplexing digital data from multiple keyboard-like sources into a memory of a computer system.

A further object of this invention is to provide an improved multi-terminal data editing display system employing a display controller arranged so that keyboard operators of display terminals may communicate over a telephone network with a time-sharing computer system.

A still further object of this invention is to provide a means for driving multiple displays, each with a different presentation, from a central memory arrangement while maintaining separate keyboards as a source of data to each presentation.

A still further object of this invention is to provide an improved means of interfacing a central memory arrangement with a data communication line while still maintaining different presentations on a plurality of visual display devices.

A still further object of this invention is to provide an improved multi-terminal display system for accepting and storing digitally coded data received from a plurality of external sources.

A still further object of this invention is to provide an improved means for manipulating stored information with new information received from a plurality of external sources.

A still further object of this invention is to provide a digital-to-raster scan converter that utilizes low cost delay lines storage means.

Further objects and advantages of the present invention will become apparent to those skilled in the art as the description thereof proceeds.

BRIEF DESCRIPTION OF THE DRAWINGS

The present invention may be more readily described by reference to the accompanying drawings in which:

FIG. 1*a* is a modification of the block diagram of the data editing display system illustrated in FIG. 1;

FIG. 2 is a chart of the data character and command codes used in the data editing display systems of FIGS. 1 and 1*a*;

FIG. 3 is a chart of various commands used in the data editing display systems of FIGS. 1, 1*a*, and 1*c*;

FIG. 10*a* illustrates in diagram form the partitioning of memory;

FIG. 42 is a timing chart for the row counter shown in FIG. 37;

GLOSSARY AND INDEX OF SIGNALS

Figure 1:
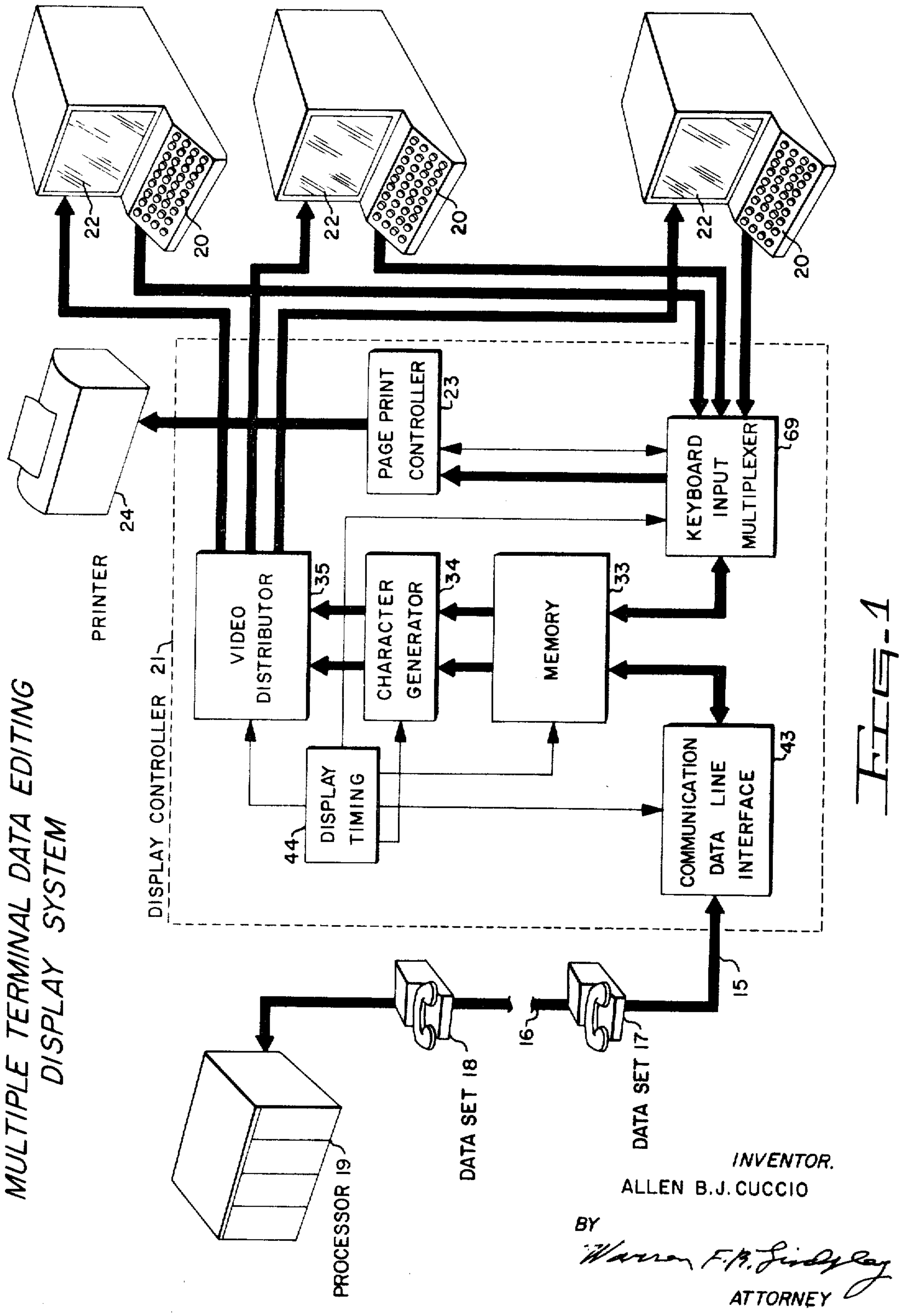
FIG. 1 is a simplified block diagram of a multiple terminal data editing display system and embodying the invention.

In order to more readily understand the disclosed invention, the symbols and signals provided by the various system circuit elements appearing in the drawings are tabulated below.

Figure 48:
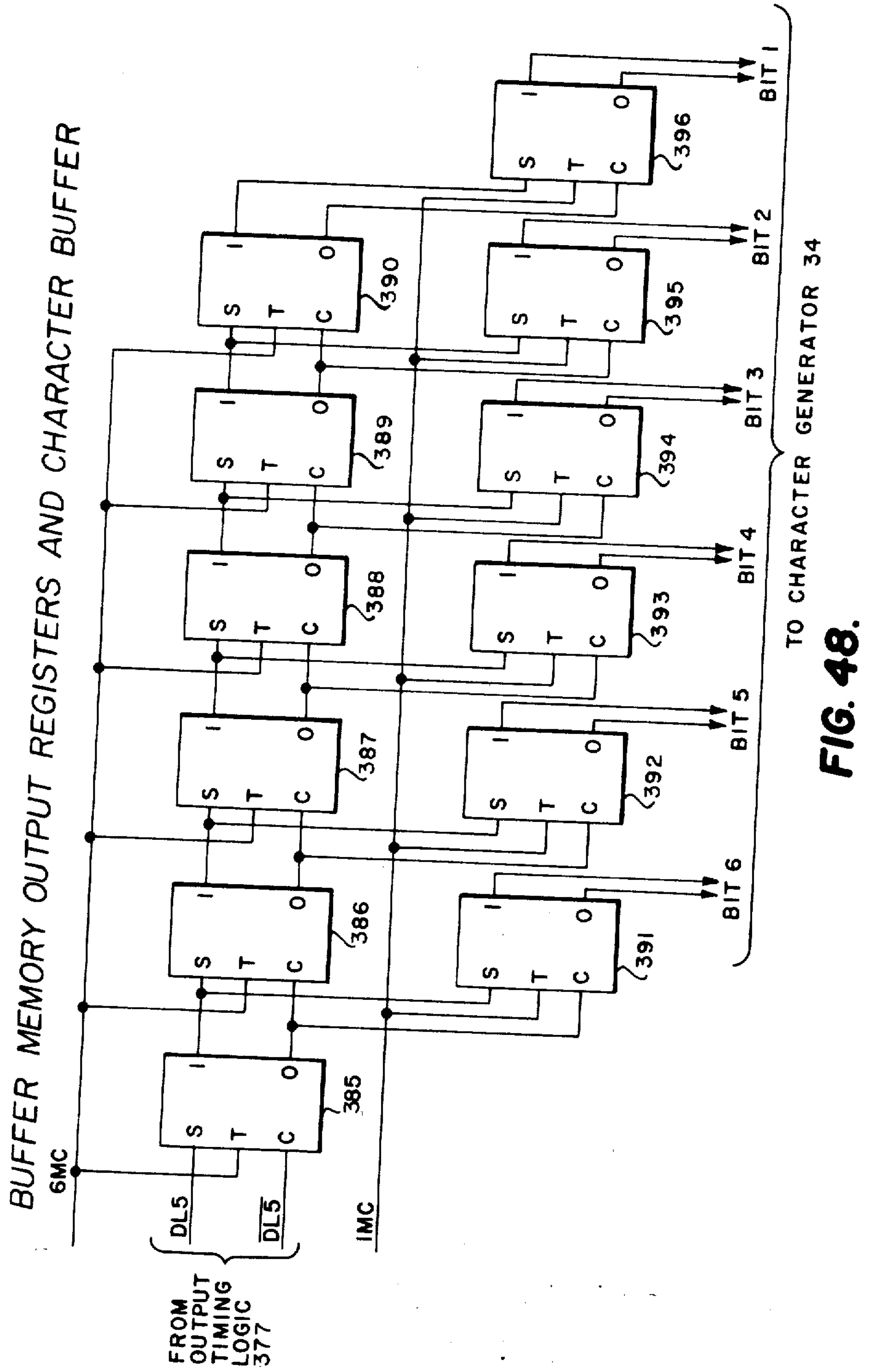
FIG. 48 illustrates in more detail the buffer memory output register and character buffer shown in FIG. 46.

| Symbols | Description of symbols |
|---|---|
| A, B, C and D | Output signals of the 4 stage counter 126. |
| ADD | Control signal generated by adder/subtracter control 129 to adder/subtracter 128 causing it to operate in the "add" mode. |
| AR01 through AR06 | Output signals of the character counter 193 which designate the six least significant bits of the memory address count used by the various comparators in the system. |
| AR07 through AR12 | Outputs of the row counter 322 which designate the six most significant bits of the memory address count used by the various comparators of the system. |
| BIT 1 through BIT 6 (Fig. 48) | Output signals from buffer memory output registers 379. |
| BIT 1 through BIT 7 (Fig. 31*a*). | Coded output signals from encoder 221. |
| BIT 1 through BIT 12 (Fig. 57). | Output signals of character generator 34. |
| BLANK | Signal generated by the character generator 34 indicating start blank. |
| BLANK START/STOP | Control signals generated by the character decoder 402 used to control the blanking of characters on the display. |
| BLINK (Fig. 62) | Signal generated by input buffer 478 of page print controller 23 to indicate a Carriage Return or Form Feed code is to be generated and transmitted to the printer 24. |
| BLINK/BLANK | Combination of blink signal and blank signal from blink/blank control 407. |
| BLINK CONTROL | Output signal from blink counter 237. |
| BLINK START/STOP | Control signals generated by the character decoder 402 used to control the blinking of characters on display. |
| BLOCK OLD EA | The signal generated by the automatic CR, LF, PR generator 131 which blocks the old entry address value from being read back to main memory units 71–71'''. |
| BP2 | Timing signal occurring at the time of a particular bit of a character. |
| BS | Back Space signal. Entry marker on display is to be moved to the left one character space. |
| B1 through B6 (Fig. 63) | Outputs of the input buffer 478. |
| CARRIER | Tone used in the process of data transmission on a communication line. |
| CC0 through CC63 | Character Count signals. Timing signals used to control various operations in the logic which must happen at a particular character count. |
| CLEAR | Signal generated by the character load control 223 of the keyboard logic which resets the buffer register 222. |
| CLEAR-TO-SEND | Signal generated by Data Set indicating the Data Set is ready to receive new data. |
| CMD STROBE | Timing signal used for transferring the data contained in the keyboard input registers 74 to the KB memory register 76. |
| COLOR START/STOP | Control signals generated by the character decoder 402 used to control colors of characters on the display. |
| COMM. DATA | Data transmitted by the communication data line interface 43 to the main memory units 71–71'''. |
| COMM. WRITE | Write Control signal for writing of Comm. Data to memory. |
| $\overline{\text{COMMAND}}$ | Signal generated by the control logic 480 of page print controller 23 indicating that a command is to be transmitted to the printer 24. |
| COMMAND CODE | Signal which indicates a control function is to be performed, such as entry marker movement. |

| Symbols | Description of symbols |
|---|---|
| COMPOSITE VIDEO AND SYNC. | Signal output from CTS inhibit logic 232 which contains video intensity and horizontal and vertical synchronization information without the Clear-to-Send signal. |
| COMPOSITE VIDEO/SYNC AND CTS. | Signal transmitted from the display controller 21 to the keyboard logic composed of a video intensity signal, synchronizing pulses and Clear-to-Send signal. |
| CP | Timing signal generated by the timing logic 481 to the control logic 480. |
| CR (Fig. 3) | Carriage Return signal. Entry marker is to be returned to the first character position of the line on the display. |
| CR (Fig. 62) | Control signal generated by the control logic 480 indicating that a Carriage Return code is to be transmitted to the printer 24. |
| CTS | Clear-to-Send signal. |
| CTS ENABLE | Control signal used for monitoring the presence of the Clear-to-Send signal |
| CTS PULSE | Clear-to-Send signal used to trigger the CTS generator 424. |
| CTS 1 through CTS 8 | Clear-to-Send signals generated by the CTS generator 424. |
| C+B | Carry or Borrow output of adder/subtracter 128. |
| C1 through C54 | Coupling capacitors of keyboard logic. |
| DATA PRES. (Fig. 17a) | Data Present signal indicating that data exists in the keyboard input register 74 that is to be stored into main memory units 71–71'''. |
| DATA PRESENT | Signal output from buffer register 222 indicating that data is stored in the buffer register. |
| DATA TERMINAL READY. | Signal generated by the communication data line interface 43 indicating that the multiple terminal data editing display system is ready to transmit and receive. |
| DL1, DL2, DL3, DL4 | Data signals into and out of the delay lines 292 through 292'''. |
| DL1-DL4 | Output of main memory units 71–71'''. |
| $\overline{DL1-DL4}$ | One's complement of signals DL1-DL4. |
| DL5 | Output signal of output timing logic 377 of buffer memory 72. |
| DT ADDR | Display Terminal Address. |
| DT1 through DT8 | Timing signals generated by the display terminal and TMU gating logic. |
| EA | Refers to Entry Address value. |
| EA1 through EA12 | Output signals of entry address register 81. |
| $\overline{EA1}$ through $\overline{EA12}$ | One's complement of EA1 through EA12 output signals. |
| EAM1 through EAM6 | Output signals of the entry address entry register 133. |
| EA COMP | Entry Address Compare signal generated by comparator 79 which indicates that a WRITE signal for storing data to memory is to be generated. |
| ENQ | Transmission Inquiry Request signal. |
| ENTRY ADDRESS | Binary address value stored in memory used to refer to the location of the entry marker on the display or the location in memory to be written in next. |
| ENTRY ADDRESS PRESENT. | Indicates that the entry address value is now present at the output of the memory. |
| ENTRY MARKER INTENSITY. | Entry Marker Control signal generated by a main memory comparator 291 used in the display of the entry marker symbol. |
| ERASE EA | Signal generated by the automatic CR, LF, PR generator 131 which erases the entry address value from memory activated by the FF and PR commands. |
| ETX | End of Text data in a message on the communication line. |
| FF (Fig. 3) | Form Feed signal. Causes the entire display to be erased and the entry marker to be moved to the first character position of the top line of the display. |
| FF (Fig. 62) | Control signal generated in the control logic 480 to the output buffer 479 indicating that a Form Feed code is to be transmitted to the printer 24. |
| FIELD 1, FIELD 2 | Output signals of field counter 325. |
| FS | Forward Space signal. Entry marker on display is to be moved to the right one character space. |
| HORIZONTAL SYNC | Horizontal Deflection Control signal for TV monitor synchronization. |
| INHIBIT TRANSFER | Signal generated by the transmit control logic 230 used to indicate to the character load control 223 that the shift register 224 already contains data and cannot be reloaded. |
| K | Timing signal generated by timing logic 481 in the page print controller 23. |
| KB DATA | Keyboard Data output of keyboard memory write controls 77. |

| Symbols | Description of symbols |
|---|---|
| KB WRITE | Output of keyboard memory write controls 77 which controls the writing of a data character into main memory units 71–71'''. |
| KB1 through KB7 | Output signals of keyboard input register 74. |
| KBG1 through KBG8 | Timing signals generated by CTS generator used in selection of keyboard data inputs to the keyboard input gates 73. |
| KEYBOARD DATA | Refers to character coded data generated in a keyboard in general. |
| KEYBOARD #1 DATA, KEYBOARD #2 DATA, etc. | Refers to character coded data generated by corresponding keyboards. |
| KTS | Clear-to-Send signal generated by the printer 24. |
| LC01, LC02, LC03 | Output signals of line counter 320. |
| LF | Line Feed signal. Entry market is to be moved toward the bottom of the display one line. |
| LINE 4 through LINE 10 (Fig. 50). | Output signal of line decoder 403. |
| LINE 8 | Decoded output of line counter 320 which refers to a particular raster line time on the display. |
| M | Timing signal generated by the timing logic 481 to the control logic 480. |
| MAC | Memory Address Count contained in the row counter 322 and the character counter 193. |
| MEMORY ADDRESS | A binary value corresponding to memory locations in the delay line memory. |
| MEMORY DATA | Data output of memory read gates 116. |
| NULL | Signal used on the communication line to indicate no action is to take place. |
| PR | Page Return signal. Entry marker is to be returned to the first character position of the top line of the display. |
| PRESET | Control signal which occurs at initial power turn-on of system used to initialize the state of various counters in the system. |
| PRESET EA | Signal generated by the entry address preset logic 132 which continuously maintains the high order bits of the entry address value to confine the entry marker to a given area in memory. |
| PRESET VALUE | The entry address value generated by the entry address present logic 132. |
| RDC | Timing signal generated by page print controller control logic 480. |
| READ | Signal generated by control logic 480 of the page print controller 23 indicating the input buffer is to accept new data from the memory. |
| REC. DATA | Data received from the telephone communication line. |
| RECIRC. DATA | Data which recirculates from the output of a main memory unit 71 back to the input. |
| RED, GREEN, BLUE | Output signals of color control logic 408. |
| REQ. TO SEND | Request-to-Send data transmitted to Data Set. |
| RETURN | Signal generated by the character generator to stop blanking. |
| RETURN VALUE | Binary entry address value generated by the automatic CR, LF, PR generator 131 which returns the entry address value to a value corresponding to the initial address location on the page. |
| RLF | Reverse Line Feed. Entry marker is to be moved upward one line toward the top of the display. |
| ROW 1 through ROW 33 | Timing signals which refer to particular times when corresponding memory rows of data are available at the output of MMU's 70–71'''. |
| $\overline{SFT}$ | Control signal generated by the 4 stage counter 126 to the adder/subtracter control 129. |
| $\overline{SFTE}$ | Control signal generated by 4 stage counter 126 to the adder/subtracter control 129. |
| SFT EA | Timing signal used to shift the entry address register 81 generated by the 4 stage counter 126. |
| SHIFT PULSES (Fig. 31) | Signal generated by the transmit control logic 230 of the keyboard logic used to shift the shift register 224. |
| SIXTEEN SELECT LINES (Fig. 4a). | Output signals of line decoder 403. |
| SIXTY-FOUR SELECT LINES. | Output signal of character decoder 402. |
| SMFT MR | Timing signal generated by register shift control 78 used to shift the KB memory resister 76. |
| SP1 through SP7 | Output signals of shift pulse decoder 127. |
| START BLINK | Signal generated by character generator 34 indicating start blink. |
| START GREEN, START RED, START BLUE. | Character generator signals indicating a color change of the characters displayed. |

| Symbols | Description of symbols |
|---|---|
| SUB | Control signal generated by adder/subtracter control 129 to the adder/subtracter 128 causing it to operate in the "subtract" mode. |
| SYNC (Fig. 31) | The output signal from video stripper 228 which is a signal composed of the combination of horizontal and vertical synchronizing signals. |
| S+D | Sum or Difference output of adder/subtracter. |
| S1 of TMUA | Refers to S jumper or switch setting of terminal memory unit A. There are other S jumper or switch settings, S2, S4 and S8 associated with TMUA and corresponding S jumper or switch settings for each of the other TMU's, TMUB through TMUD. |
| S1 through S54 (Fig. 31a only) | Reference numbers for switches on keyboard. |
| S1, S2, S4, S8 | Jumper or switch settings which establish the memory partitioning. |
| T | Trigger pulse to adder/subtracter 128 which activates an add or subtract function. |
| TAB | Signal causes entry marker to move to the character position following the next vertical line displayed. |
| TERM1 DATA through TERM8 DATA. | Keyboard data originating in the corresponding terminal numbers. |
| TMU GATES | Timing signals generated by the display terminal and TMU gating logic. Usually shown in the figures as TMUA through TMUD. |
| TRANSFER (Fig. 31) | Signal generated by the character load control of the keyboard logic used to transfer data from the buffer register 222 to the shift register 224. |
| TRANSFER (Fig. 62) | Signal generated by the control logic 480 indicating a transfer from input buffer 478 to output buffer 479 is to take place. |
| TRANSMIT SIGNAL (Fig. 31). | Signal generated by the transmit control logic 230 of the keyboard logic used to indicate that data stored in the shift register 224 is to be transmitted to the display controller 21. |
| TX DATA | Data transmitted to the telephone communication line. |
| UNDERLINE START/STOP. | Control signals generated by character decoder 402 to control the start and stop of the underlining of characters on the display. |
| +V | Positive voltage indication. Used in the logic where a high level signal is always required. |
| $V_C$ | Voltage across capacitors. |
| VERTICAL SYNC | Vertical Deflection Control signal for TV monitor. |
| VIDEO and CTS (Fig. 31) | Output signal from video stripper 228 composed of video intensity and Clear-to-Send information. |
| VIDEO DATA | Signals generated by output register 406 of character generator 34. |
| $V_L$ | Voltage at output terminal of coupling capacitors. |
| $V_S$ | Potential and output signals of switches S1 through S54. |
| VS1 through VS8 | Vertical Sync signals generated by vertical sync generator 324. |
| VSP1, VSP2, VSP3 and VSP4 | Four-phase clock signals used for loading the video registers. |
| WRITE (Fig. 33b) | Represents COMM. WRITE or KB WRITE signals. |
| WRITE DATA | Accurately timed signal generated by keyboard write control which controls the writing of data to memory. |
| WRITE E.A | Accurately timed signal for writing the entry address value to memory. |
| 1MCA, 1MCB, 1MCC and 1MCD. | Four-phase, one megacycle clock signals. |
| 3MC STROBE 1, 3MC STROBE 2. | Narrow three megacycle clock signals used in critical timing areas of the logic. |
| $\overline{6MC}$, $\overline{3MC}$, $\overline{1.5MC}$, $\overline{1MC}$ | Inverted forms of six megacycles, three megacycles, 1.5 megacycles and one megacycle clock signals, respectively. |
| 12MC, 6MC, 4MC, 3MC, 1.5MC, 1MC. | Twelve, six, four, three, one and one and one-half and one megacycle clock signals, respectively. |

SYSTEM DESCRIPTION OF PREFERRED EMBODIMENT

The present invention relates to data communication systems and particularly to visual display terminal equipment for use at the ends of message networks or transmission links such as, for example, telephone lines interconnecting computers and data accumulation equipment. Since it is believed to be unnecessary to describe the well-known details of these systems to completely describe the invention, block diagrams will be used where possible. However, even though known details will be eliminated, a basic description of the entire system will be presented to enable one skilled in the art to understand the environment in which the present invention is placed.

Accordingly, reference is made to FIG. 1 which shows diagrammatically a data communication system employing data processing facilities. As used herein, data communication means the transmission of information to and from data processing equipment and includes assembly, sequencing, routing, and selection of such information as is generated at independent remote points of data origination, and the distribution of the processed information to remote output terminals or other data processing equipment. Various means of communication from one point to another exist today as part of our nation's common and private carrier wire lines, cables, cable carriers, radio and microwave facilities.

In order to minimize the complexity of explanation of this invention, certain simplifying assumptions are made. These simplifying assumptions are not to be construed as limitations of the invention. In particular, it will be observed that the data to be displayed in accordance with the invention may be obtained from any suitable source such as an electronic digital computer. Although the computer lends added flexibility to the system, in that data processing can be carried out while the display is being generated, the principles of the invention are equally applicable to the display of data from other sources. For example, the data to be displayed might optionally be obtained from a data storage device such as a magnetic tape or video tape recorder. Alternatively, the data might be received from a data transmission device such as a telephone line. It should be understood, therefore, that the scope of the invention extends beyond the environment illustrated herein for purposes of explanation and has broad application in the field of electronic display systems.

For simplification purposes, it is assumed in FIG. 1 that digital information in binary form is transmitted from one or a plurality of sources to the display system shown by means of electrical signals which have some characteristics such as frequency, duration or amplitude varied to indicate the information content. For example, binary information in serial format may be obtained from source 15 which is connected to a data communication system such as a telephone line 16 through a data set 17. The telephone line, in turn, may be connected through another data set 18 to a processor 19 or other data accumulation device. The data communication system is adapted to send and receive digital information signals without human intervention. Binary information may be obtained from a typewriter keyboard, paper tape, magnetic tape or other similar source 20.

Data communication line operation

The data communication system disclosed operates by automatically sending and receiving data. A controller unit, not shown, along with the data sets at the terminal end of the communication or telephone line 16 will automatically maintain line discipline and will prohibit the transmission of data from one terminal to another unless the line direction of the transmission line has been coordinated with the distant terminal. Thus, in a half-duplex transmission system, data can be transmitted in only one direction at a time.

Line direction control

Line direction control is a function of the controller unit coordinating the data sets. The data set at the transmitting end of the line puts a tone on the line under control of its controller unit. This tone indicates to the receiving controller unit at the other end of the line that the line is in use. When the transmitting terminal detects an End of Text (ETX) signal indicating the end of the data block of information has been reached, the transmitting tone disappears. The cessation of the tone indicates to the receiving terminal that it is now possible to transmit data. The receiving controller unit of the data set initiates a change in line direction if it so desires and may become a transmitting terminal. Thus, the line direction may be reversed after the completion of the transmission of a block of data in either direction.

Data transmit sequence

After the line direction has been established to transmit data from one of the terminals, each character is sequentially transmitted through the communication controller logic of the terminals' data set. As used herein, a character is a sequence of binary digits (bits) used to represent the digits 0–9, the letters A–Z, punctuation marks, operation symbols, and any other symbols which a computer may read, store or write. The data set changes the code of the character into tones for transmittal along the transmission line to the data set at the terminal. Transmission of the data characters is either synchronous or asynchronous and the start/stop bits in asynchronous operation of a character frame hereafter explained transmitted along the transmission line are supplied by the communication control logic of the transmitting terminal data set. For synchronous operation, a plurality of synchronous characters are added at the beginning of a message to maintain character synchronization.

Data receive sequence

The data receive seqence is basically the reverse of the data transmit sequence. Incoming data is changed by the receiving data set into a digital form acceptable to the multiple terminal data editing display system. Then the character may be shifted out in series or parallel to the data editing display system. The data receiving action continues until the transmitting terminal reaches the End of Text signal (ETX).

Transmission of 5, 6, 7 and 8 level codes

The data communication system as described herein transmits asynchronously seven intelligent bits in a sequence called a character frame. During synchronous transmission, eight bits are transmitted. Each character frame transmitted consists of one start bit, seven intelligent bits, parity bit and one or more stop bits. Transmission of a 5, 6 or 8 level code is accomplished in a similar manner by inserting in the character frame the proper number of bits in the character bit squence.

Checking parity

If a parity bit is utilized, a parity test is performed upon each incoming character to determine if a bit has been transmitted in the wrong state. The code as transmitted from the remote location will contain a Mark or a Space in the parity bit position, whichever is required to make the total number of Marks in the seven information bits meet a given standard.

Since the scope of this invention is not directed to the transmittal or receipt of any given character or code, this feature will not be described in detail. Reference is made to copending application, Ser. No. 457,018 (now U.S. Patent No. 3,430,204), filed May 19, 1965 by Richard E. Milford and entitled, "Data Communication System Employing Asynchronous Start Stop Clock Generator," assigned to the assignee of this application, for more detail of the data set and communication line transmission receive and transmit functions.

Display terminal arrangement

As shown in FIG. 1, the data communication processing facility comprises, in addition to the processor 19, a display controller 21 and a number of remotely located display terminals comprising the keyboard 20 as well as a display monitor 22. The display controller is capable of communicating with the processor 19 via the data sets 17 and 18. With the apparatus shown, up to thirty-two display terminals may be utilized.

The display controller provides basic modularity and the configuration can be modified to control one or more of the thirty-two display terminals. Each of the modules of the controller will be described in more detail later. An optional page print controller 23 and printer 24 can be used in applications requiring hard copies of the information displayed.

Modified display terminal arrangement

FIGURE 1*a* diagrammatically illustrates a modification of the display terminal arrangement shown in FIG. 1 wherein a supervisor display terminal 20, **22*a* is arranged to monitor and modify the information being displayed on one or more line display terminals 20, 22*b* and 20, 22*c***. This modification illustrates some of the advantages that are obtained by utilizing a communication network employing display terminals which are TV compatible.

TV camera 25 and video tape recorder 26 utilize a well-known video mixer 27 for mixing their recorded information with information transmitted by the display controller 21. In this embodiment, the operator of a supervisor display terminal 20, **22*a* can see the information of the TV camera 25, video tape recorder 26 and computer processed information all at the same time and can modify or change it as the circumstances warrant. The logic circuitry of an input selector 28 associated with display terminal 20, 22*a*** provides the operator of that terminal with that ability. The operator selects the particular line display terminal that he wishes to modify and writes into its memory module. This information is then displayed on the line terminal in question as well as on the supervisor display terminal.

The video mixer 27 is a standard device used in television studio equipment, among other places, which non-additively mixes information from a number of sources. The number of video signals that can be mixed depends upon the number of input circuits of the video mixer and the ability of the display terminals to illustrate in a readable manner the information conveyed.

Although only one TV camera and one video tape recorder are shown in FIG. 1*a*, any number of these devices may be used simultaneously depending on the input circuitry of the video mixer 27 and the ability of the terminals to display the information.

The video mixer 27 is provided with a bank of switches which permit the operator of the monitor associated with it to select any input information to the video mixer he wants or any combination thereof. Although only one video mixer is shown in FIG. 1*a*, such a device could be arranged in circuitry with each line display terminal. Also the supervisor display terminal could have remote control over the video mixers of each of the line terminals.

Figure 1D:
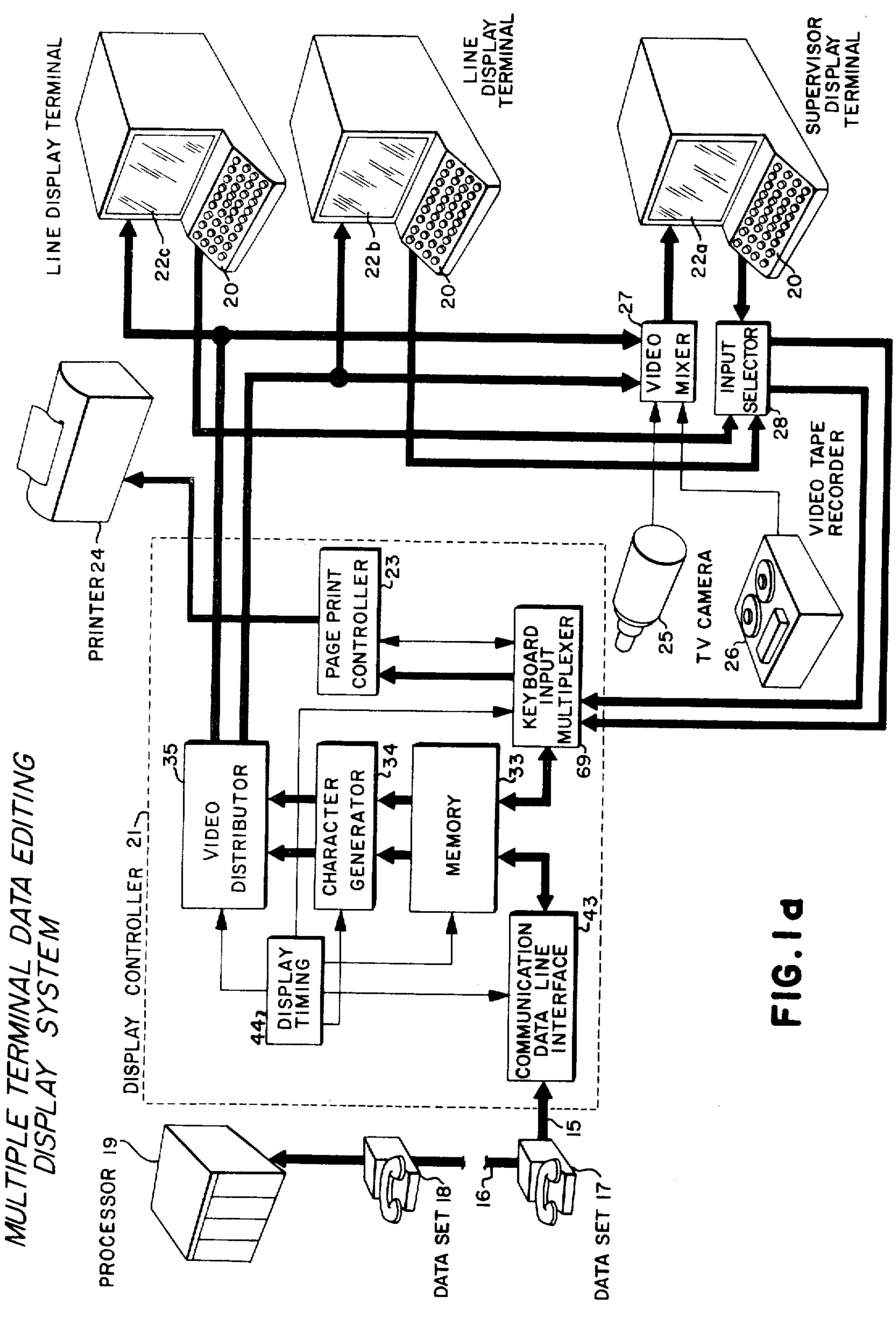
FIG. 1*d* is a functional logic diagram of the party line module shown in FIG 1*c*.
Figure 1B:
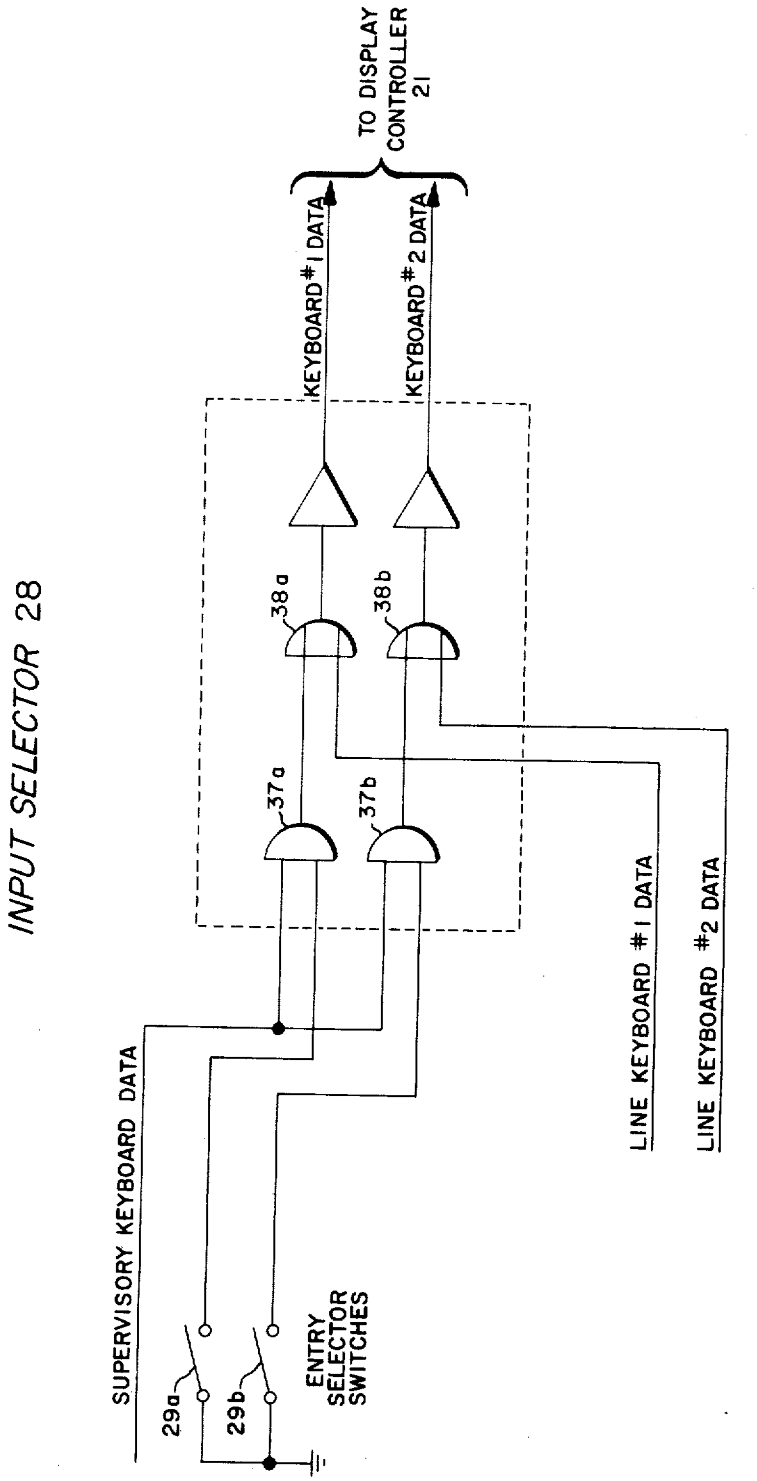
FIG. 1*b* is a functional logic diagram of the input selector shown in FIG. 1*a*.

FIGURE 1*b* illustrates in more detail the input selector 28 of FIG. 1*a*. As shown, the entry selector switches **29*a* and 29*b* control where the keyboard data of the supervisor terminal 20, 22*a*** of FIG. 1*a* will be transmitted as well as the keyboard output data of the line display terminals 20, **22*b* and 20, 22*c***. By appropriate logic, it would also be possible for the supervisor terminal operator, through a plurality of lockout switches, not shown, to control the data flow from any one or more of the line display terminals shown.

Figures 1C, 1D:
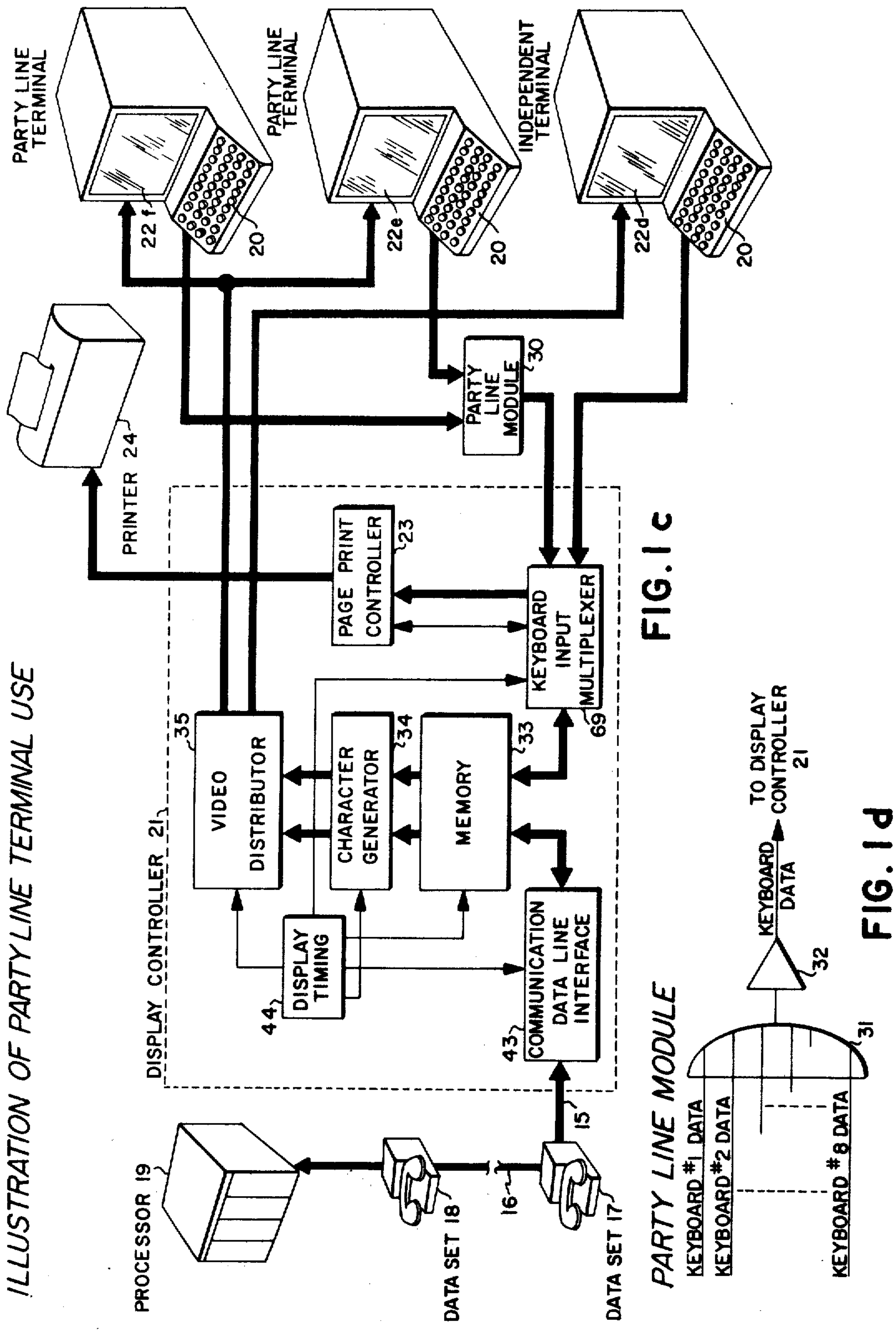
FIG. 1*c* is a further modification of the data editing display system shown in FIGS. 1 and 1*a* illustrating party line terminal use.

FIGURE 1*c* diagrammatically illustrates a further modification of the display terminal arrangement shown in FIGS. 1 and 1*a*. Two of the display terminals shown are party line terminals 20, **22*e* and 20, 22*f* operating through a party line module 30 with the display controller 21**. Both terminals can enter data via their keyboards into the same memory module and can display simultaneously the same data from the same sections of the memory module. In order to avoid introducing data simultaneously into the same place in the memory module, monitor lights are provided on the keyboards of each of the terminals indicating when a party line terminal is activated. With this type of apparatus, operators of two display terminals can communicate with each other, both looking at the same identical display and both having the same control over the information displayed.

Display terminal 20, **22*d* is an independently arranged terminal which operates in the same manner as terminal 20, 22** shown in FIG. 1.

FIGURE 1*d* illustrates in more detail the logic of the party line module 30. The data received from the various keyboards of any one or more of a plurality of monitors is transferred through an OR-gate 31 and an amplifier 32 to the display controller 21.

Display controller

Each of the sources 15 and 20, shown in FIGS. 1, 1*a* and 1*c*, may transfer data incrementally by character to a display memory 33 of the display controller 21 of the multiple terminal data editing display system disclosed. As utilized herein, the terms "information" and "data" are synonymous. The data itself comprises digitally coded groups of bits representative of alphanumeric and other symbolic characters. As disclosed herein, the system employs a seven bit serial code for communication with the associated processor 19, adding additional bits as dictated by the operating mode to create a "character frame" and parity indication. Commands and characters which this code defines are listed in FIG. 2. The operations associated with each of the various commands can be grouped into three sets of "command functions" as shown in FIG. 3.

For simplicity, it is assumed that character data is loaded into the display memory 33 of the display controller sequentially, shown in FIG. 1, although it is obvious that memory address logic may be provided so as to load data into the display memory in any desirable sequence, location or format.

The display controller 21 contains all of the buffering and storage functions of the system, together with all the translation functions except that of translating finger pressure upon a key into a coded electrical signal; the latter translation is performed by the keyboard of any one or more of the sources 20.

While the display controller is designed and constructed as a single integrated unit, not readily separable by function, it can be considered as a number of functional subsystems (as shown in FIGS. 1, 1*a* and 1*c*) which are closely interconnected at many points, and is so considered herein.

The display controller 21 is capable of controlling up to thirty-two remotely located display terminals and is composed mainly of the following functional units, namely the character generator 34, the display memory 33, the video distributor 35, the page print controller 23, communication data line interface 43, keyboard input multiplexer, and the display timing 44.

Figure 10:
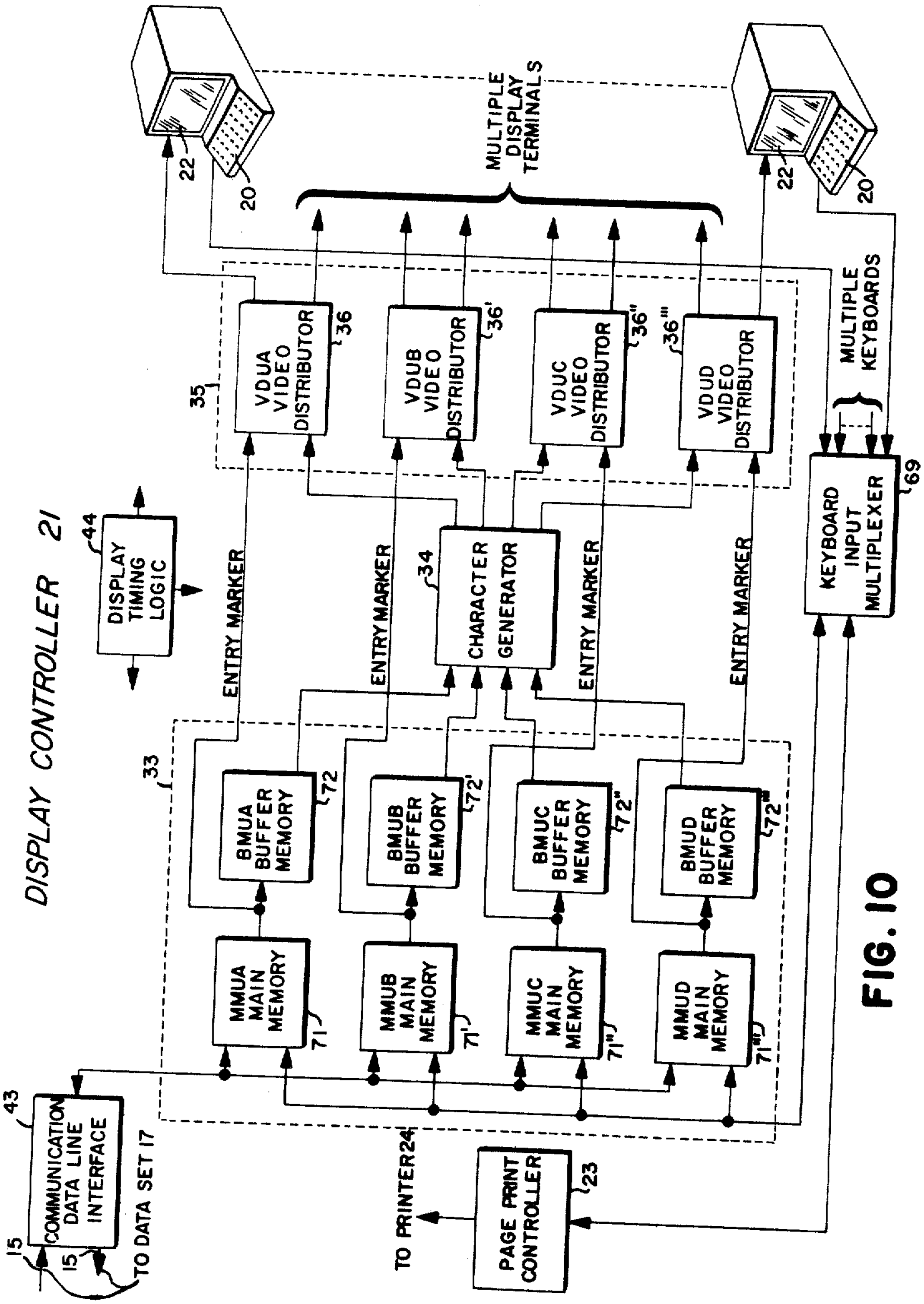
FIG. 10 is an amplification of the block diagram shown in FIGS. 1 and 1*a* illustrating in more detail the display memory and video output register modules.

The display memory 33 is of a modular type and may contain (as shown in FIG. 10) up to four main memory units and four buffer memory units. The main memory units are identified as MMUA, MMUB, MMUC and MMUD and have been given the reference characters 71, 71', 71'' and 71''', respectively. The associated buffer memory units have been identified as BMUA, BMUB, BMUC and BMUD and have been given the reference characters 72, 72', 72'' and 72''', respectively.

The video distributor 35 comprises four video distributor units identified as VDUA, VDUB, VDUC and VDUD and given the reference characters 36, 36', 36'' and 36'''. The main memory unit 71, in combination with its associated buffer memory unit 72 and video distributor unit 36, will hereinafter be referred to as a terminal memory unit (TMU). Each of the terminal memory units can operate with up to eight display terminals. Different numbers of display terminals on a given terminal memory unit (TMU) will result in a different maximum number of characters capable of being displayed on each display terminal and explained in more detail later.

Display Monitor

The display monitors 22–**22*f*** of the multiple terminal data editing display systems shown in FIGS. 1, 1*a* and 1*c* are standard video television (TV) monitors each accepting a standard composite video signal. Each monitor displays this signal as a pattern of light and dark areas upon the face of a cathode ray tube (CRT); the patterns form alphanumeric symbols determined by the display controller. Each display terminal subsystem includes standard video amplifier, horizontal and vertical sweep circuits, cathode ray tube circuits and power supplies all well known and not discussed in detail herein.

Keyboard Unit

Figure 4:
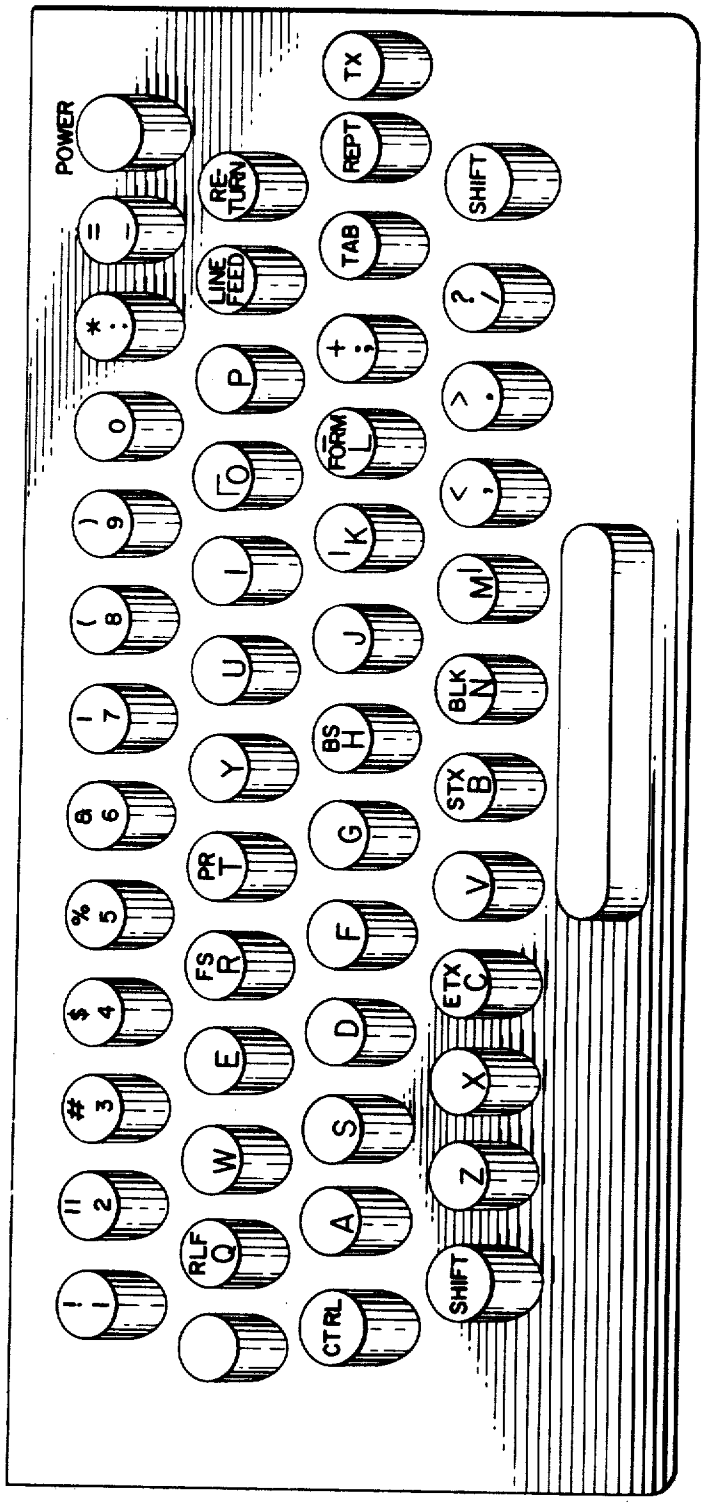
FIG. 4 illustrates the keys of the keyboard units.

The data sources 20 may each include, inter alia, a keyboard unit together with certain additional circuitry which produces an 8 level code signal. It also includes all system operating controls with the exception of the controls for the display terminals. Although other input data sources may be used with the data editing and display terminals disclosed, the keyboard entry source will be discussed in detail herein. FIGURE 4 illustrates the keys of a usable keyboard.

The keyboard input multiplexer 69 (shown in FIGS. 1, 1*a*, 1*c* and 10) is a data multiplexer which accepts input data from the display terminal keyboards on a time-shared basis. Each input from the keyboard is decoded to determine if it is a command code or a data character to be stored. Command characters are used to control the position of an entry marker on the display, record in memory the display terminal mode, or clear the entire display. Data characters are routed to a location in memory corresponding to the character position under the entry marker on the display. After each character entry, the entry marker automatically indexes to the next consecutive position on the display.

Keyboard data from up to eight display terminals per terminal memory unit (TMU) can be multiplexed by the keyboard input multiplexer 69 and it will service up to thirty-two keyboards substantially simultaneously where each keyboard is operating at a rate of up to fifteen characters per second.

Logic components

The vast majority of the circuits utilized in the display controller are of the integrated circuit variety. Most of the circuitry is composed of integrated circuit modules. While hundreds of these modules are used in the system disclosed, they are mainly of three distinct types, namely, the "gate," "flip-flop" and "buffer" modules which are described in detail below.

AND-gate modules

The AND-gate modules disclosed in the drawings provide the logical operation of conjunction of binary 1 signals applied thereto. In the system disclosed, since the binary 1 is represented by a low level signal, the AND-gate provides a low level output signal representing a binary 1 when, and only when, all of the input signals applied thereto are low level and represent binary 1's. AND-gates **37*a* and 37*b*** in FIG. 1*b* are representative of the AND-gates described.

OR-gate modules

The OR-gate modules disclosed in the figures of the drawings provide the logical operation of inclusive-OR for binary 1 input signals applied thereto. In the system, since the binary 1 is represented by a low level signal, the OR-gate provides a low level output signal representing a binary 1 when any one or more of the input signals applied thereto are low level and represent binary 1's. OR-gates 38*a* and 38*b* in FIG. 1*b* are representative of the OR-gates described.

Flip-flop modules

Figure 5:
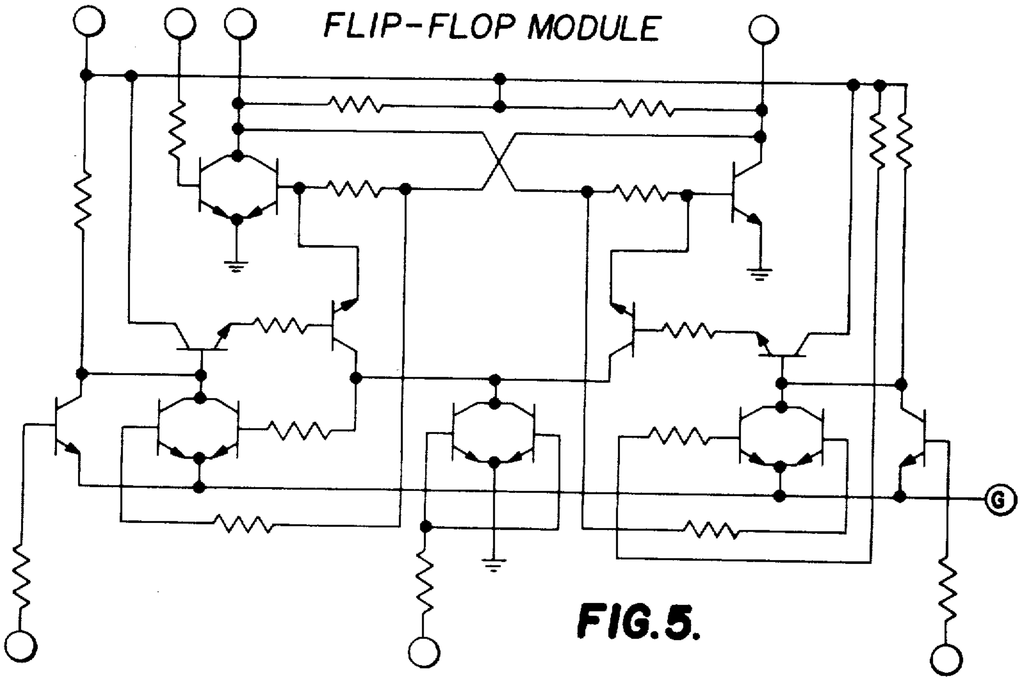
FIG. 5 is a simplified block diagram of a flip-flop module used in the data editing display systems of FIGS. 1, 1*a* and 1*c*.
Figures 6, 7:
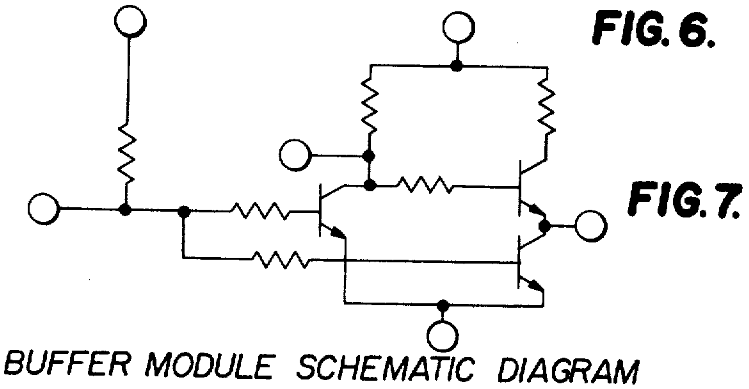
FIG. 6 is a truth table for the flip-flop module of FIG. 5.
FIG. 7 is a simplified block diagram of a buffer module used in the data editing display systems of FIGS. 1, 1*a* and 1*c*.

The flip-flop modules (identified by numerals 39, 40 and 41 shown in FIG. 8) are representative of those used in the system disclosed and are shown in detail in FIG. 5. These modules use medium power transistors which are suitable for use in shift registers, counters and other control devices. FIGURE 6 is a truth table illustrating all possible input conditions to this structure. The flip-flop shown differs from set-reset flip-flops in that simultaneous application of low level signals to its set input terminal S and its complementing reset or clear input terminal C results in a complementing of the flip-flop rather than an ambiguous indication. A high or positive voltage level being applied to the preset input terminal P of the flip-flop forces the flip-flop module to the set state. A trigger input signal to its T input terminal causes the flip-flop to change its state upon the high-to-low transition of the trigger signal.

Inverter (buffer module)

The inverter or buffer modules used in the system disclosed are inverting drivers. FIGURE 7 shows a schematic diagram of the circuitry contained within the module. The output of the buffer module is the complement of the input signal and is utilized to drive a large number of gates.

Master clock and timing circuits

The display controller employs a number of clock signals at different speeds to accomplish its functions. For example, the display memory 33 of FIG. 1 incorporates appropriate read and write circuitry whereby digital data can be alternately recorded and regenerated. To synchronize the transfer of data to the display memory, appropriate timing, buffering and data entry control logic is provided in the communication data line interface 43. Each of these subsystems, as well as the display timing logic in block 44 of FIG. 1, requires clocking signals at different speeds to accomplish their functions. Coded characters in the display memory are repetitively converted into TV video signals by the character generator 34 and along with synchronizing signals generated by the display timing logic 44 are transmitted from video distributor 35 to the display terminals 20, 22. At the same time that data is being transmitted through the various subsystems at different clocking rates, input data may be accepted by the display controller from the data sets at source 15 at any selected bit rate although only the 1200 bits per second transmission rate is described herein.

All of the clocking signals used in the data editing display system disclosed are obtained from or controlled by a single stabilized oscillator by appropriate frequency division and binary countdown of suitable binary counters.

Figure 8:
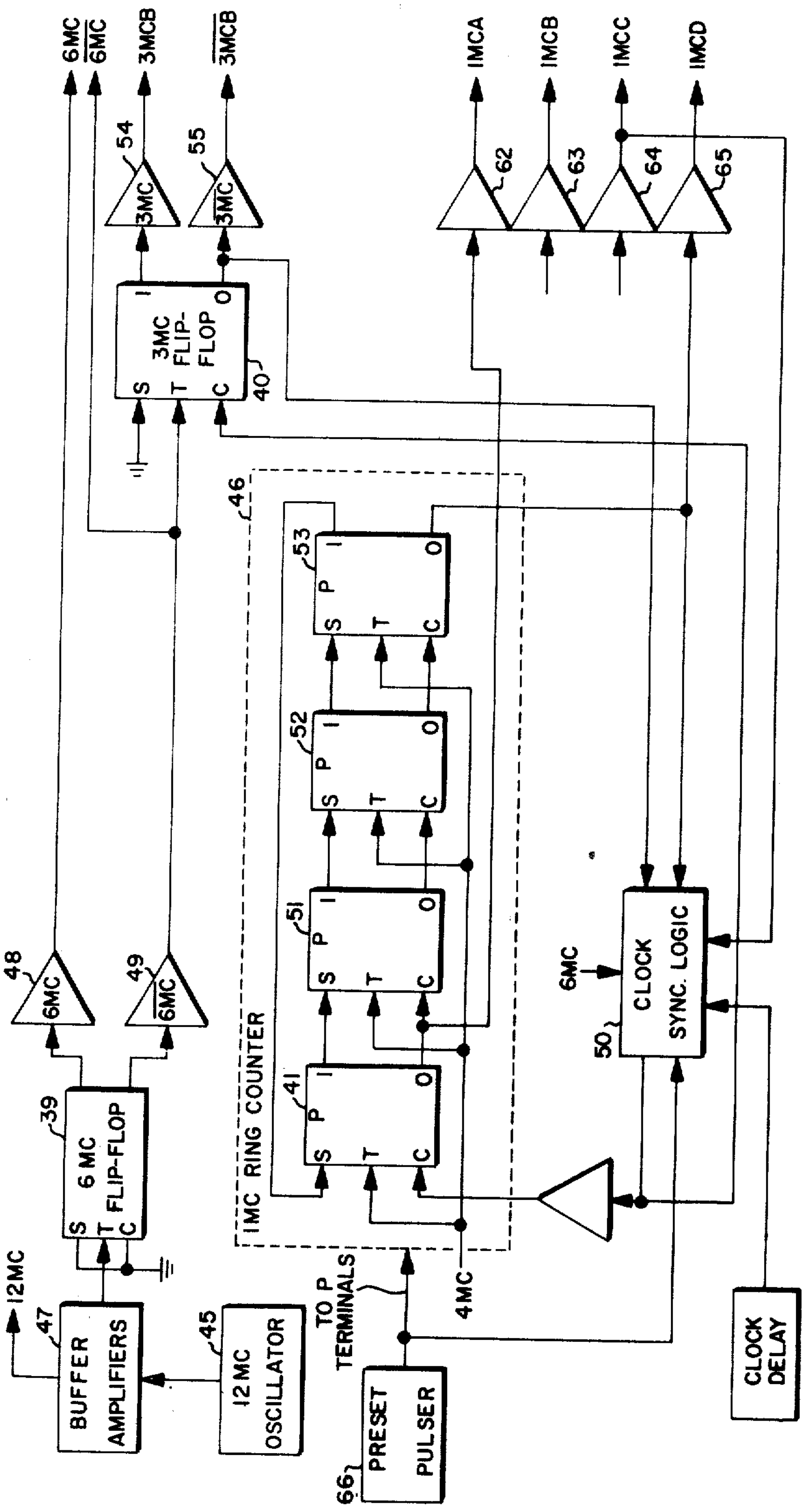
FIG. 8 is a functional block diagram of the master clock generator used in the data editing display systems of FIGS. 1, 1*a* and 1*c*.
Figure 9:
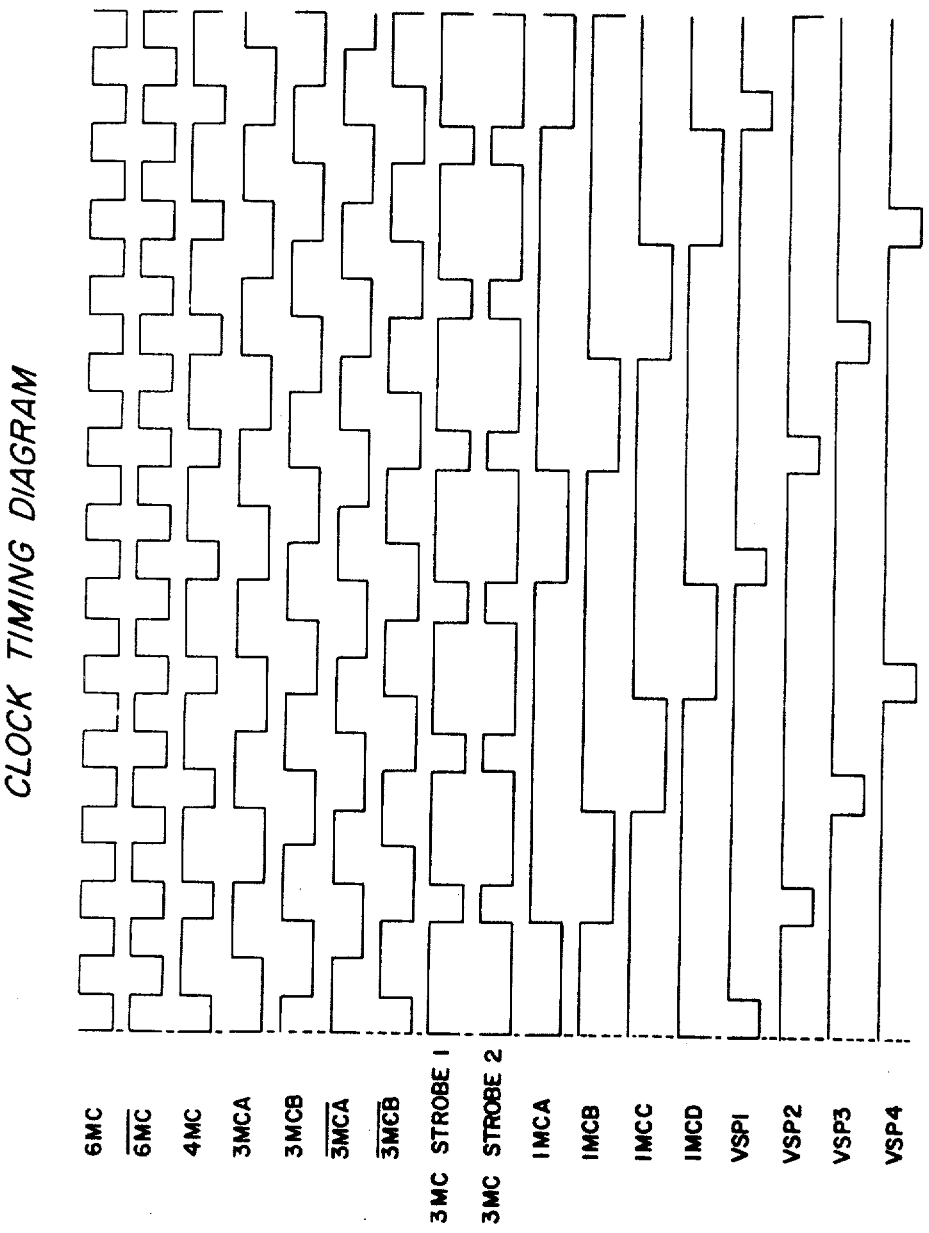
FIG. 9 is a timing diagram illustrating the relationship of the various signals generated by the structure illustrated in FIGS. 8 and 8*a*.

The master clock timing arrangement shown in FIG. 8 utilizes a 12 million cycle per second (12MC) crystal controlled oscillator 45, the output of which is divided by flip-flop 39 to produce two complementary 6 megacycles (6MC $\overline{6MC}$) signals for use in each of the functional units of the display controller 21. As noted from FIG. 8, the $\overline{6MC}$ signal is divided again by a second flip-flop 40 to produce 3 megacycle (3MC) signals (3MCB and $\overline{3MCB}$) which are used for memory readout as hereinafter explained. The bar over the signal indicates the complement of the signal identified. In a similar manner, but not illustrated in FIG. 8, the 6MC signal drives a flip-flop to drive the 3MCA and $\overline{3MCA}$ signals. The time relationship of these and other clock signals is illustrated in FIG. 9. The 1MCA through 1MCD output signals of the ring counter 46 are generally used as the clock pulse frequency rate for the data editing display system disclosed.

As noted in FIG. 8, the output of the oscillator 45 is applied to buffering amplifiers 47 and thence to flip-flop 39. These amplifiers serve to isolate the frequency division circuit from the oscillator itself, minimizing any effects of loading upon clock frequency stability.

The output of buffering amplifiers 47 is applied to the toggling input terminal T of flip-flop 39, the set and complementary terminals S and C of flip-flop 39 being connected to ground, as shown. Flip-flop 39 is triggered by each high-to-low voltage transition of oscillator 45, thereby dividing the frequency of each pulse of oscillator 45 applied to flip-flop 39 into two 6MC pulses at its 1- and 0-output terminals. The complementary output signals of flip-flop 39 are applied to a pair of buffer-shaper amplifiers 48 and 49. The outputs of the buffer-shaper amplifier circuits are used directly and are know herein by the signal designations 6MC and $\overline{6MC}$.

The $\overline{6MC}$ signal is applied to the toggling input terminal T of flip-flop 40. The set input terminal of flip-flop 40 is connected to ground while its complementing input terminal C is connected to an output terminal of a flip-flop (not shown) in the clock synchronizing logic of block 50. Since the output signals from this flip-flop in logic block 50, as well as the input signal to the set terminal of flip-flop 40, are low during normal operation of the system described, flip-flop 40 will be complemented each high-to-low transition of the $\overline{6MC}$ output signal of buffer-shaper amplifier 49 producing complementary 3MC output signals at its 1- and 0-output terminals. These signals are applied to buffer-shaper amplifiers 54 and 55 to produce the 3MCB and $\overline{3MCB}$ logic signals, respectively. The 0-output signal of flip-flop 40 is also applied to gates (not shown) in the clock synchronizing logic 50.

Four phases of 1MC clock signals are also generated by the logic shown in FIG. 8. All four clock phases are generated by the 4 stage binary ring counter 46 and appropriate gating logic shown diagrammatically in FIG. 8. Ring counter 46 is composed of four flip-flops 41, 51, 52 and 53. All four flip-flops are unconditionally set at equipment energization or turn-on and are toggled or complemented by the 4MC signal from ring counter 56, shown in FIG. 8*a*. Flip-flops 41, 51, 52 and 53 are interconnected in such a manner that, in normal operation, flip-flop 51 is toggled by the next 4MC pulse after flip-flop 41 changes states. Flip-flop 52 is toggled by the next 4MC pulse after flip-flop 51 changes states and flip-flop 41 is toggled by the next 4MC pulse after flip-flop 52 changes states. Thus, each flip-flop remains in the 1-state for one cycle of the 4MC signal and then changes to the complementary state for the next three cycles and so forth. These timing relations are shown in FIG. 9.

The 3MC STROBE 1 timing signal, shown in FIG. 9, is generated by conjunction of a $\overline{6MC}$ clock signal pulse with a $\overline{3MCA}$ clock signal pulse in an AND-gate (not shown). The 3MC STROBE 2 signal pulse is the complement of the 3MC STROBE 1 signal pulse. These two timing signal pulses are used in areas of the logic where timing is critical and narrow clock pulses are required to eliminate the effect of circuit tolerances.

Figure 8A:
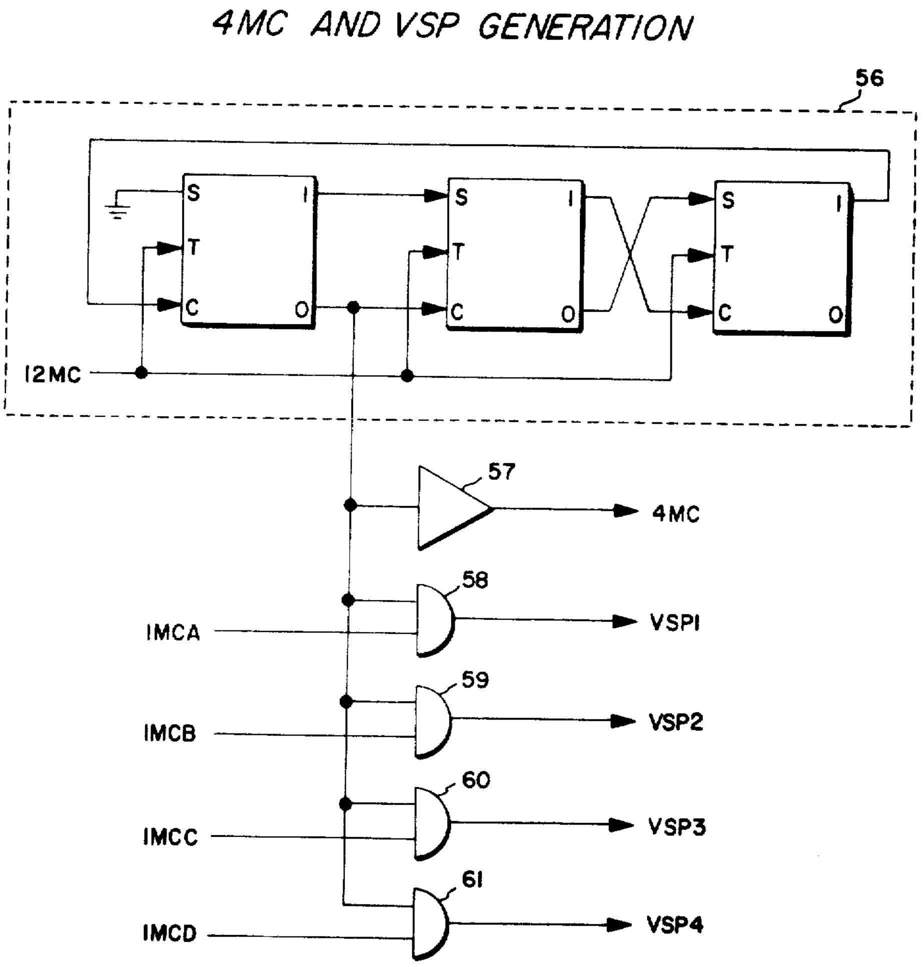
FIG. 8*a* is a functional logic diagram of the 4MC and VSP1, VSP2, VSP3 and VSP4 signal generation.

The 4MC clock signal pulse and VSP1 through VSP4 timing signal pulses shown in FIG. 9 are generated by the logic of FIG. 8*a*. A 3 stage ring counter 56 is driven by the 12MC output pulse of the buffer amplifiers 47. The ring counter 56 produces a 4MC signal pulse which is applied to buffer-shaper amplifier 57 for general distribution as a 4MC clock pulse.

As shown in FIG. 8*a*, the 4MC clock pulse is transferred to one terminal of each of AND-gates 58 through 61 where conjunction occurs with 1MCA through 1MCD clock signal pulses received from buffer-shaper amplifiers 62 through 65, respectively, of FIG. 8 to generate the VSP1 through VSP4 signal pulse waveforms.

In normal operation, the various clock signals of the display controller are maintained in synchronization with each other in the relationship shown in FIG. 9. However, noise voltages and other unpredictable transient voltages may cause loss of synchronization. Should such errors occur, the clock synchronizing logic circuits 50 detect the existence of a non-synchronized condition and restore synchronization.

Since virtually all operations of the display controller are controlled by various counting registers, it is imperative that a means be provided for starting all the counting registers in sychronization with each other. This means is the preset pulser circuit 66 which drives the preset input terminals of all pertinent flip-flop outputs to a high level condition momentarily at equipment turn-on or at any time the clock synchronizing logic circuits in block 50 go True indicating a resetting operation of the logic of the data editing display system.

Character display

FIGURE 10 illustrates in more detail, in block diagram form, the time-shared multiplexed display memory 33 and video distributor 35 of FIG. 1. As shown, the display memory 33 comprises a plurality of main memory units 71, 71', 71'' and 71''' and buffer memory units 72, 72', 72'' and 72'''. Main memory units 71–71''' receive data via the communication data line interface 43 and the keyboard input multiplexer 69 from each of the sources 15 and 20 incrementally by characters and transmits data incrementally by character to the data communication line 15. For simplicity, it is assumed that character data is normally loaded into memory sequentially, i.e., the first character is stored in memory location identified, for example, as one, the second character in memory location two, the third character in memory location three, etc. It is further assumed that the next sequential character location number can be modified through the use of a special set of commands. It is obvious that memory address logic may be devised to load data into any desired sequence, location or format in memory.

The main memory modules or units 71–71''', to be described in more detail later, are each capable of storing one full page of text. For explanation purposes, it is assumed that a full page of text comprises twenty-six lines wherein each line contains forty-six character positions. It is to be noted that the number of lines and the number of characters per line used is a function of the memory size and the circuit speeds employed.

The memory data can be partitioned into page segments so that each segment may be displayed on a different display terminal. The following partitioning configurations are possible with the system disclosed.

(1) Eight segments of data displayable as four 46 character lines on each of up to eight display terminals;

(2) Four segments of data displayable as eight 46 character lines on each of up to four display terminals;

(3) Two segments of data displayable as sixteen 46 character lines on each of up to two display terminals; and (4) One segment of data displayable as twenty-six 46 character lines on one display terminal.

FIGURE 10*a* illustrates in chart form the memory partitioning described above. The chart shows a number of column headings identified as S1, S2, S4 and S8. The S designations are representative of jumper or switch settings which determine the memory partitioning arrangement. As seen in FIG. 10*a*, S1 partitions the 33 available memory rows of a TMU providing 26 display rows on a display terminal.

Similarly, for an S2 setting, the 33 memory rows of a TMU are partitioned such that two display terminals will each display 16 rows of information. An S4 setting partitions a TMU such that four display terminals each display 8 rows of information and S8 setting partitions a TMU such that eight display terminals each display 4 rows of information.

Additionally, these S settings control the multiplexing of the information flow of the display terminal keyboards 20 to corresponding memory segments.

The display timing logic 44 provides in binary form a memory address to the communication data line interface 43 and keyboard input multiplexer 69, for all data entries. A data transfer control signal from the display timing logic determines when data from the main memory is transferred to the buffer memory units 72–72'''. As shown in FIGS. 1, 1*a* and 1*c*, data flow through the system is shown by heavy dark lines while control and synchronizing signal flow is shown by thin dark lines. A row of data is recycled through buffer memory units 72–72''' eight times at a rate in synchronization with the generation rate of the horizontal television raster lines. Thus, the buffer memory units retain each row of data they accept from the terminal main memory units 71–71''' for a duration equivalent to the time for generating eight television raster lines. During this eight television raster line period, the data is presented on eight successive cycles to character generator 34.

Character generator

Character generator 34, which is time-shared by the plurality of TMU devices, is designed to accept and convert each six bit coded character from the buffer memory units 72–72''' along with an indication of the television raster line number from the display timing logic 44 and encodes these signals into a video information word. This video information word is representative of a portion of the characters to be displayed and is presented in parallel form to a video register in the video distributor units 36–36''' which converts it to a serial format similar to a television video signal. The time sharing of the character generator 34 is on a character-by-character basis that is, it accepts a character code from BMUA, generates the corresponding video information word, transfers that word to VDUA, then accepts a character code from BMUB, generates the corresponding video information word, transfers that word to VDUB, and so forth. The character generator is actually forming video information words in one-fourth the time that it takes to display a video word, such that, as soon as it has completed the transfer of a word to VDUB, VDUA has just finished displaying the last word that it received and must be given a new word for display.

The output signals of the video distributor units 72–72''' are in proper form to control the intensity circuits of the standard television display terminals 20, 22 in order to obtain an alphanumeric presentation. The outputs of the video distributor units are applied to a video amplifier and mixer circuit (shown in FIG. 61) which combines it with television synchronization signals from the display timing logic 44 to drive the television display terminals.

The display presentation appearing on the television terminals is an alphanumeric display arranged in various formats as described above. Each individual character position occupies a fixed position in the television raster; that is, it is always made up of the same set of raster lines. For a 14-inch television screen, the dimensions of a 26 line format are approximately 7 inches high and 9.3 inches wide when the format size is optimized using height and width controls of the display module. When the format size is adjusted to those dimensions, the characters are 0.16 inch high by 0.12 inch wide with a spacing between characters of 0.08 inch and between lines of 0.10 inch.

Character composition

Figure 11:
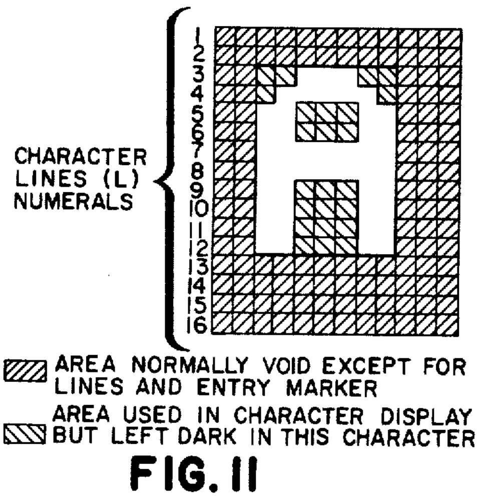
FIG. 11 is a pictorial representation illustrating how the characters are formated in the system shown in FIGS. 1, 1*a* and 1*c*.

FIGURE 11 illustrates the technique by which each character position is generated in the television raster and particularly illustrates details of the generation of a letter A in the first character position of a display row on one of the TV monitors. Each character position has sixteen raster lines passing through it, and each raster line is divided into twelve individual picture segments. Each picture segment is capable of being intensified or not. In this way, any symbol which can be formed with a matrix of twelve-by-sixteen dots can be implemented. Due to the very small size of each picture segment (10–15 mils on a 14-inch television monitor), high quality symbols can be formed. Because the display terminal is a standard television monitor, the CRT beam utilizes two passes to trace through all raster lines of each twelve-by-sixteen array of picture segments. Each such pass is referred to as a field. During the first field, all odd numbered lines of the raster are traced; during the second field, all even numbered lines are traced. Both fields taken together are referred to as one frame.

Figure 11A:
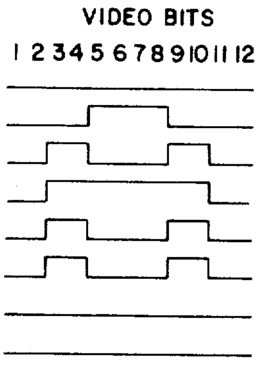
FIG. 11*a* illustrates diagrammatically the video signal representing a first portion of the character.
Figure 11B:
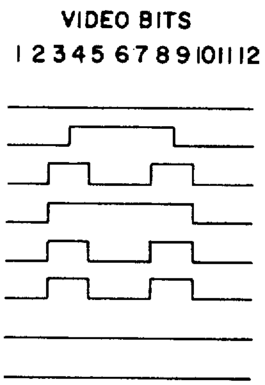
FIG. 11*b* illustrates diagrammatically the video signal representing a second portion of the character.

The waveforms, shown in FIG. 11*a*, are developed by the character generator 34 during eight memory "passes" of the first portion or field with the upper waveform (corresponding to character line No. 1 being developed and each succeeding waveform on each subsequent pass during the first field). The correspondence between high level points on these waveforms and high intensity points on the CRT display is readily visible in the illustration. Similarly, the waveforms, shown in FIG. 11*b*, are developed during the second portion or field memory passes 2083 microseconds later than those in FIG. 11*a*. The correspondence between high level in the waveforms and high intensity in the display is visible.

Figure 12:
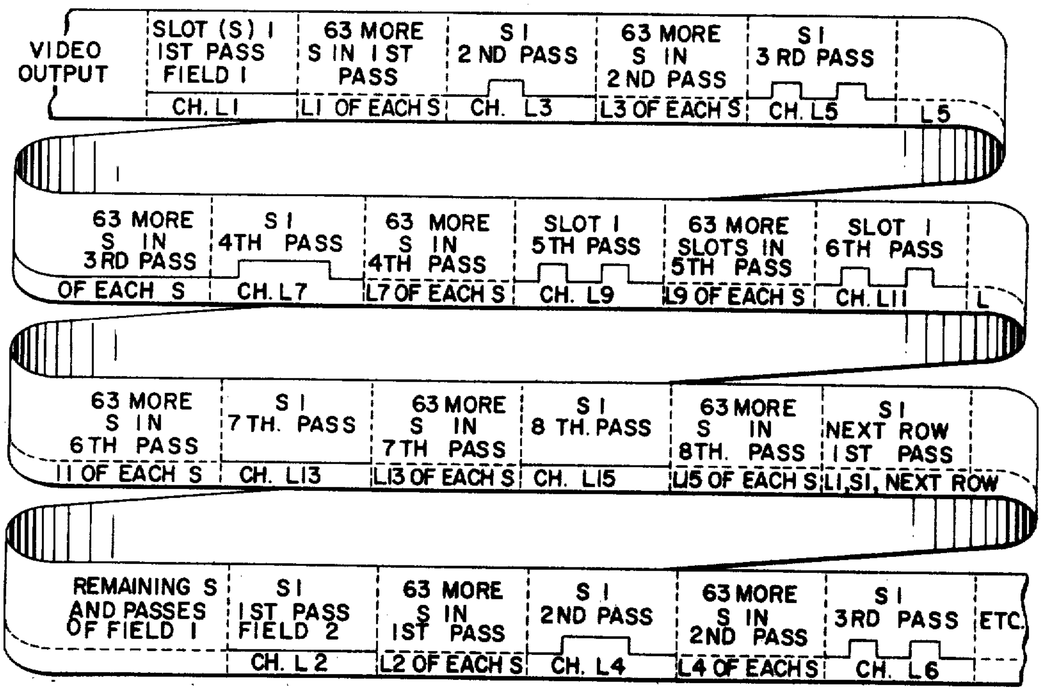
FIG. 12 illustrates diagrammatically a continuous time stream of video signals transmitted to the display monitor to form the character A.

FIGURE 12 illustrates how the waveforms of this single character A meshes into the continuous time stream of the video signal transmitted to the display monitor.

When the display presentation is in the form of a page of text, the twelve-by-sixteen picture matrix contains those picture segments required to make the desired character shapes in the text plus the picture segments necessary for space between characters and space between rows of characters. The shaded picture segments in FIG. 11 indicate the area that is used by the alphabetics, numerics and punctuation marks. It is noted that the shaded area of seven picture segments by ten raster lines is all that is required to make up the standard alphanumerics and punctuation marks. When it is desirable to present other special symbols such as horizontal and vertical lines, picture segments outside of the shaded areas are used. A horizontal and vertical line may be drawn through a sequence of adjacent character positions to illustrate lines across a portion or all of the display. The implementation of these symbols is accomplished by simply including them as part of the character repertoire of character generator 34. Horizontal and vertical lines drawn in this manner will appear as continuous unbroken lines across the display with no breaks at character position boundaries. The only discontinuities of a vertical line will be those due to the granularity of the television raster.

Figure 13:
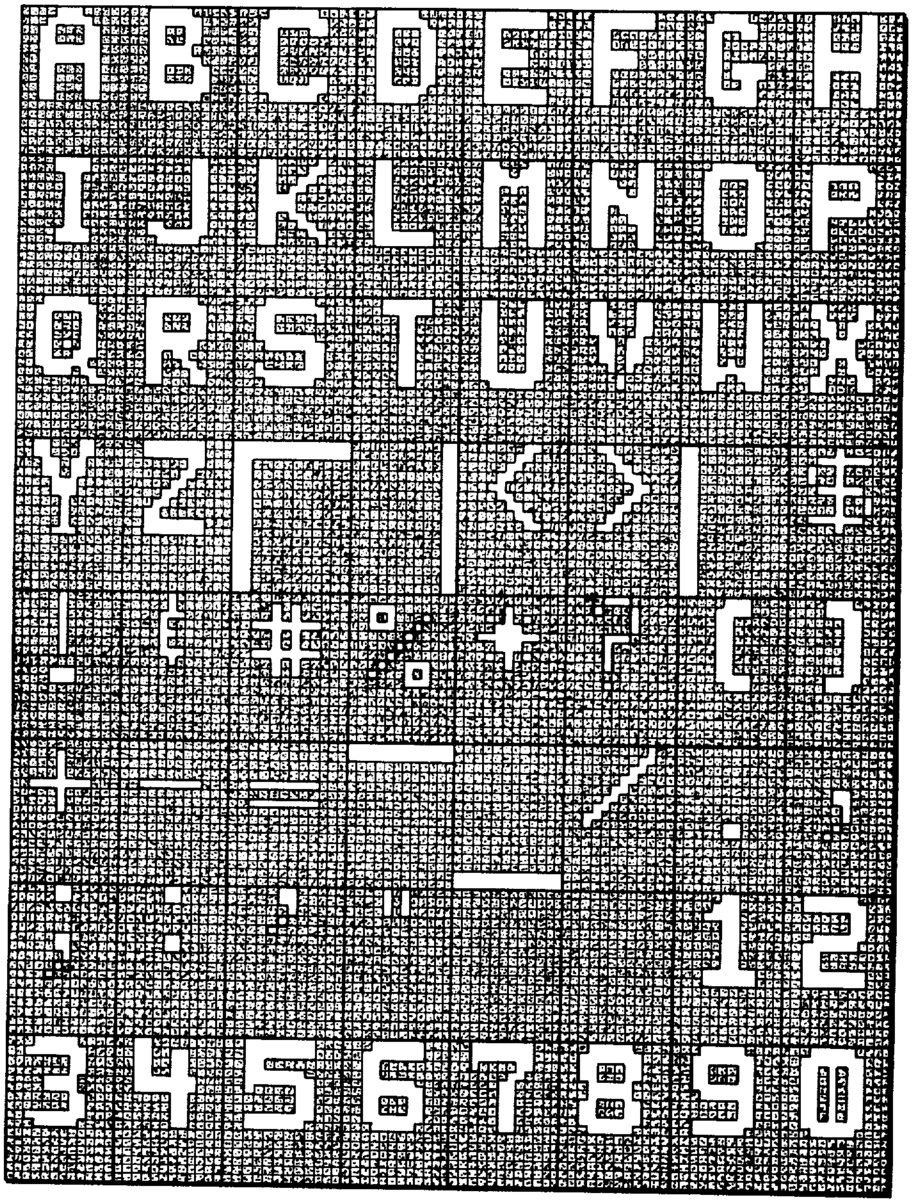
FIG. 13 illustrates a set of characters used in the data editing display system disclosed.

FIGURE 13 illustrates an example of a set of characters using the technique described herein. It should be noted that the seven-by-ten area normally used for character definition is placed at the upper portion of the picture segment, i.e., the 10 rows of the picture start at row 1 and continue to row 10 of the picture segment. In FIG. 11, the picture started with row 3. It should be recognized that the characters may be placed any place within the picture segment as more fully explained later.

As an illustration of the added capability offered by the use of horizontal and vertical line symbols, it should be noted that with only four special symbols, it is possible to display block diagrams, business tables, or bar charts. In addition, the vertical lines chosen in the illustration can be used to double as bracket symbols or absolute value signs.

It should be recognized that many other special symbols may be generated to allow the presentation of more complex displays, if desired.

A display status character and End of Text symbol may be utilized. The display status or mode character indicates the state of operation of the terminal. In this disclosure, this character is displayed in the character space preceding the first text character position of the first format line on the television monitor. The display status character symbology is as follows: A symbol "T" indicates the display terminal is operating in the transmit state. A flashing mode character in this character position indicates that an error condition was detected during the last received data from the processor to the display terminal, and no symbol appearing in this character location indicates that the display terminal is in a non-transmit state. A "P" in this character position indicates that the operator has requested a printout of displayed information. An "L" in this character position indicates that the terminal is in the off-line compose mode and an "L" in this position indicates the operator has placed the terminal in the data receive mode. The End of Text symbol "C" is located in the right-hand margin following the 46th text character position; however, it may be positioned at the end of any line on the display. When the display terminal is operating in the Memory Transmit state, the location of this symbol determines the last character on the display to be transmitted.

The display editing system disclosed also provides a "blink" feature. This feature provides for blinking of one or a group of characters presented on the display and may be implemented by either of two techniques. The first technique is to reserve a unique character code which alerts character generator 34 of FIG. 1 so that the next character and all subsequent characters, until a space in the transmitted data is reached, are to be blinked. A second technique is to employ an extra "bit" along with each character code to indicate that this specific character is to be blinked on the display. The first technique will be explained more fully later.

The "blink" capability allows emergency or important conditions to be emphasized by flashing an important character or group of characters on the CRT of the display terminals 20, 22. In the same way the "blink" capability is implemented, other means for emphasizing characters on the display are possible. For example, video intensity modulation techniques can be employed to allow more than one level of intensity for characters. To implement this, a set of character codes is reserved to represent a set of intensity levels. When any one of these particular codes is presented to the character generator 34, it sets a flip-flop in the character generator corresponding to that character code which when set causes all subsequent character information to take on a particular level of intensity. In this manner, a single character or group of characters can appear at higher intensity while all other characters in the presentation appear at normal intensity.

Underlining of data for emphasis is provided by triggering a unique character code or "bit." In this case, the unique code or "bit" would be a control signal to character generator 34 to intensify raster lines twelve and thirteen during the display time of the character to be underlined. Implementation of underlining control will be more fully described hereinafter.

When data entry to the data editing display system is made from a typewriter keyboard, an indication must be provided the TV terminal as to where the next character will be displayed. This indication takes the form of a special entry marker symbol which appears on the display as a horizontal line flashing at a seven and one-half cycle per second rate. The entry marker is flashed to make it easy for the operator to locate a particular position on a full page of displayed text. The implementation of this entry marker symbol is such that, as each character or symbol is typed through the keyboard to the display, the entry marker automatically indexes to the next character position. Implementation used for entry marker control will be more fully explained later.

A set of special commands to allow a keyboard operator or a computer program to manipulate the entry marker may be utilized in the present invention to make it a more useful device. These commands include means to Forward Space, Back Space, Carriage Return, Line Feed, Reverse Line Feed, etc., the entry marker. These same special commands may be utilized in the present invention by the communication data line as a control means to start loading new data into any arbitrarily desired memory location. Implementation of these commands will also be more fully described later.

Page print controller

The page print controller 23 is an optional module which is arranged to drive a teletypewriter device. The system is arranged to utilize a plurality of page print controllers.

Each page print controller module receives data input from one of the terminal memory units TMUA–TMUD and utilizes the memory space normally allocated for one of the display terminals 20, 22. Therefore, for each page print controller included in the system, the maximum number of display terminals is reduced by one. The page print controller is designed so that it can be wired to accept data from any TMU The memory space utilized by the page print controller can be addressed and loaded by the processor 19 in the same manner as a display terminal memory space is loaded. Print requests from the keyboard of a display terminal are transmitted to the processor via the data line interface 43 as a normal transmitted message. The processor receives and buffers each print request message until it is able to retransmit it to the desired page print controller memory section to obtain a printed copy of the data.

Since the computer buffers the print request messages, the processor's program can be written to generate print message labeling or add other types of data to a print message to closely fit the needs of each application.

In view of the fact that the page print controller is added in place of a display terminal and utilizes a display terminal memory section, its memory capacity is equal to that of the display terminal's allocated memory section. Even though a print message is limited to the number of text rows of a display terminal's memory section, continuous, multiple row printouts may be obtained by joining successive print messages under processor program control.

DETAILED FUNCTIONAL ANALYSIS

Main memory storage is obtained through the use of wire sonic delay lines in which the data stream is presented by recirculation through a fixed-delay closed loop path. While it is feasible to use magnetic core or drum storage devices in practicing this invention, such use is avoided since drum storage devices are unstable and continuously speed up and slow down in a random manner producing a hunting characteristic unless controlled by special circuitry which compensates for this action. A magnetic core memory device may also be used; however, this type of device results in a much more expensive system.

While wire sonic delay lines are relatively simple memory circuits, they do require precise timing to be able to recover data. This timing is provided by the display timing 44 shown in FIG. 10. FIGURE 10 illustrates in block diagram form the display controller including the main memory units 71–71''' with its associated input data control logic, the keyboard input multiplexer 69 and the communication data line interface 43. The input data control logic blocks 43 and 69 accept data in character form from sources 15 and 20. As mentioned heretofore, each character stored in memory is made up of six binary bits, even though it is received by communication data line interface 43 and the keyboard input multiplexer 69 in seven or eight binary bit form. Under these conditions, it is possible to store and display up to sixty-four print characters and provide up to sixty-four command codes for entry marker manipulation and data line control.

Keyboard input multiplexer

The keyboard input multiplexer 69 performs the function of time multiplexing the data generated by the plurality of keyboards for acceptance by the main memory units 71–71'''. A block diagram of keyboard input multiplexer is illustrated in FIG. 14.

Figure 14:
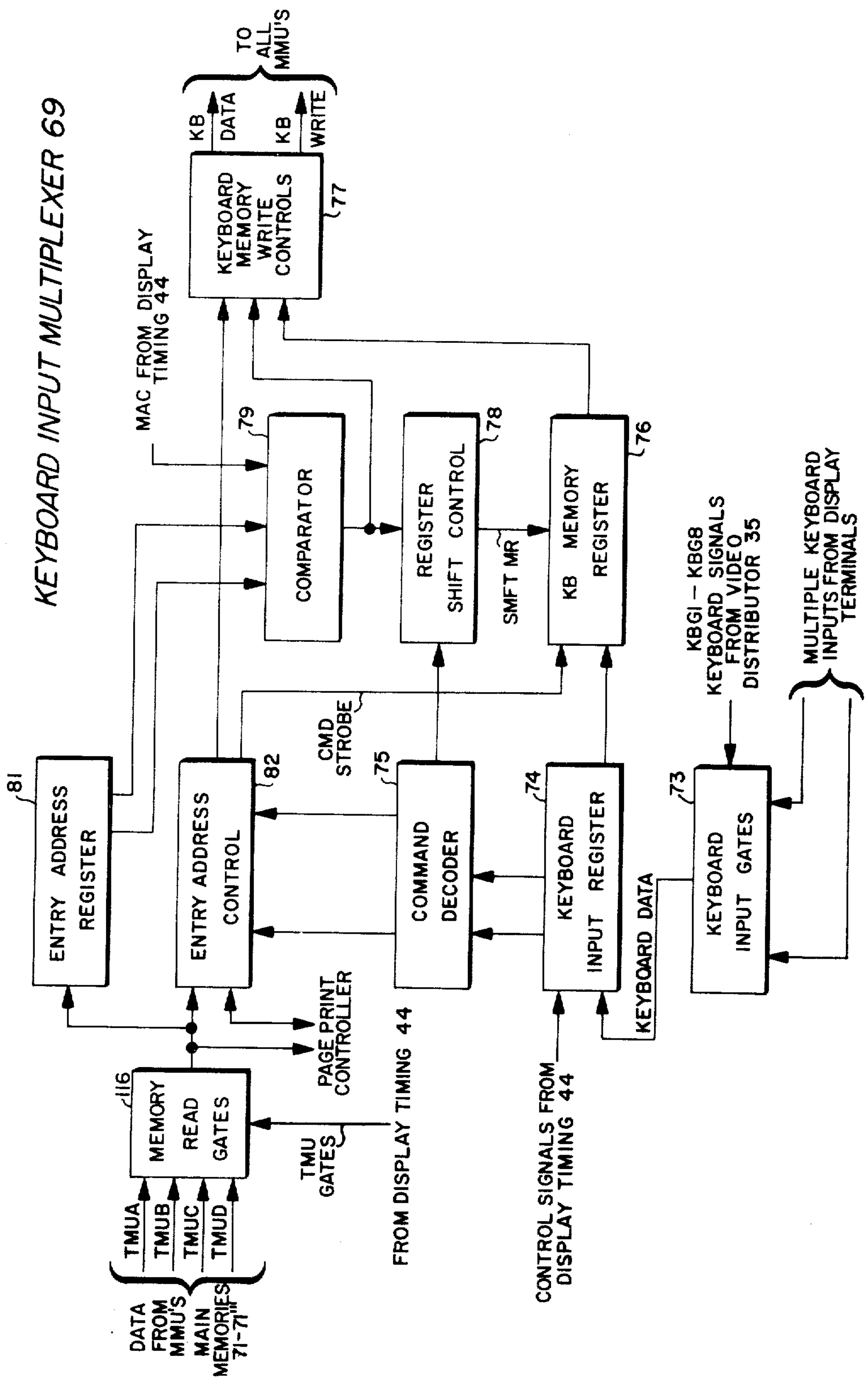
FIG. 14 illustrates in block diagram form details of the keyboard input multiplexer.

As can be seen in FIG. 14, keyboard input gates 73 accept data from all of the keyboards. Data transmission from each of the keyboards is initiated by a Clear-to-Send (CTS) signal generated and transmitted to the keyboards from the video distribution logic 35. This CTS signal will be discussed in more detail later. The function of the CTS signal is to notify each keyboard in turn when it may transmit data to the keyboard input gates 73. The data inputs of the keyboards of the various display terminals are read one at a time by the keyboard input gates in accordance with signals KBG1–KBG8 from the video distributor 35 as shown.

When a keyboard data character is read by the keyboard input gates, it is transferred to the keyboard input register 74, which holds that data character until it can be command decoded. If the command decoder 75 indicates that the data character is a character to be stored in memory, that character is transferred to the keyboard memory register 76 from whence it is transmitted to memory via the keyboard memory write control 77. This transfer of data to memory is accomplished under the control of register shift control 78, which in turn is controlled by the comparator 79.

The comparator's output is a pulse which coincides in time with the data character position in memory. The comparator's output pulse is generated at the correct time by the comparison of the value stored in the entry address register 81 with the memory address count (MAC) generated by the display timing 44. The memory address count corresponds to the instantaneous value of the memory location currently available for access. While the entry address register 81 has stored the value corresponding to the entry marker position on the display, this value of entry marker position is in the form of a memory address location.

At the time that the keyboard input gates 73 sample data from any given keyboard, the entry marker address corresponding to that keyboard is extracted from main memory units 71–71''' and stored in the entry address register 81. This synchronized extraction of entry marker address from the main memory units along with the acceptance of the corresponding data for a given keyboard is the key to the operation of the keyboard input multiplexer 69.

If the data character received from the keyboard is a character to be stored in the main memory units, the currently stored value of entry marker address is read from main memory to the entry address register 81, and simultaneously it passes through the entry address control 82 which increments it by one and returns it to main memory via the keyboard memory write control 77.

Should the data character coming from the keyboard be a command rather than a data character to be entered into memory, it is decoded by the command decoder 75, and the entry address is processed accordingly by the entry address control 82. For example, the command Back Space would cause the entry address control 82 to subtract one from the value of the entry address and pass it back to memory through the keyboard memory write control 77. In this case, no data is stored in memory, only the entry address value has been updated. Other commands are handled in a similar fashion in that the entry address control 82 adds or substracts a fixed value according to the command.

In summary, the keyboard input gates 73 allow one character to arrive from a given keyboard and be stored in the keyboard input register 74, where it is decoded by the command decoder 75, while simultaneously the corresponding entry address is extracted from memory. Should the character be a command, the entry address is processed or updated by the entry address control 82 and rewritten in memory. When the data received is to be stored in memory, the command decoder 75 commands the entry address control 82 to increment the entry address by one and at the same time the register shift control 78 shifts the keyboard memory register contents into memory under the control of the comparator 79.

The following paragraphs describe in more detail the various blocks of the keyboard input multiplexer 69, shown in FIG. 14.

Keyboard input register

Figure 15:
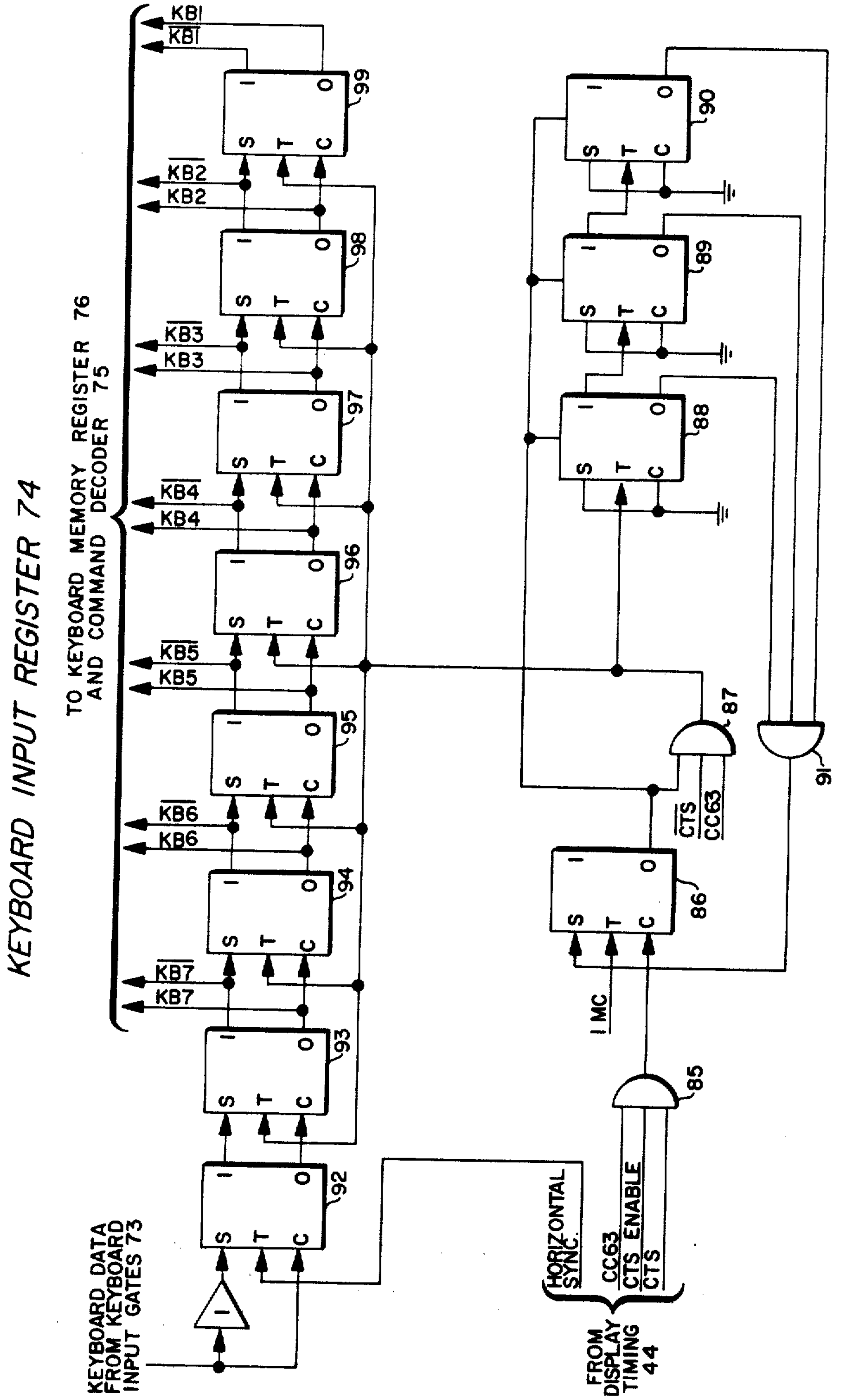
FIG. 15 illustrates in block diagram form details of the keyboard input register shown in FIG. 14.
Figure 15D:
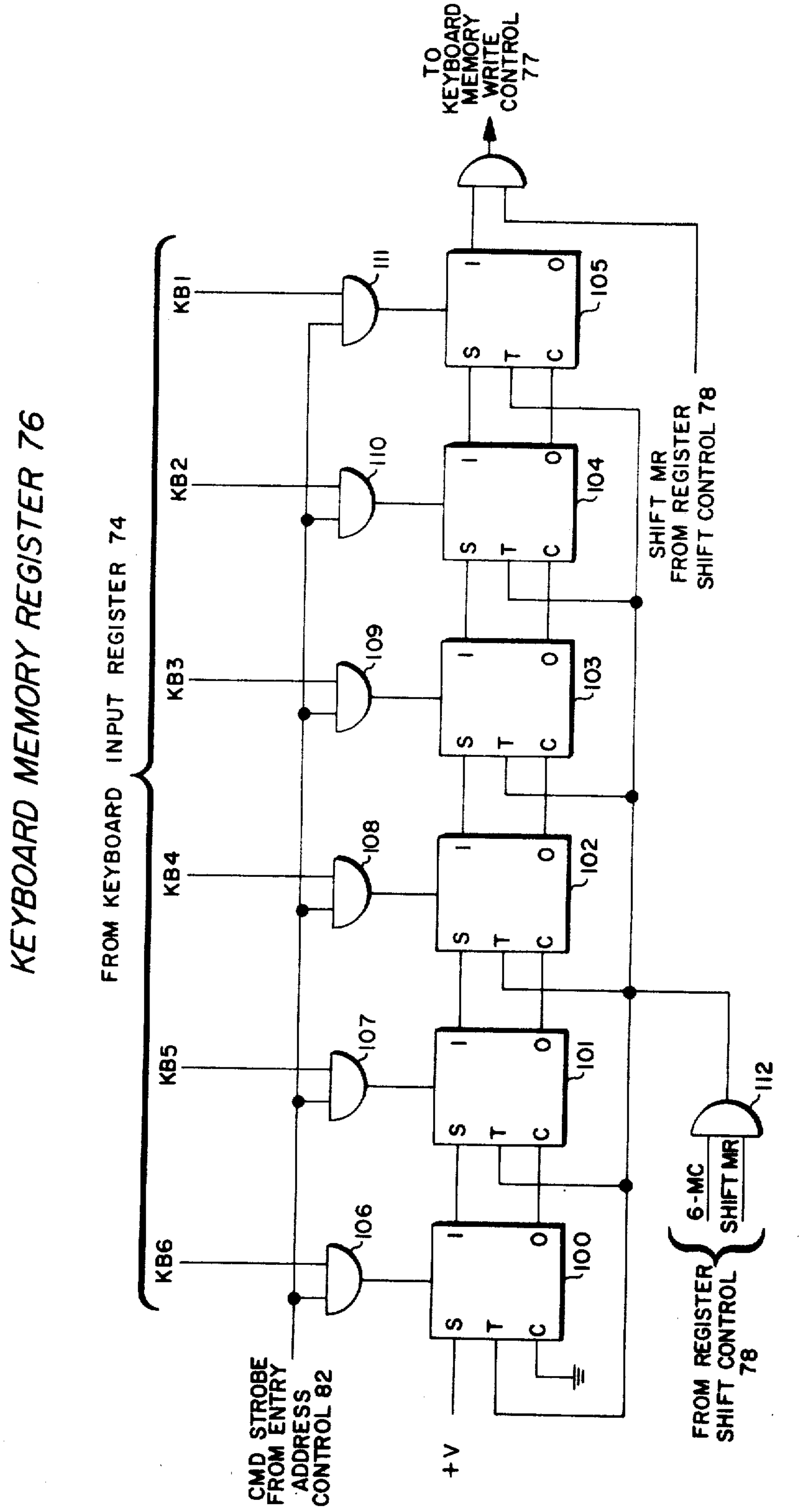
FIG. 15*a* illustrates in block diagram form details of the keyboard memory register.

The keyboard input register 74 is illustrated in simplified logic form in FIG. 15. The purpose of this circuit is to accept keyboard input data in seven bit serial format when enabled and to hold this data for decoding and parallel transfer, if applicable, to the keyboard memory register 76, under control of the command decoder 75.

Input signals to the keyboard input register 74 are KEYBOARD DATA signals from the keyboard input gates 73 and the CTS, CTS ENABLE, HORIZONTAL SYNC, CC63 signals from the display timing 44, and the 1MC clock signal from the timing logic shown in FIG. 8. Output signals from the keyboard memory register 76 are called KB1–KB7 and their complements, $\overline{KB1}$–$\overline{KB7}$.

When signals CTS, CTS ENABLE and CC63 are True, AND-gate 85 enables flip-flop 86 to be reset by the following 1MC clock pulse. When flip-flop 86 resets and signal CTS goes False, the CC63 signal pulses are transmitted through AND-gate 87. These pulses are the keyboard input register shift pulses, as shown in the figure. In addition, the three stage counter composed of flip-flops 88, 89 and 90 counts the shift pulses. When conjunction in AND-gate 91 occurs upon this three stage counter reaching the count of seven, flip-flop 86 is set, blocking the shift pulses from being transmitted to the flip-flops 92–99 of the keyboard memory register 76 and at the same time clearing the three stage counter.

The first signal or bit of data called KB1 arrives from a display terminal keyboard 20 immediately after signal CTS goes True and is applied to flip-flop 92. This flip-flop is triggered by the next horizontal synchronizing pulse. Output signals from flip-flop 92 are applied to the seven stage register comprising flip-flops 93–99 and shifted through these flip-flops by the output signals of AND-gate 87. As each bit arrives from the keyboard, it is stored in flip-flop 92 and before the next bit of information arrives from the keyboard, it is shifted to flip-flop 93. After seven shift pulses, when the cycle ends, the informaiton bit KB1 is stored in flip-flop 99, information bit KB2 is stored in flip-flop 98, etc. Flip-flop 92 is set by the first horizontal synchronizing pulse after keyboard data goes False and remains so until the next operating cycle. The seven stage register comprising flip-flops 93–99 then holds the keyboard input data, which is made available at its fourteen flip-flop output terminals labeled KB1–KB7 and $\overline{KB1}$–$\overline{KB7}$.

Keyboard memory register

The keyboard memory register 76 is shown in logic diagram form in FIG. 15*a*. This register holds data to be entered into memory until the proper memory location is at the data entry point in the delay line.

Input signals to the keyboard memory register 76 are the KB1 through KB6 signals received from the keyboard input register 74.

Register 76 comprises six flip-flops 100–105 arranged in normal shift register fashion. The six output signal lines from the keyboard input register 74 are gated by the output CMD STROBE signal from the entry address control 82. The gating of data into the keyboard memory register 74 is performed by AND-gates 106–111. The loading of the register is through the preset input terminals of each flip-flop as shown in the figure. The keyboard memory register 76 holds the data until the SHIFT MR signal goes True; the SHIFT MR signals is initiated by the output signal of the comparator 79 as will be shown later, indicating that the addressed memory location is emerging from the delay line and data is ready to be stored. This allows unloading of the register to memory in serial form at 6MC pulse rate. The 6MC shift pulses are provided by AND-gate 112 upon conjunction occurring therein.

Keyboard input gates

Figure 16:
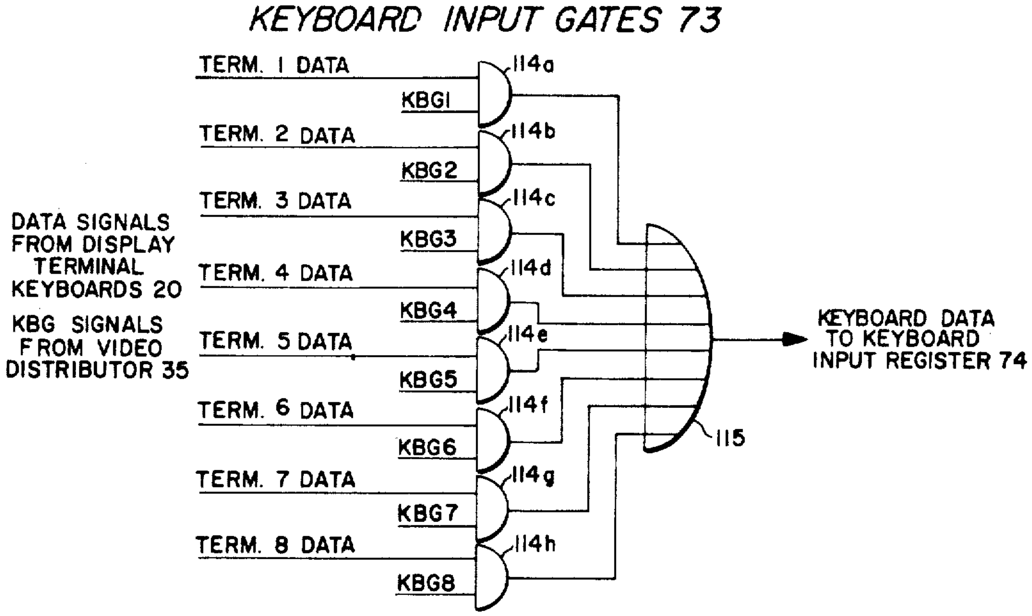
FIG. 16 illustrates diagrammatically the keyboard input gates and the associated timing logic.

FIGURE 16 illustrates the logic of the keyboard input gates 73. Each keyboard input data signal is transmitted to an input terminal of a different one of AND-gates 114*a*–114*d* where, in conjunction with keyboard input selection signals, one keyboard input is selected at a given time. These selection signals are shown in FIG. 16 as KBG1 through KBG8. The output signals of AND-gates 114*a*–114*d* are transferred through OR-gate 115. Since only one AND-gate can be enabled at a time, only the data from a given keyboard selected will be present at the output terminal of OR-gate 115.

Memory read gates

Figure 17:
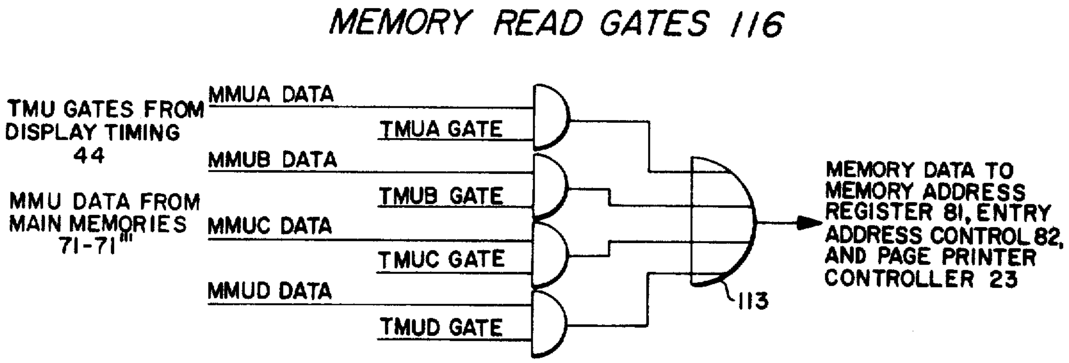
FIG. 17 illustrates in more detail the memory read gates in FIG. 14.

The function of the memory read gates 116 is to select the entry marker address stored in main memory for reading into the entry address register 81 and the entry address control 82. The memory read gates 116 are illustrated in FIG. 17 in logic form. As can be seen in the figure, the input signals to the memory read gates are stored data from each of the main memory units MMUA 71 through MMUD 71''' and the gating signals TMUA GATE through TMUD GATE select in sequence the data from each memory. The timing of this selection will be discussed more fully in the video distributor 35 description.

Keyboard memory write control

Figure 17A:
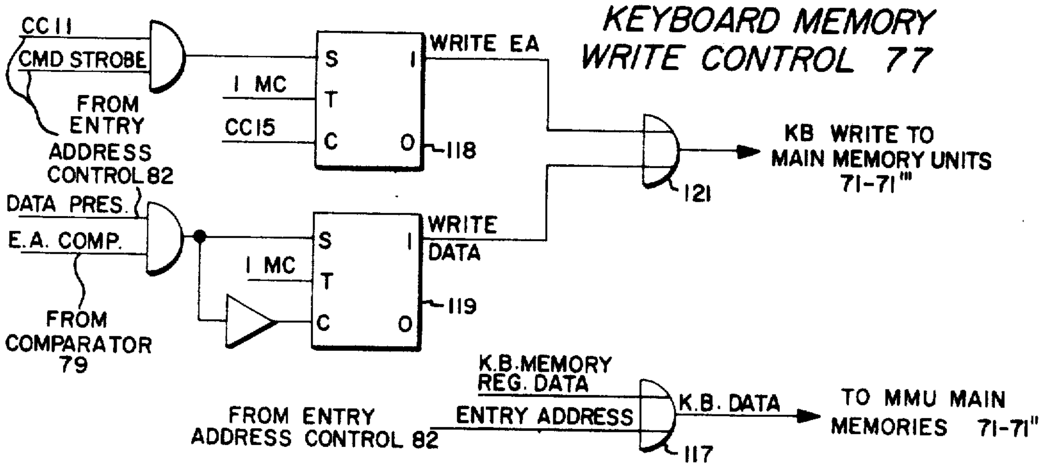
FIG. 17*a* illustrates in more detail the keyboard memory write control shown in FIG. 14.

The keyboard memory write control logic is shown in FIG. 17*a*. The keyboard memory write control 77 performs the functions of generating the KB WRITE signal for units writing data and entry address values into main memory units 71–71'''.

Data entry is made to memory through OR-gate 117. Keyboard memory register data and the entry address value, after being processed, return to memory via this gate. Flip-flop 118 generates the timing signals for the rewriting of the entry marker value while flip-flop 119 generates the timing signals for writing of new keyboard data into memory. Flip-flop 118 is set by the CMD STROBE pulse and character count CC11. The presence of these two signals enables AND-gate 120 which sets flip-flop 118. The setting of this flip-flop enables the KB WRITE signal via OR-gate 121. The entry address value is stored in character slots, corresponding to character counts CC11 through CC14. Therefore, CC15 clears flip-flop 118 after a new entry marker address has been rewritten.

The flip-flop 119 functions as a write data control and is set by the presence of the signals, EA COMP. and DATA PRES. The EA COMP. signal is generated when the comparator 79 makes a comparison between the entry address value stored in the entry address register 81 and the memory address count generated by the character counter 192 and the row counter 202 of the display timing 44.

Command decoder

The command decoder 75 determines whether a specific code contained in the keyboard input register 74 is a display character or a command, and if it is a command, decodes it into the specific command.

Input signals to the command decoder 75 are the fourteen lines from the keyboard input register 74 representing the seven bits of keyboard data and their complements. Output signals of the command decoder 75 are PR (Page Return), FS (Forward Space), BS (Back Space), CR (Carriage Return), LF (Line Feed), FF (Form Feed), and RLF (Reverse Line Feed).

Figure 18:
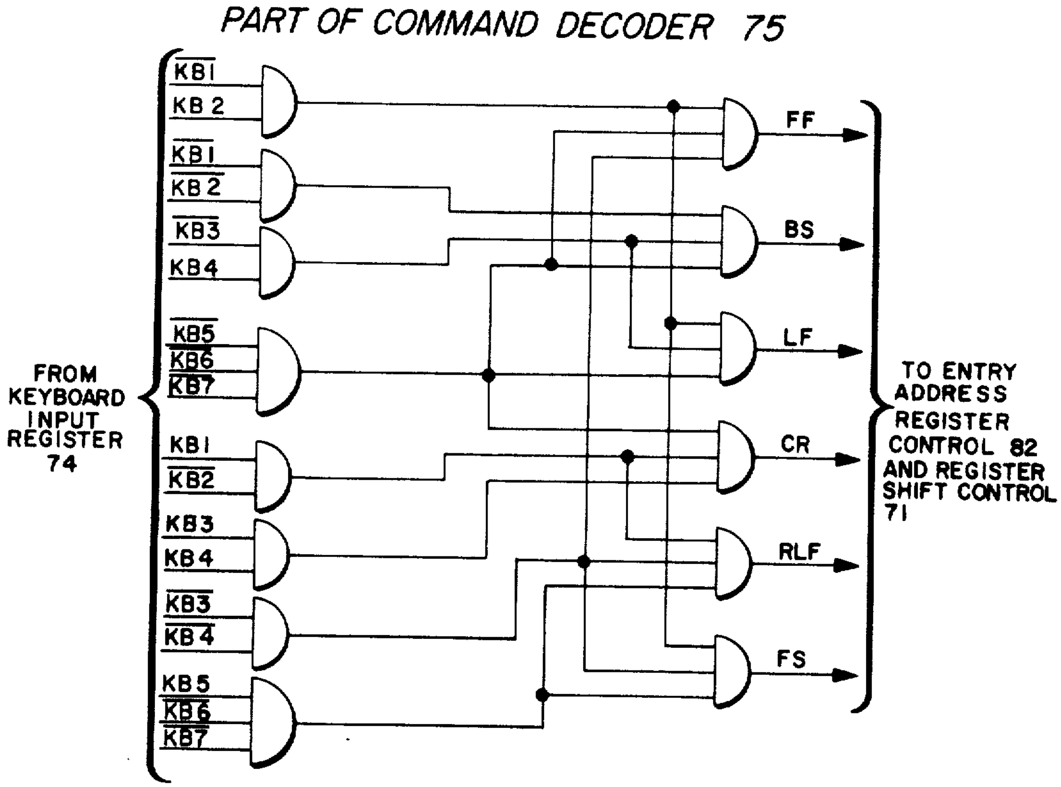
FIG. 18 illustrates in more detail a part of the command decoder shown in FIG. 14.

FIGURE 18 shows a portion of the command decoder logic as an example of how this logic is implemented. The command decoder 75 monitors all data passing through the keyboard input register 74. When data to be stored in the main memory units 71–71''' is received from any keyboard, it is recognized by the command decoder 75 as a print character. The command decoder 75 then informs the register shift control 78 that data to be stored is present in the KB memory register 76.

If the data accepted from the keyboard source is not a data character to be stored, but is a command requiring the manipulation of the entry address value, then one of the control signals FF, BS, LF, etc. is sent by the command decoder 75 to the entry address control 82, which causes the entry address to be modified accordingly.

Entry address control

The entry marker address identifies the next memory location in sequence to be addressed. Consequently, with each entry of a display character to memory, the entry marker address must be incremented by one. At the end of each row, or the end of the last row of a memory segment, the increment must be such as to bring the entry marker to the start of the next line or the start of the memory segment. Additionally, operator control of marker position by way of the Forward Space, Back Space, Line Feed, Carriage Return and Page Return controls must be provided.

Figure 19:
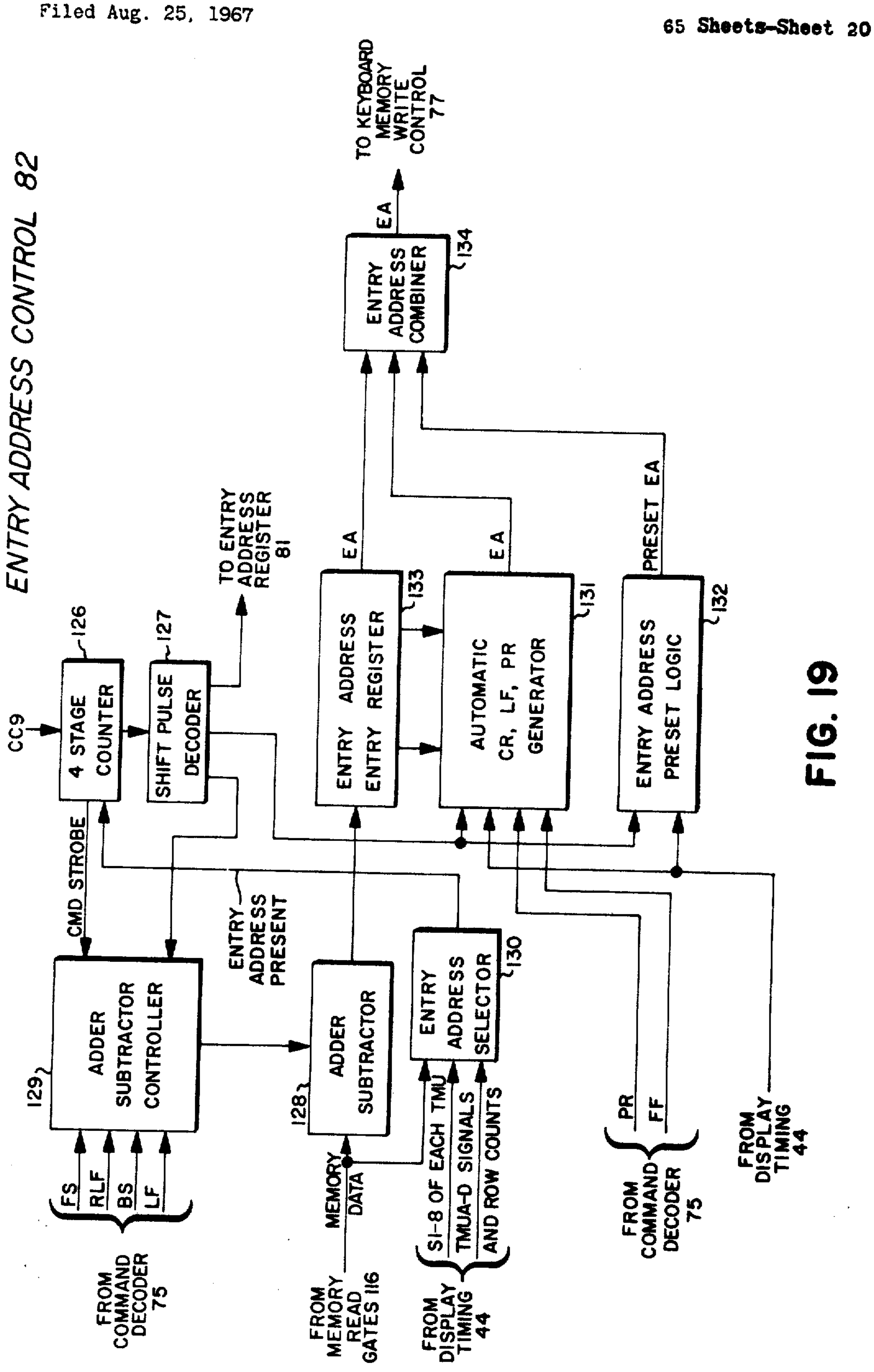
FIG. 19 illustrates in block diagram form the entry address register control shown in FIG. 14.

All these functions are accomplished by the entry address control 82 circuits. These circuits include the adder/subtracter controller 129, the 4 stage counter 126, shift pulse decoder 127, the adder/subtractor 128, the entry address entry register 133, the automatic CR, LF, PR generator 131, the entry address preset logic 132, and the entry address combiner 134. These functions are illustrated in FIG. 19.

Each of the entry address control circuits is discussed separately in subsequent paragraphs. Their individual functions, however, become more easily understood when examined as an interconnected group. The entry marker address is stored at the beginning of each memory segment as a 12 bit binary number. This number is loaded into the entry address register 81 when selected by the entry address selector 130. At the same time the number is being loaded into the entry address register, it passes through the adder/subtracter 128 and returns to main memory units 71–71'''. Previously, the adder/subtracter controller 129, acting on the basis of information from the command decoder 75, has determined if modification of the number is to be performed. The adder/subtractor 128 then either modifies the number to reflect any desired increment or decrement, or passes the number unmodified. In either event, this number is loaded into the entry address register 81, and thence shifted back into the memory segment to replace the old entry marker address. All these operations occur in the reading of the entry marker address from memory and the rewriting of the entry marker address to main memory.

The entry address control 82 comprises the 4 stage counter 126. The outputs of this counter are decoded by the shift pulse decoder 127 into a plurality of different shift pulses and a shift signal SFT EA which is transmitted to the entry address register 81.

The adder/subtracter control 129, upon signals from the command decoder 75, either adds or subtracts from the value of the entry marker address being read from memory. The addition or subtraction is in accordance with the command decoded by the command decoder 75.

The automatic CR, LF, PR generator 131's main function is to reset the entry marker when it has reached the end of a row to the beginning of the next row as well as reset the entry marker when it has reached the end of the page to the beginning of the page. It performs this function by erasing the old value and writing a new value of entry marker address into memory.

The function of the entry address preset logic 132 is to establish the initial values of entry address. It accepts inputs from the display timing logic which selects where each entry address is to be stored in memory and shift pulse outputs from the shift pulse decoder 127 which operate together to write the initial entry address values.

Entry address selector

Figure 20:
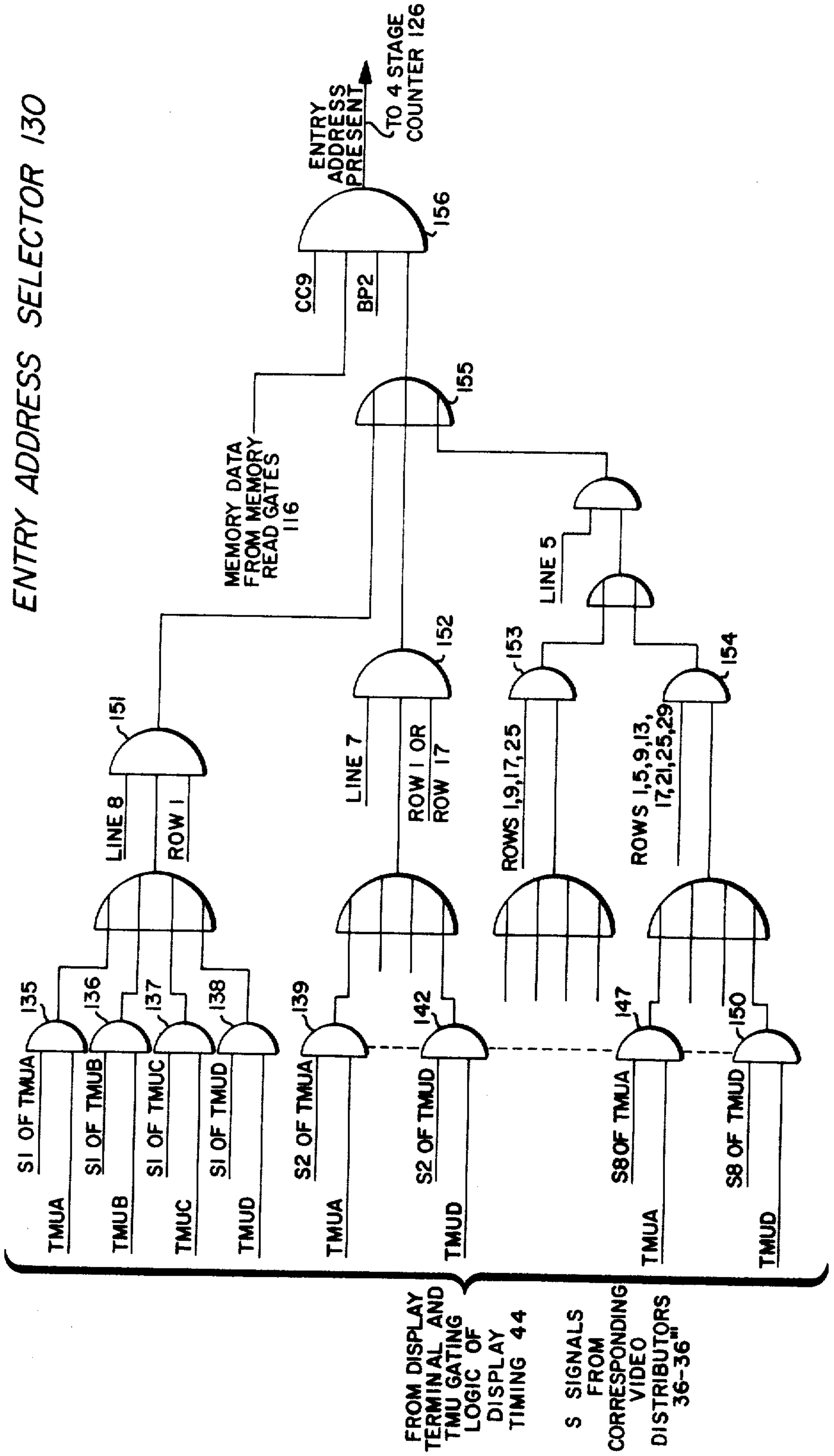
FIG. 20 illustrates in more detail the entry address selector shown in FIG. 19.

The logic of the entry address selector 130 is shown in part by FIG. 20. Illustrated is the necessary selection logic used to select each entry address value from memory in sequence. Also this figure illustrates how by switch selection the entry address storage location is selected in accordance with a given memory partitioning.

The TMUA through TMUD timing signals operate to process data received from keyboards attached to each terminal memory unit one at a time. Notice that each TMU timing signal appears four times in the figure. For example, signal TMUA is transferred with a signal S1 of TMUA representative of a switch or jumper connection to AND-gate 135, with signal S2 of TMUA to AND-gate 139, with signal S4 of TMUA to an AND-gate (not shown by this figure) and with signal S8 of TMUA to AND-gate 147. Thus, when terminal memory unit A is to be selected for entry address extraction, signal TMUA is True and whichever S jumper setting is connected, either AND-gates 135, 139, 143 (implied) or 147 is enabled. Whichever of these AND-gates is selected determines which of AND-gates 151, 152, 153 or 154 is selected. AND-gates 151 through 154, in turn, combine these selection signals with memory row count signals corresponding to where the entry marker address values are stored.

The number of entry marker values stored in a given terminal memory unit is a function of which S jumper is connected. For example, S1 partitions the TMU for one 26 line display and only one entry marker address value is stored; S2 partitions the TMU for two 16 line displays so two entry marker address values are stored; S4 partitions the TMU for four 8 line displays so four entry marker address values are stored; and S8 partitions the TMU for eight 4 line displays so eight entry marker address values are stored.

Referring to FIG. 20 again, the output signals of AND-gates 151 through 154 are transmitted through OR-gate 155. Therefore, the output signals of OR-gate 155 appear as a train of timing pulses whose pattern is dependent upon which S jumper is connected.

For example, if S1 of TMUA is True, then during TMUA, only one pulse will appear out of OR-gate 155. If S2 of TMUA is True, then during TMUA, two pulses occur, one during row 1 and one during row 17. If S4 of TMUA is True, then during TMUA, four pulses occur, during rows 1, 9, 17 and 25. If S8 of TMUA is True, then during TMUA, 8 pulses occur, during rows 1, 5, 9, 13, 17, 21, 25 and 29.

In a similar manner, the output signals of OR-gate 155 are dependent upon the S jumper settings for each of the other terminal memory units TMUB–TMUD during their corresponding timing periods.

The output signals of OR-gate 155 serve as input signals to AND-gate 156. The output signal pulses of OR-gate 155 are each one memory row in duration. When each of these signals is transmitted to AND-gate 156 with character count signals CC9, conjunction occurs in AND-gate 156 and the resulting output signal represents a single character time in that memory row. The presence of signal BP2 (similar to signal SP2) selects a single bit time of that character time. It is during this particular bit time that a bit indicating the presence of entry marker address is stored. So the combination of these signals with memory data from the memory read gates 116 in AND-gate 156 results in an ENTRY ADDRESS PRESENT signal being generated indicating that an entry address value may be selected for processing.

4 stage counter

Figure 21:
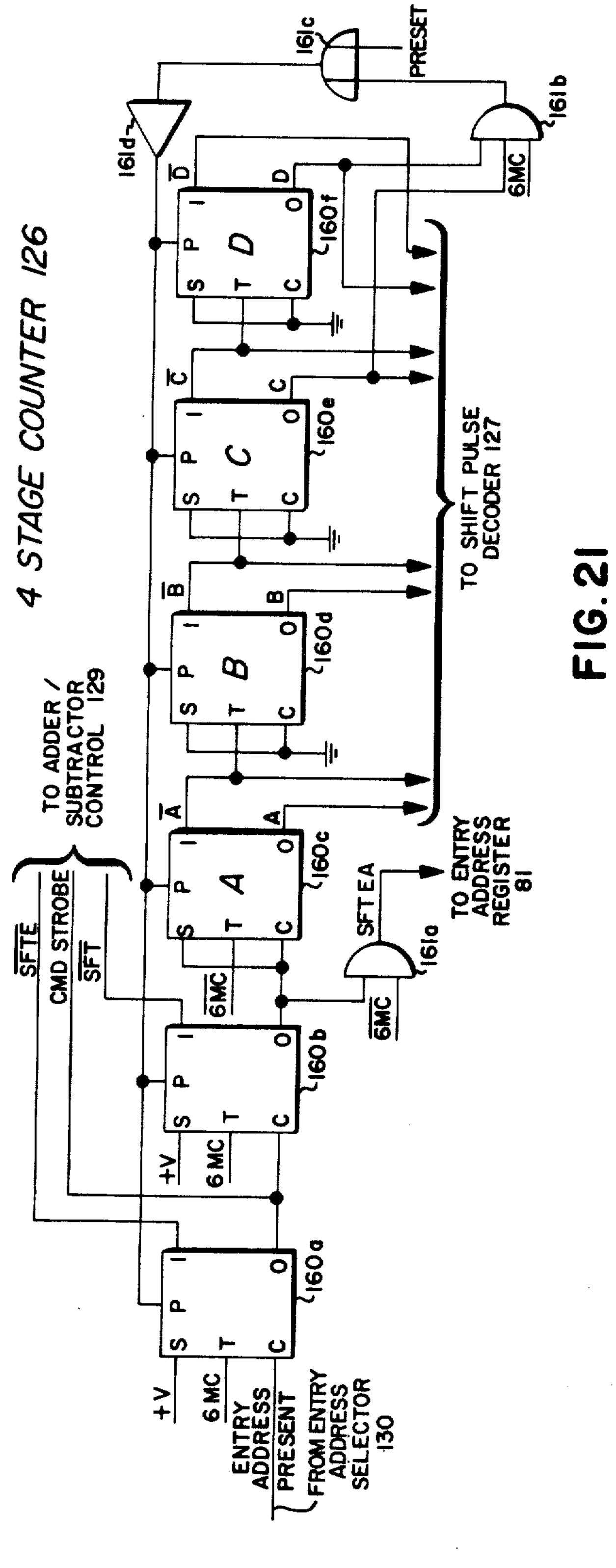
FIG. 21 illustrates in more detail the 4 stage counter shown in FIG. 19.
Figure 21D:
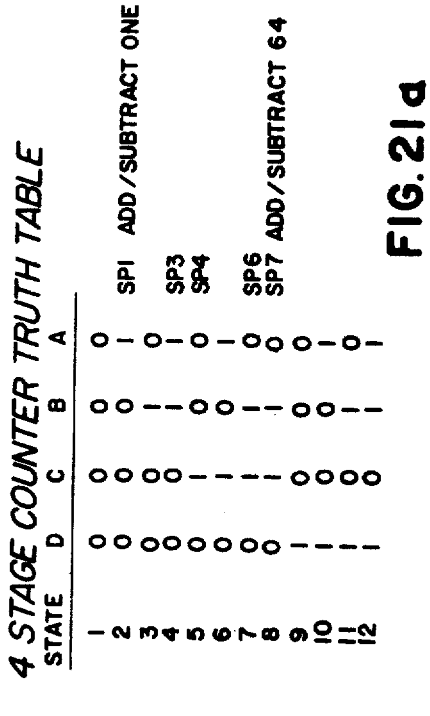
FIG. 21*a* is a chart illustrating a truth table for the 4 stage counter shown in FIGS. 19 and 20.

FIGURE 21 is a simplified logic diagram of the 4 stage counter 126 shown in FIG. 19. Counter 126 produces the SFT EA signals which shift the entry address from memory into the entry address register 81. This counter also generates the CMD STROBE and $\overline{\text{SFT}}$ control signals for incrementing or decrementing the entry address value. The 4 stage counter comprises a pair of flip-flops 160*a*–160*b* logically interconnected as shown in FIG. 21 with flip-flops 160*c*–160*f* serving as the 4 stage counting elements. Counter 126 counts through the twelve states, shown in the truth table illustrated in FIG. 21*a*, each time it is energized. The counter is energized and the shift sequence initiated when the ENTRY ADDRESS PRESENT signal goes True.

Figure 22:
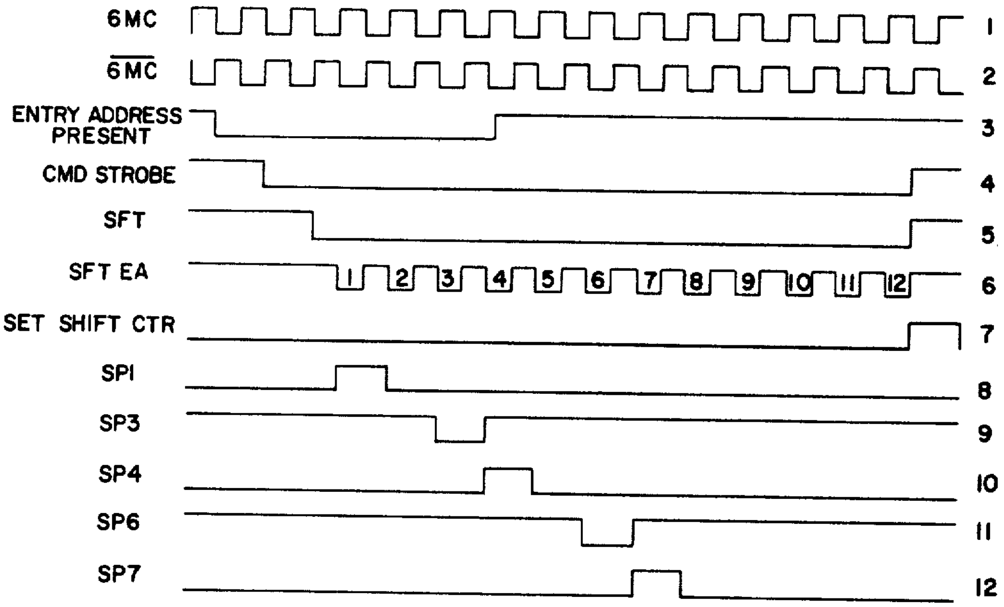
FIG. 22 is a timing diagram illustrating the relationship of the various signals generated by the 4 stage counter and shift pulse decoder shown in FIGS. 19, 21 and 23.

FIGURE 22 illustrates a pulse counting and timing chart for the SFT EA signals. When the signal ENTRY ADDRESS PRESENT goes True (waveform 3, FIG. 22), it resets flip-flop 160*a* of FIG. 21 at the time of the next 6MC clock pulse. The normal state of flip-flop 160*a* is set, transferred to that state by power turn-on (PRESET) or by the twelfth shift pulse of the preceding sequence of the 4 stage counter 126.

When flip-flop 160*a* is cleared, the CMD STROBE signal is generated when its 0-output terminal is True (see waveform 4 of the timing chart). Since the 0-output terminal of flip-flop 160*a* is connected to the clear input terminal of flip-flop 160*b*, flip-flop 160*b* is reset upon the receipt of the next 6MC clock pulse at its trigger terminal T. When flip-flop 160*b* is reset, the SFT signal is True (waveform 5 of the timing chart) and that portion of the shift counter comprising flip-flops 160*c*, 160*d*, 160*e* and 160*f* is enabled to begin the counting sequence.

The 0-output terminal signal SFT from flip-flop 160*b* is applied with the $\overline{\text{6MC}}$ clock signal (waveform 2 of the timing chart) to AND-gate 161*a* resulting in conjunction therein and the generation of the SFT EA pulse signal (waveform 6 of the timing chart). These pulses advance in time sequence the entry address register 81 while it is accepting the entry address value from memory.

Figure 23:
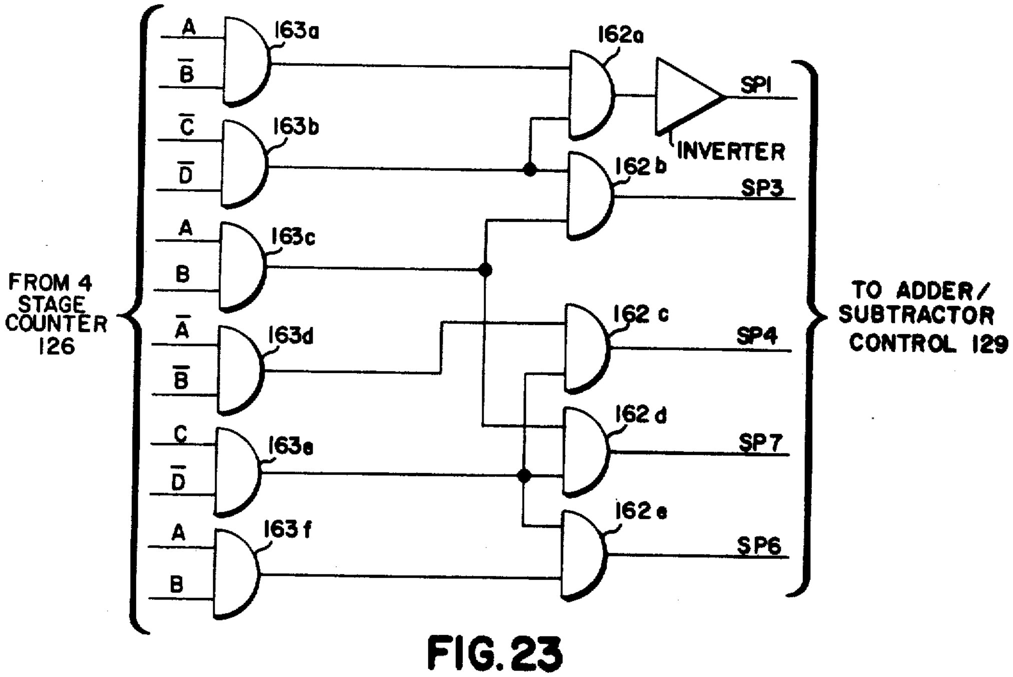
FIG. 23 illustrates in logic diagram form the shift pulse decoder shown in FIG. 19.

The 4 stage counter 126 also counts cycles of the $\overline{\text{6MC}}$ clock pulses and its count is sensed by a plurality of output gates shown in FIG. 23 which provide signals representing counts 1, 3, 4, 6 and 7.

When counter 126 reaches a count of 12, conjunction occurs in AND-gate 161*b* resulting in the generation of an output signal which is applied through OR-gate 161*c* and amplifier 161*d* to the preset terminals of flip-flops 160*a*–160*f* causing the counter flip-flops 160*c*–160*f* and flip-flops 160*a* and 160*b* unconditionally to preset to their 1-states.

The waveforms in lines 8 through 12 of FIG. 22 illustrate the timing relationship of signals SP1, SP3, SP4, SP6 and SP7 which are generated by the shift pulse decoder 127 shown in FIG. 23.

Shift pulse decoder

FIGURE 23 illustrates in detail the logic circuitry of shift pulse decoder 127 with the output signals from AND-gates 162*a*–162*e*, namely, signals SP1, SP3, SP4, SP6 and SP7 being used in the generation of ADD/SUBTRACT commands by the adder/subtractor control 129. These signals are the result of conjunction occurring therein of the various output signals from AND-gates 163*a*–163*f*. The input signals to AND-gates 163*a*–163*f* are the signals from the 1- and 0-output terminals of flip-flops 160*c*–160*f* shown in FIG. 20 and forming the 4 stage counter 126. As seen in FIG. 23, the shift pulse decoder 127 is simply a four bit decoder which decodes flip-flops 160*c*, 160*d*, 160*e* and 160*f* at appropriate times.

Adder/subtracter control

Adder/subtracter commands of the adder/subtracter control 129 are generated by any command code (except CR, PR or TAB signals) which generate movement of the entry marker on the display, i.e., by FS, BS, LF or RLF signals. These signals are generated by the entry of any command code from any keyboard source 20 or the processor 19.

The movement commands are detected in the keyboard input register 74 by the command decoder 75 as described hereinbefore, with reference to FIG. 14, and are then applied to various control gates to define the distance of movement (space or line) and the direction to be moved (forward or reverse) of the entry marker on the display.

Figure 24:
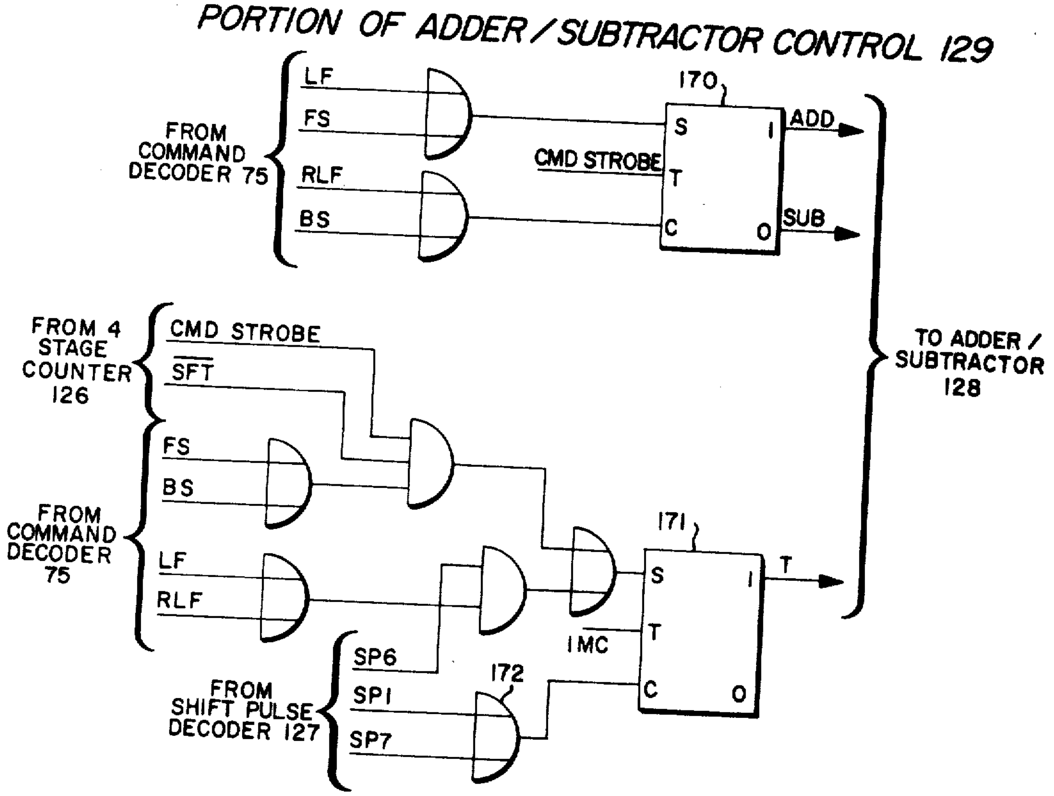
FIG. 24 illustrates in more detail the logic circuitry forming a part of the adder/subtracter control shown in FIG. 19.

Flip-flops 170 and 171 are set or reset as indicated by the logic circuitry shown in FIG. 24. The CMD STROBE signal transmitted to the trigger terminal of flip-flop 170 performs the set or reset action of this flip-flop, according to the input terminal enabled. Flip-flop 171 is triggered by a 1MC clock pulse. If flip-flop 171 is set at the time a CMD STROBE signal is applied to flip-flop 170, it is reset at the time the SP1 signal is transmitted through OR-gate 172 to the C terminal of the flip-flop 171 to reset it. If flip-flop 171 is set at the time of the generation of the SP6 signal, it is reset by the SP7 signal through OR-gate 172. Thus, flip-flop 171 is normally in its reset state. When it is in its set condition, a digit is to be added into the entry address register 81.

Entry address preset logic

Figure 25:
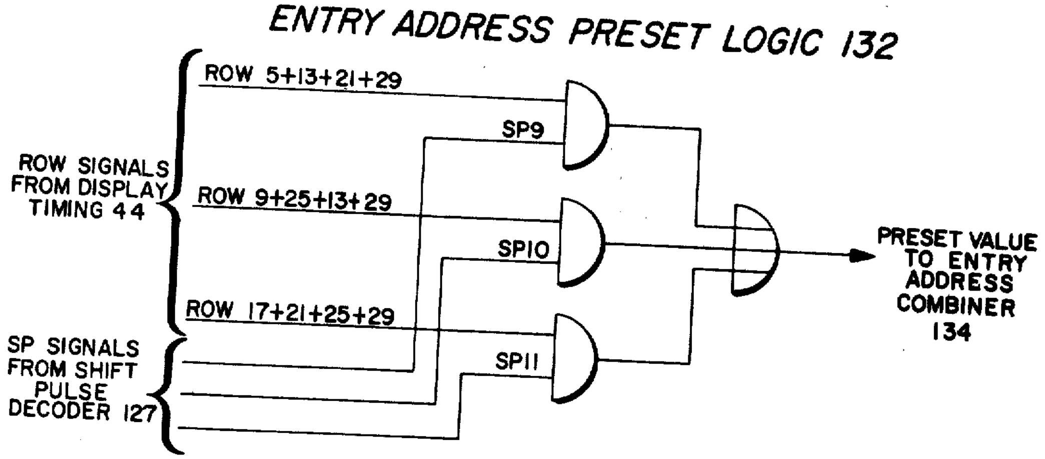
FIG. 25 illustrates the preset logic for the entry address register shown in FIG. 19.

FIGURE 25 is a detailed diagram of the entry address register preset logic 132 which is a part of the entry address control 82. This logic is continuously writing into memory the three most significant bits of all entry marker address values stored. The continuous rewriting of these bits guarantees that the entry marker address of any given terminal will be restricted to a range of values corresponding to the number of memory rows in use by that terminal. The restriction in the range of values of the entry marker address forces the entry marker symbol to always be displayed on a given display. That is, if the operator, when his entry marker is displayed on the last line of his display, initiates a line feed operation, the entry marker will automatically return to the top line of his display.

The following example illustrates how this effect takes place. As shown in the memory partitioning diagram of FIG. 10*a*, entry marker address values are stored in memory rows which are opposite display rows and marked by an asterisk. If, for example, the partitioning is set up by the existence of jumper S8, the memory is partitioned into eight segments to drive eight display terminals DT1–DT8 and there are eight different entry marker address values stored. The data displayed by display terminal DT1 is stored in memory rows 1–4; terminal DT2's data is stored in memory rows 5–8, etc., as illustrated in FIG. 10*a*. Therefore, when the entry marker address value stored for terminal DT1 is such that the entry marker symbol displayed appears on display row 4 of terminal DT1's display (memory row 4), its high order bits corresponding to memory row (AR11–AR07) are 00011 in binary representation. If the operator of display terminal DT1 then performs a line feed operation (adding one row count to the entry marker value), the entry address would be updated to memory row 5 (or 00100) except that the entry address preset logic overrides bits AR11, AR10 and AR09 forcing them to 000, thus changing the updated address to 00000 or memory row 1. Therefore, instead of the entry marker symbol ending up on memory row 5 which is terminal DT2's display row 1 (see FIG. 10*a*), it returns to display row 1 of terminal DT1 where it should be.

To illustrate this further, suppose jumper S4 is in place. This means that the memory is partitioned into four 8 row displays. Assume that terminal DT3 transmits a line feed code when the entry marker symbol is on the last row of the display (memory row 24 or binary 10111 for bits AR11–AR07). Adding binary 1 to memory row address 10111 produces binary number 11000 which is memory row 25, but the entry address preset logic converts AR11–AR09 to 100 or the entry address binary value 10000 which is memory row 17 or terminal DT3's display row 1.

Referring again to FIG. 10*a*, it is evident that for the S1 jumper setting, where the memory is partitioned for one 26 row display, the entry address preset logic does not return the marker after the last (26th) row.

Automatic CR, LF, PR generator

Figure 26:
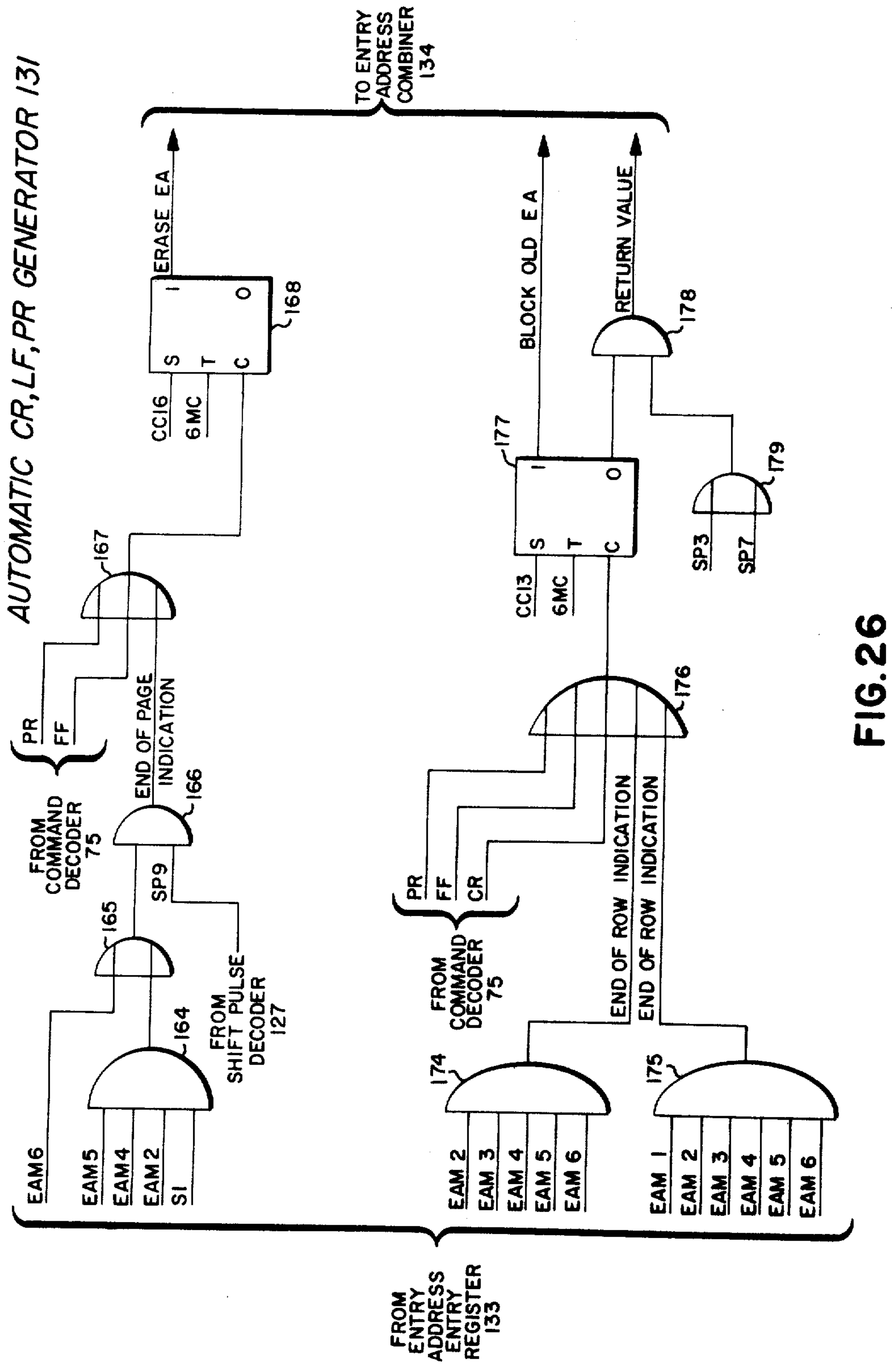
FIG. 26 illustrates in detail the logic circuitry of the automatic CR, LF and PR signal generator.

To take care of this case, the upper logic shown in FIG. 26 operates such that a row count equal to or greater than 27 generates an automatic PR (Page Return) signal. The return of the entry marker to display row 1, after it has passed display row 26, confines the entry marker to the 26 memory rows as can be seen in FIG. 10*a* for a True S1 jumper signal.

As seen in the upper logic of FIG. 26, AND-gate 164 receives the output signals from the entry address entry register 133 to decode the count if jumper signal S1 is True. In the figure, signal EAM5 represents an entry address bit which corresponds to signal AR11 of the row and character counters 192 and 193 of the display timing 44; signal EAM4 corresponds to signal AR10, and signal EAM2 corresponds to signal AR08. Thus, for the count of memory row 27, conjunction will occur in AND-gate 164 and it will provide a True output signal. See FIG. 10*a* for correspondence of bits at memory row 27. Signal EAM6 is actually a signal representing the bit condition of AR12 which is not shown in FIG. 10*a* but is a 1 for memory row count 33. Thus, OR-gate 165 will have a 1-output signal for memory row 27 or memory row 33. The transmitting of the 1-output signal of OR-gate 165 and the True output signal SP9 to AND-gate 166 causes conjunction to occur therein with AND-gate 166 generating an end of page signal indication. It is during bit time SP9 that the entry address entry register 133 contains the entry address value with signals EAM5, EAM4 and EAM2 representing the bit condition just defined.

The END OF PAGE INDICATION signal transmitted through OR-gate 167 clears flip-flop 168. The output signal of flip-flop 168 is an ERASE EA signal which is transmitted to the entry address combiner 134 to clear or erase the entry address value. The complete erasure of the entry address value stored in memory coupled together with the action of the entry address preset logic 132 as previously described causes the entry marker to return to the first line of the display.

Figure 36:
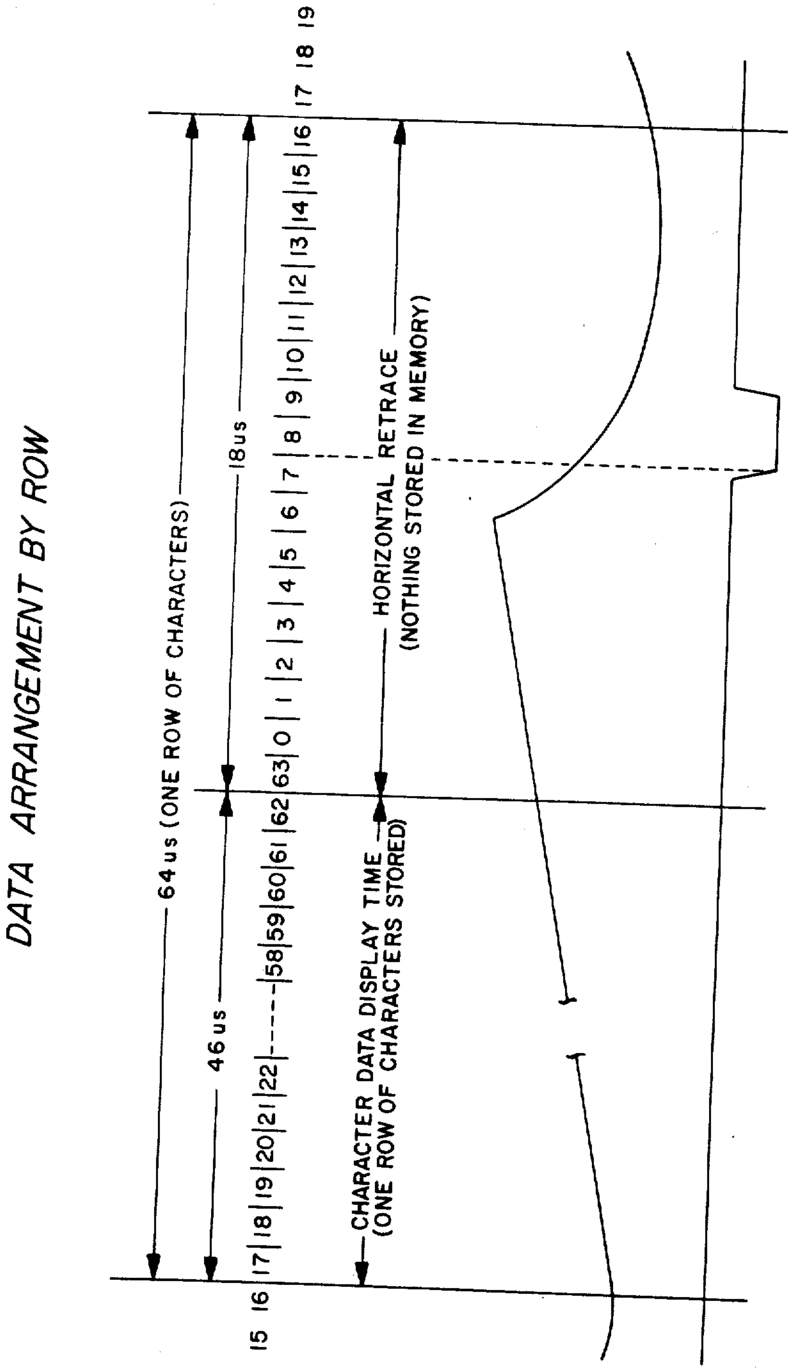
FIG. 36 diagrammatically illustrates the arrangement of data in memory by rows.

From the command decoder 75, the PR and FF signals are transmitted through OR-gate 167 to create the same END OF PAGE INDICATION signal. In the bottom portion of FIG. 26, AND-gates 174 and 175 decode the character count corresponding to the END OF ROW INDICATION signal. This signal transmitted through OR-gate 176 clears flip-flop 177 until signal count CC13 occurs when flip-flop 177 is set again. During the time that flip-flop 177 is reset, the stored value of the entry address is blocked. During the time that flip-flop 177 is cleared, AND-gate 178 is enabled by shift pulses SP3 and SP7 through OR-gate 179. AND-gate 178 transmits a RETURN VALUE signal. The RETURN VALUE signal is the character address which defines the location of the first displayed character in a row. That is, when SP3 and SP7 True signals are transmitted through OR-gate 179, they form character count 17 which corresponds to display position 1 on any given line (FIG. 36).

The operation of the commands PR, FF and CR from the command decoder also causes the same reaction in flip-flop 177.

Figure 27:
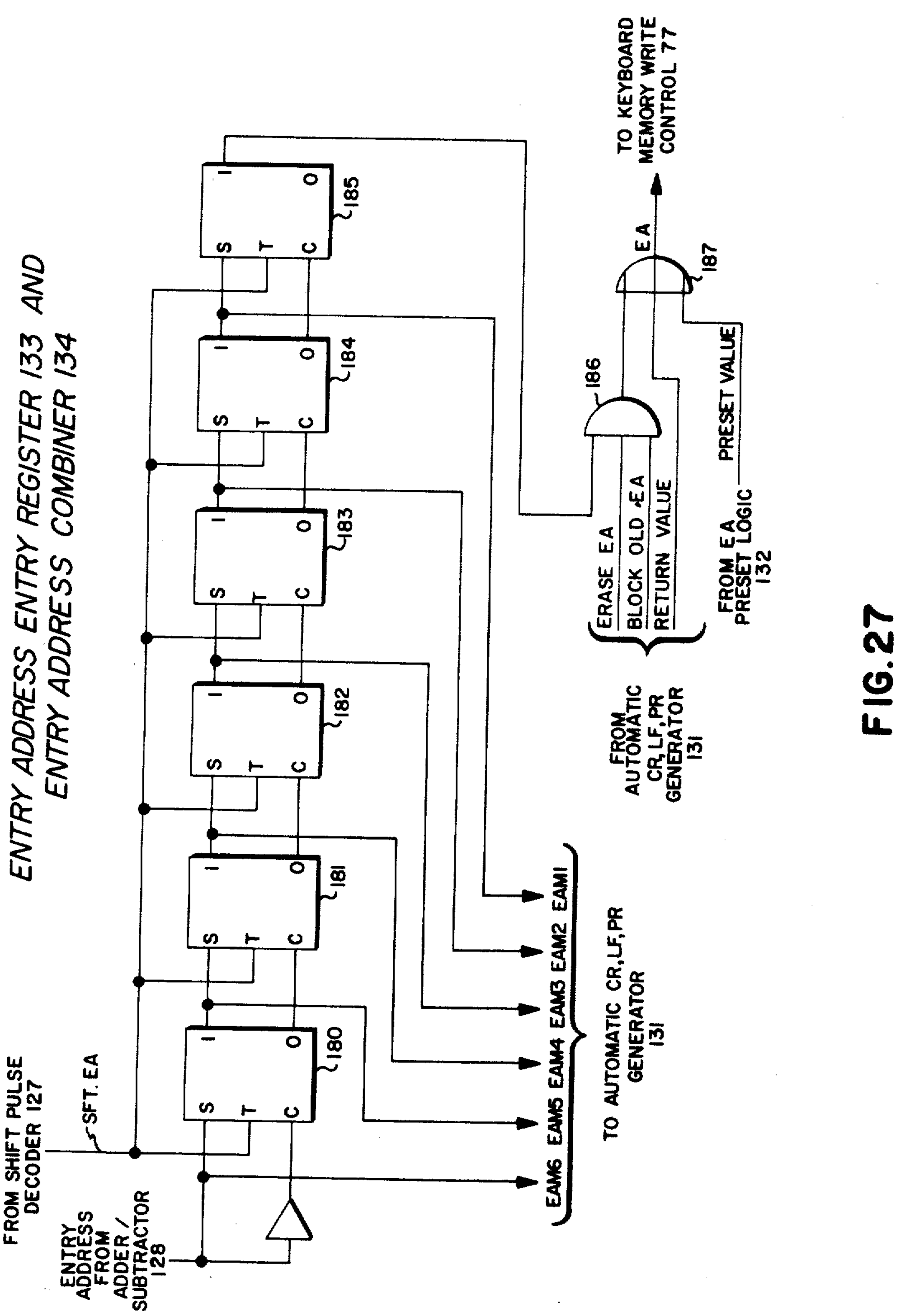
FIG. 27 illustrates in detail the entry address entry register and entry address combiner.

The BLOCK OLD EA and RETURN VALUE output signals shown in FIG. 26 are input signals to the entry address combiner 134 which is shown in detail in FIG. 27. The entry address value shifting through the entry address entry register 133, flip-flops 180 through 185, returns to memory via AND-gate 186 and OR-gate 187. It is through AND-gate 186 that the entry address value returning to memory can be completely erased (in the case of Page Return command) or blocked during the character address portion of the entry address value for the Carriage Return command. Notice that the RETURN VALUE signal bit configuration is transmitted with the entry address value through OR-gate 187. This takes place when the BLOCK OLD EA command signal occurs blocking the character count portion and inserting a new value corresponding to the display character count 1. It is also through OR-gate 187 that the EA preset logic 132 transmits the fixed bit configurations as previously described.

Entry address entry register

The entry address entry register 133 actually serves two functional purposes. It provides a delay during which up to six bits of the entry address stored may be monitored before it returns to memory so that it may be blocked or modified as required. It also performs the function of providing the six most significant or six least significant bits of the entry address value in parallel for easy decoding.

Adder/subtracter

The adder/subtracter 128 performs the function of adding or subtracting one or 64 to the entry address value when the entry address is shifted through the adder/subtracter.

Figures 28, 29:
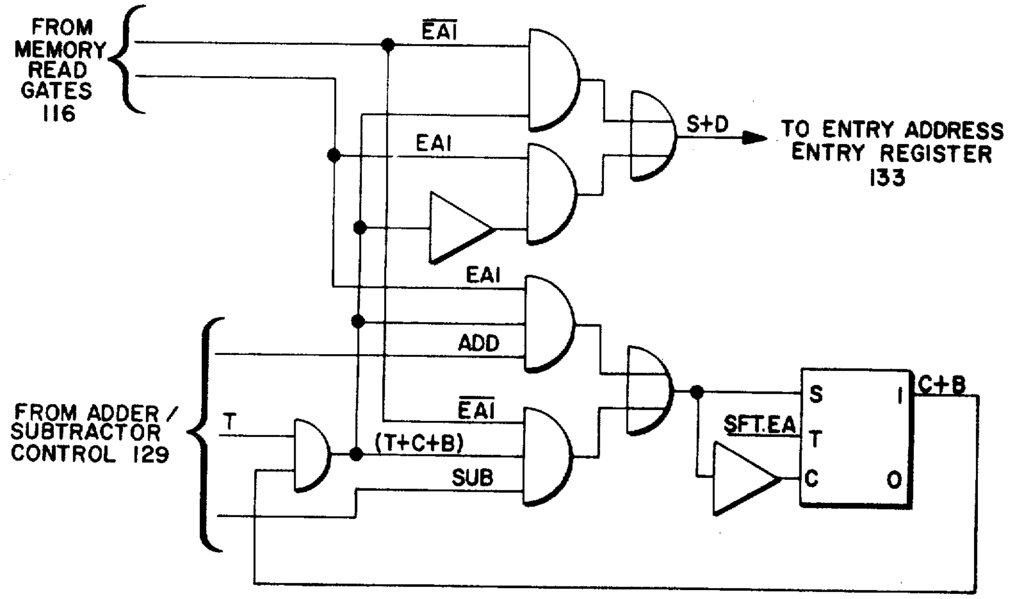
FIG. 28 is a chart illustrating a truth table for the adder/subtracter structure shown in FIGS. 19 and 29.
FIG. 29 illustrates in more detail the logic circuitry of the adder/subtracter shown in FIG. 19.

FIGURE 28 is a logic truth table of the adder/subtracter 128 shown in FIGS. 19 and 29. This table defines the sum or difference $(S+D)$ and carry or borrow $(C+B)$ output signals of the adder/subtracter for every possible combination of input signals. That is, given any combination of input signals, as shown in the truth table, the output signals $(S+D)$ and $(C+B)^{N+1}$ must take on the values shown if this circuit is to be a true adder/subtracter function. The X conditions given as output signals in the table indicate output conditions which will never occur by definition. For example, it is not possible to have a carry or borrow condition at the time of the T input signal, since the T input signal initiates the add or subtract process and a carry or borrow output signal cannot occur until after the process is started.

From this table can be derived the sum or difference output equation:

$$(S+D)=(EA1)[(C+B+T)]+(EA1)(\overline{T})(\overline{\overline{C}+B})$$

since $$T(\overline{\overline{C}+B})=\overline{T+\overline{C}+B}$$

this equation also takes the form $$(S+D)=(\overline{EA1})(T+C+B)+(EA1)(\overline{T+\overline{C}+B})$$

similarly, the carry or borrow output equation, $$(C+B)^{N+1}=(\text{ADD})(EA1)(C+B)+(\overline{EA1})(\text{SUB})(C+B)+(T)(\text{ADD})(EA1)+(T)(\text{SUB})(\overline{EA1})$$

reduces to, $$(C+B)^{N+1}=(T+C+B)[(\text{ADD})(EA1)+(\text{SUB})(\overline{EA1})]$$

When implemented by logic, these two equations form the logic circuitry shown in FIG. 29.

Entry address register

Figure 30:
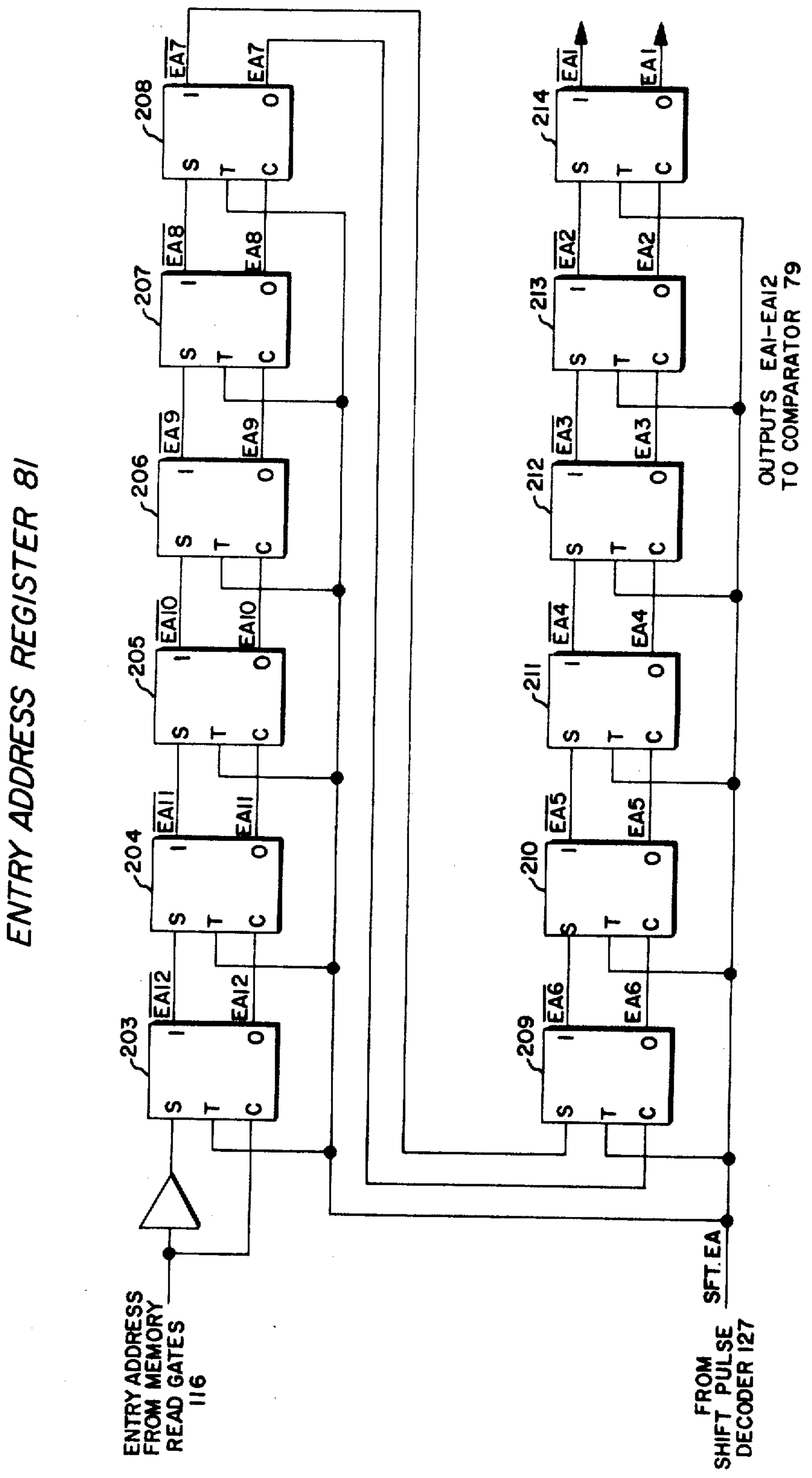
FIG. 30 illustrates in detail the logic circuitry of the entry address register shown in FIG. 14.

FIGURE 30 is a detailed diagram of the entry address register 81. This register is a conventional 12-digit shift register comprising twelve flip-flops, numbered 203 through 214. The register is loaded serially from the memory read gates 116. Its output signals EA1–EA12 and $\overline{\text{EA1–EA12}}$ drives the comparator 79. Shifting of this register is accomplished by a signal from the shift pulse decoder 127 of the entry address control 82.

The entry address register 81 stores the entry address value until a comparison is made with the memory row and character counters 322 and 193 output signals. When this comparison is made, it designates the memory location that is to be written into next which is now present at the memory output terminals.

Comparator

Figure 30A:
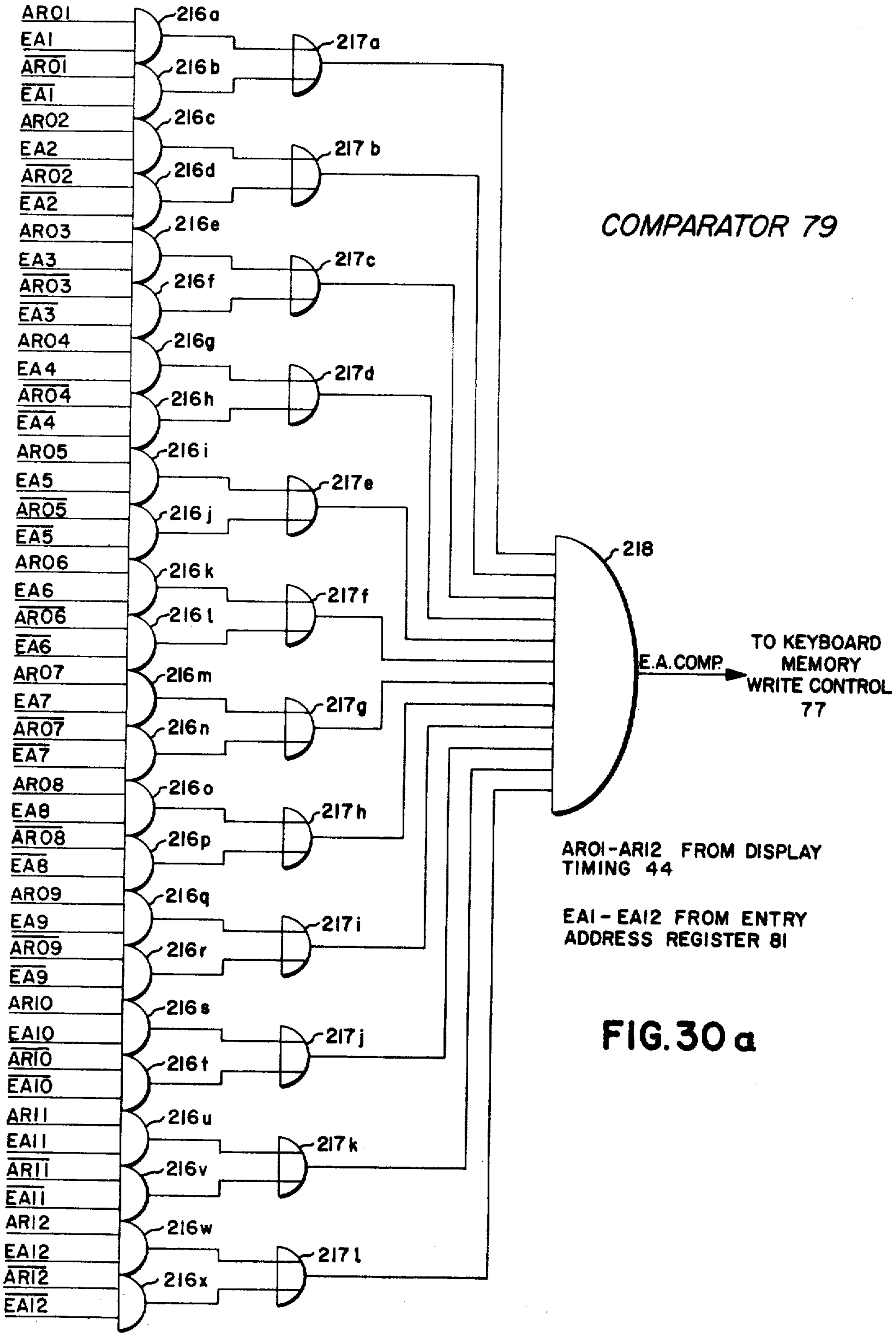
FIG. 30*a* illustrates in detail the logic circuitry of the comparator shown in FIG. 14.

All output signals of the entry address register 81 are monitored in parallel by comparator 79 and are compared bit by bit with the output signals of the memory address count (MAC) generated by the memory row and character counters 322 and 193 of the display timing 44. FIGURE 30*a* illustrates the logic of this comparator. All signals with the EA preface transferred to the input terminals of AND-gates **216*a*–216*x* are from the entry address register 81 shown in FIG. 30 and all signals with the AR preface are from the display timing 44. Output signals from these AND-gates, upon conjunction occurring therein, are applied through OR-gates 217*a*–217*l*, as shown, to input terminals of AND-gate 218. Note that the output signal of AND-gate 218 is the signal used to trigger the KB memory write control 77** generated by the logic of FIG. 17*a*.

An EA COMP. signal is generated when all of the AR bits have the same state as all of the corresponding EA bits. That is, when the binary value of the entry address register 81 is equal to the binary value of the memory row and character counters of the display timing 44.

Keyboard logic

Source 20 of FIG. 1, hereinafter referred to as the keyboard, is a device for the generation of binary coded data which serves as a manual input device to the multiple terminal data editing display system. The key layout arrangement of the keyboard is illustrated in FIG. 4.

Figure 31:
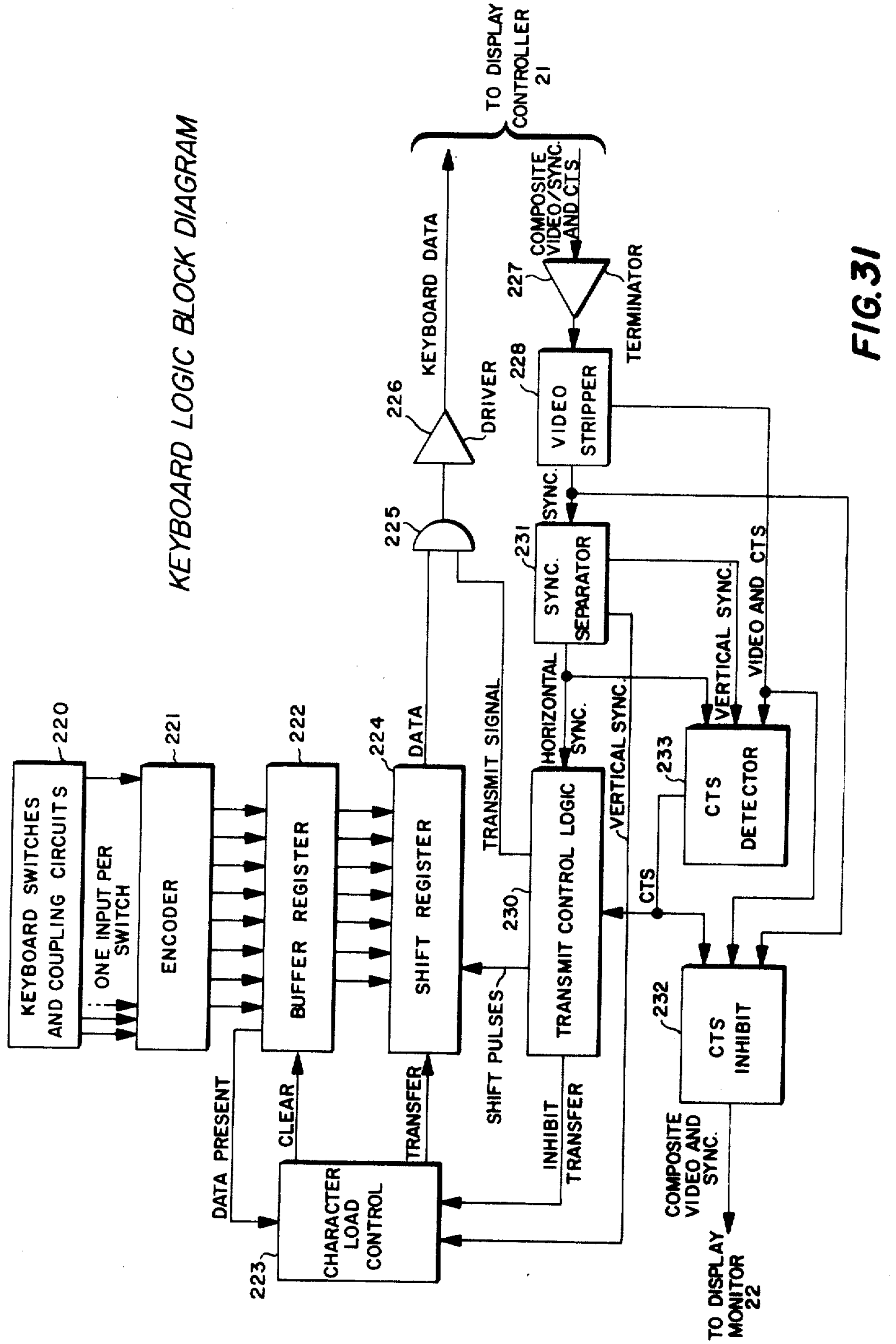
FIG. 31 illustrates in block diagram form the keyboard logic.

FIGURE 31 is a block diagram of the keyboard logic which is found in source 20. The keyboard logic performs the functions of converting a mechanical switch closure into parallel electrically coded output signals and converting those parallel output signals into a serial format train of signals which are shifted out as keyboard data to the display controller 21 at the time of the Clear-to-Send (CTS) signal. The CTS signal is stripped out of the composite video synchronizing signal by the keyboard logic. The CTS signal is essentially a "go" signal which tells a given keyboard when it is its turn to transmit coded binary data to the display controller 21.

This keyboard differs from other standard keyboards in that it is entirely electronic except for the switches. It is a new approach to an electronic keyboard arrangement using standard components and avoids the need for mechanical interlocking the keys. Mechanical interlocks are used by most keyboards to prevent the depression of two keys simultaneously which would create an ambiguous condition.

This keyboard in effect has an electronic interlock. It allows the operator to depress and hold down one or more keys and then depress any other key and still generate the correct coded output. It operates without error regardless of how fast the user types.

Testing by high speed typists operating this keyboard has shown that freedom from mechanical interlocks allows the operator to actually learn to type faster. In fact, so fast that very often a key is fully depressed before the preceding one operated has returned. At times, it was found that the typist actually had three different keys in various states of depression.

In FIG. 31, the keyboard switches and coupling circuits 220 consist of a set of switches, one for each key on the keyboard, and resistor-capacitor circuits. The keyboard switches and coupling circuits 220 have as many output signals as there are keys on the keyboard. These output signals are transmitted to an encoder 221 which converts them into a seven bit code. In other words, for each key on the keyboard, a seven bit code is generated by the encoder 221. Each time a code is generated at the output terminals of the encoder 221, buffer register 222 is loaded provided it is empty.

When the buffer register 222 is loaded, the DATA PRESENT signal is sent to the character load control 223 which immediately transfers the data from the buffer register 222 to the shift register 224 if the shift register is empty. If the shift register 224 has data stored in it at the time the CTS signal occurs, it begins shifting the data bits through AND-gate 225 and the driver 226 to the display controller 21.

The CTS signal which arrives along with the video and synchronizing signal via the terminator circuit 227 is stripped from the synchronizing signal by the video stripper 228. The CTS detector 233 then extracts the CTS signal out of the video signals by looking for a voltage increase or "up level" following the vertical synchronizing signal. When the CTS signal is found by the CTS detector 233, the transmit control logic 230 is informed that data may be transmitted to the display controller 21. The transmit control logic 230 sends the TRANSMIT SIGNAL to AND-gate 225 allowing data to be transmitted through it. The transmit control logic 230 also generates a series of shift pulses transferring the data stored in the shift register 224 through the AND-gate 225, the driver 226 to the display controller 21.

While the transmit control logic 230 is waiting for the presence of a CTS signal, it sends an INHIBIT TRANSFER singal to the character load control 223 which prevents transfer of the data from the buffer register 222 to the shift register 224. In this event, new data coming from the keyboard switches through the encoder will be loaded in the buffer register where it will remain as long as transfer to the shift register 224 is blocked. Thus, if two keys on the keyboard are hit in rapid succession before a CTS signal can occur, the first character passing through the buffer register 222 will be loaded in the shift register 224 where it will wait to be transferred to the display controller 21. The second character meanwhile will be generated through the encoder 221 and loaded in the buffer register 22 where it will remain until the data stored in the shift register 222 has been transmitted to the display controller.

As soon as the CTS signal arrives, the data stored in the shift register 224 is transferred to the display controller 21. This action clears the shift register 224 of data which allows the contents of the buffer register 222 to be transferred to the shift register 224 for subsequent transfer to the display controller 21.

The video stripper 228 passes on its SYNC signal to the sync separator 231 which separates the HORIZONTAL SYNC signal from the VERTICAL SYNC signal. The HORIZONTAL SYNC signal passes on to the transmit control logic 230 where it is used as a clock signal. As previously mentioned, the VERTICAL SYNC signal is used to determine where the CTS signal will occur.

Since the CTS signal is an "up level" pulse, the CTS inhibit 232 logic is required to strip away the CTS signal from the video signal received by the display monitor 22. This is required because the CTS signal would appear on the display if it is not stripped out. The CTS inhibit logic 232 also performs the function of adding back the synchronizing signal forming the COMPOSITE VIDEO AND SYNC signals which are transmitted onto the display monitor 22.

Each of the blocks in FIG. 31 will be discussed in more detail in the following paragraphs.

Keyboard switches and encoder

Figure 31A:
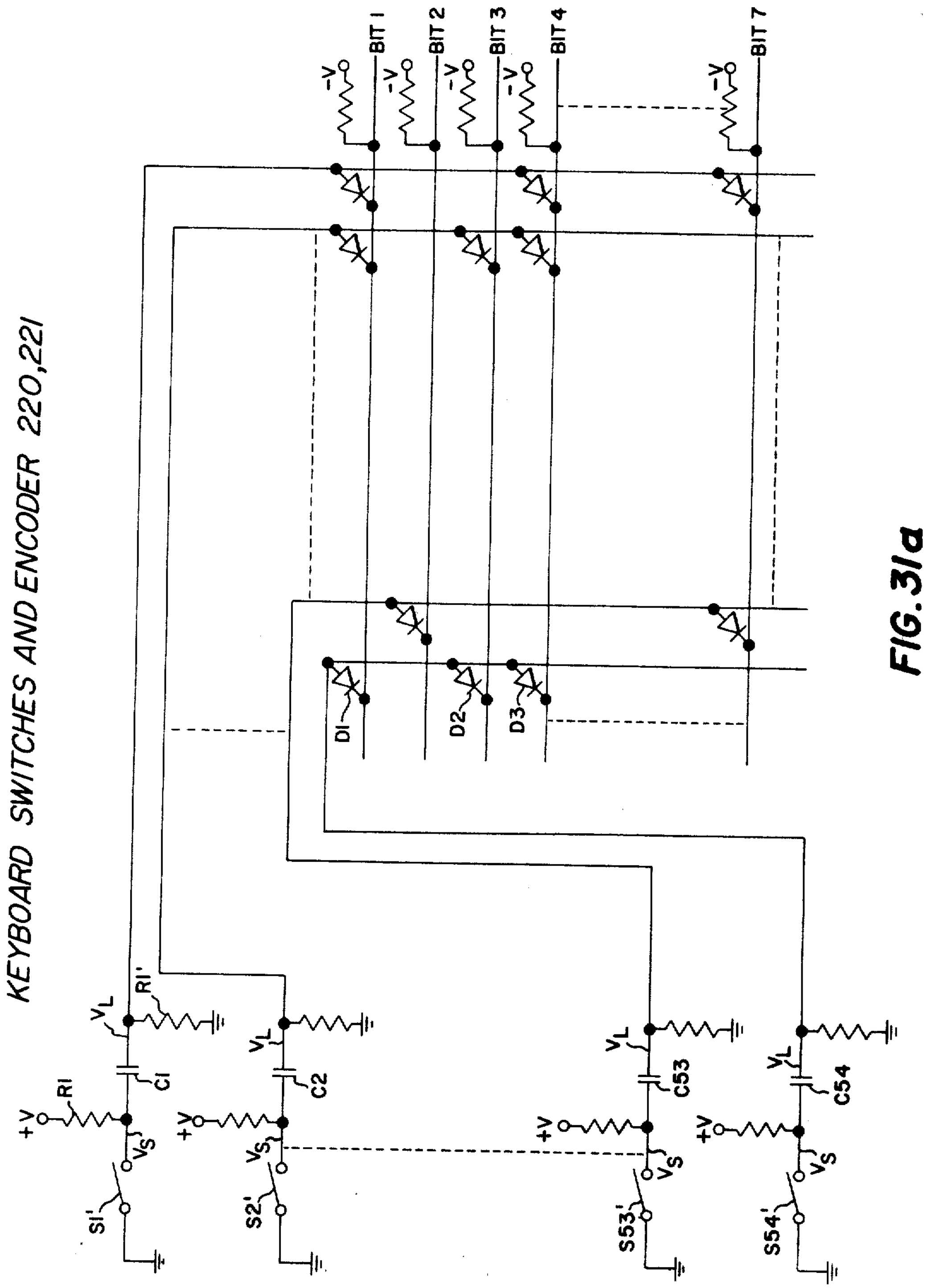
FIG. 31*a* illustrates in detail the keyboard switches and encoder of FIG. 31.

The keyboard switches and encoder logic 220 and 221 are illustrated in FIG. 31*a*. Each switch, S1′ through S54′, shown in the figure corresponds to a key on the keyboard. The capacitors C1 through C54 provide AC coupling of each keyboard switch to the encoding logic. The encoding logic is represented by the matrix of diodes shown in this figure.

When any one of the switches S1′ through S54′ is closed, its associated capacitor discharges causing a change in the voltage level $V_L$ on the output side of the capacitor. The pulse which is generated passes through the encoding logic which produces the proper coded output signal for storage in the buffer register 222. Until the switch is released, the capacitor is not allowed to charge again so no additional output signals can come from that switch. Thus, when switch S1′ is closed, only one coded signal, corresponding to the closing of switch S1′, is generated and stored in the buffer register 222. This coded signal cannot be regenerated again until switch S1′ is lifted again allowing capacitor C1 to be recharged. However, while switch S1′ is being held closed, a second key can be depressed causing the switch associated with it to close and the proper coded signal to be generated and stored in the buffer register 222. In fact, as long as buffer register 222 is emptied fast enough, many keys can be depressed in sequence and continuously held down while succeeding keys are depressed without causing errors to occur.

Figure 31B:
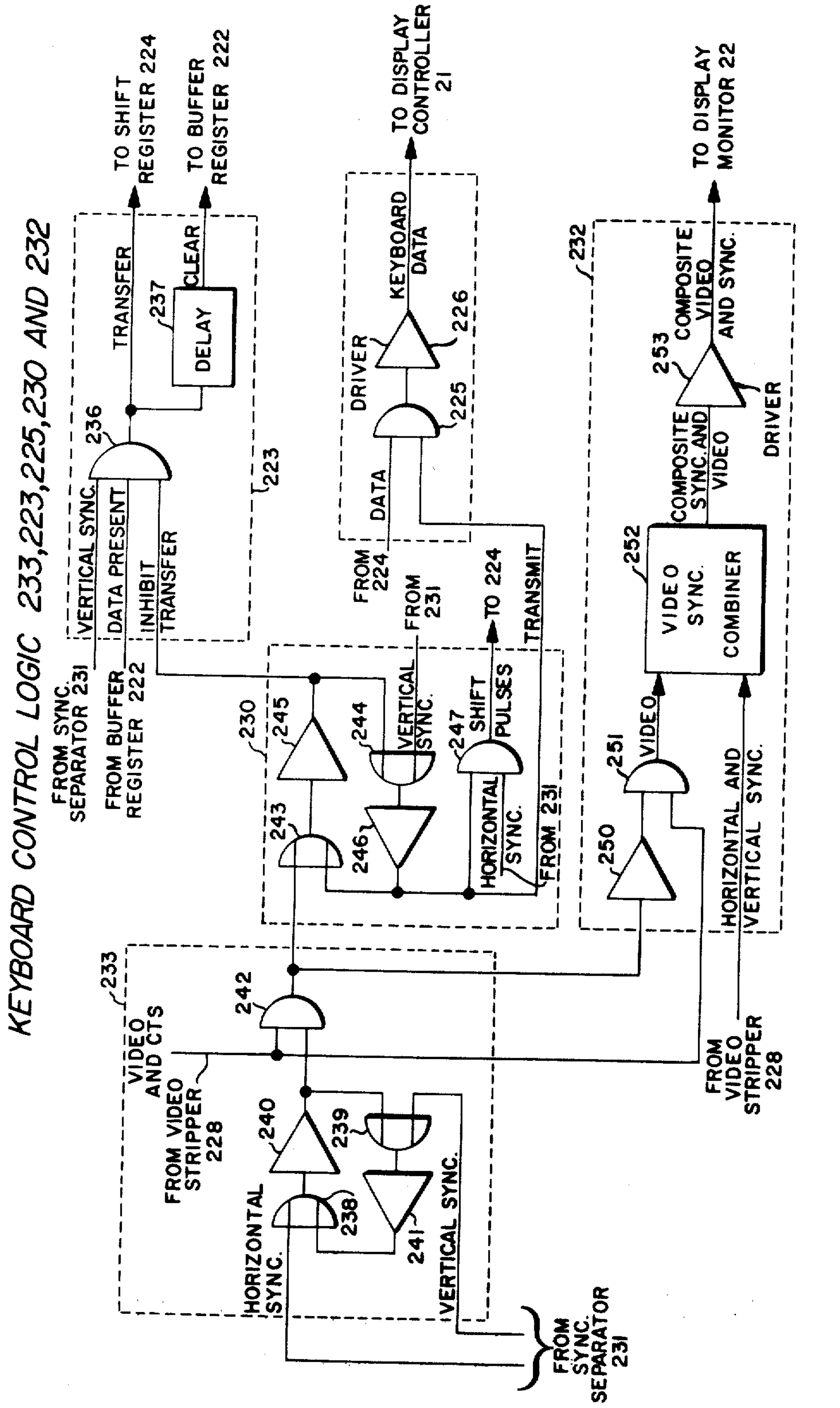
FIG. 31*b* illustrates in more detail the keyboard control logic of FIG. 31.
Figure 31C:
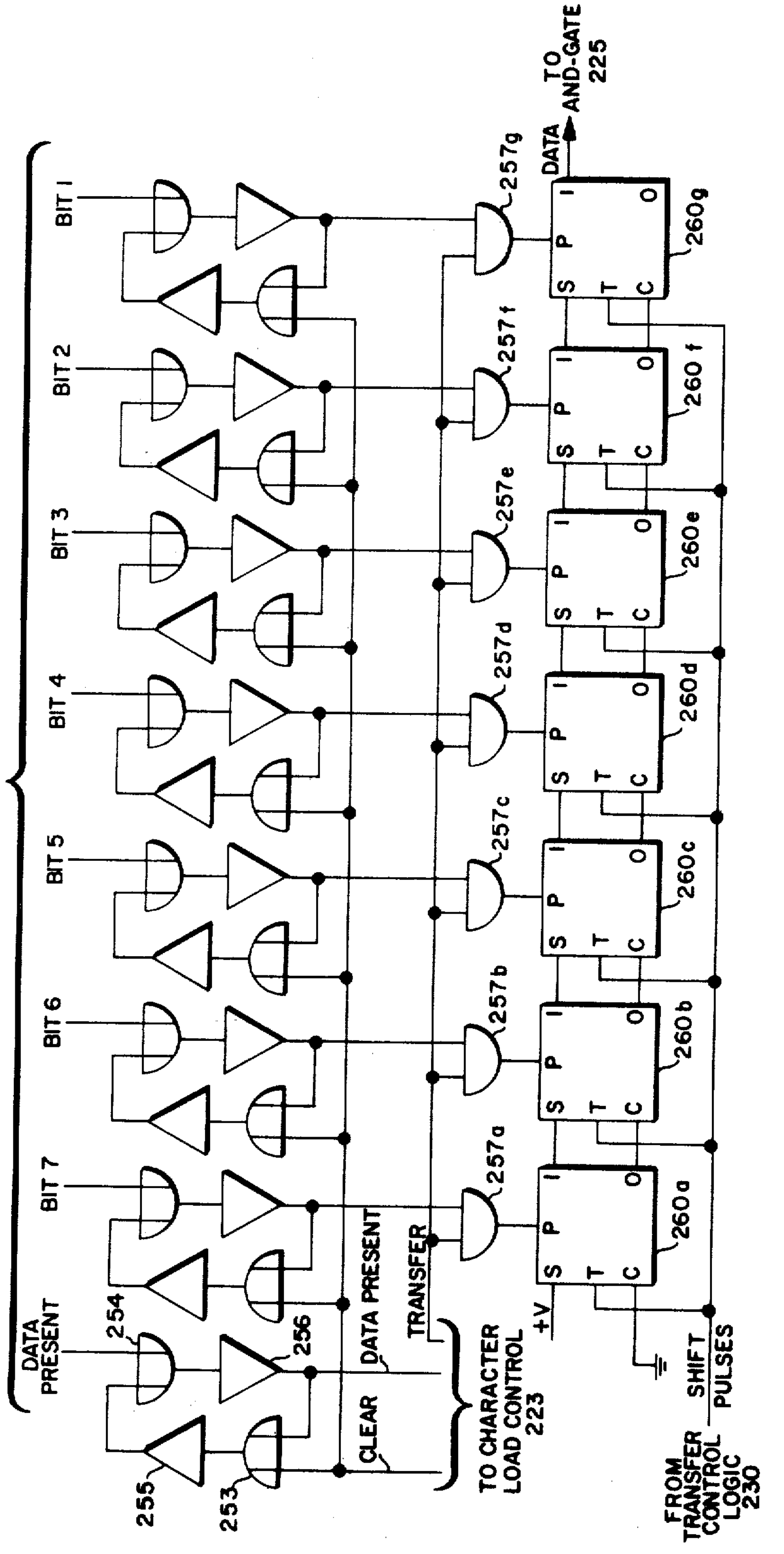
FIG. 31*c* illustrates in more detail the buffer and shift registers of FIG. 31.
Figure 31D:
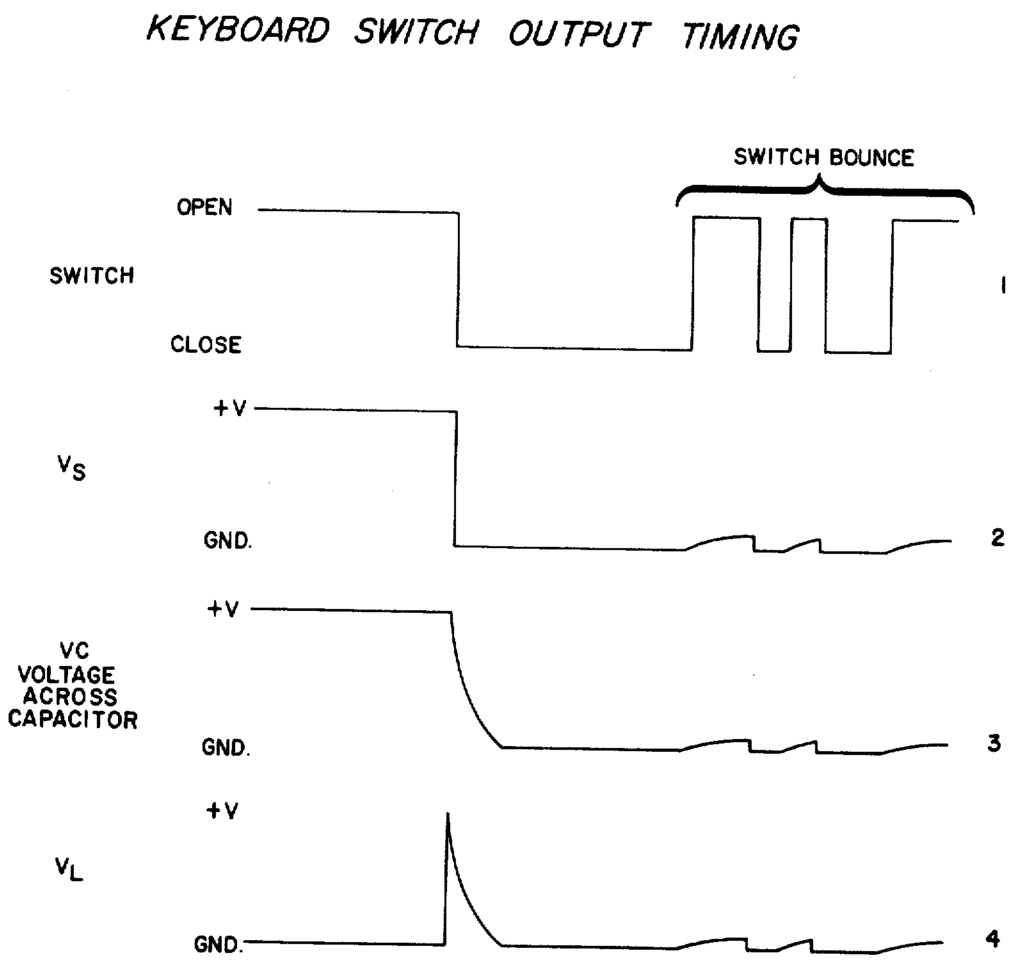
FIG. 31*d* illustrates the keyboard switch output timing.

FIGURE 31*d* shows in detail the voltage fluctuations at various points in the circuit. Waveform 1 illustrates the opening and closing of a given switch. Note that the switch bounce is shown. The second waveform in the figure illustrates the voltage at point $V_S$. When the switch is opened, point $V_S$ is at a +V (plus voltage) potential. At the time of closure, the point $V_S$ is grounded through switch S1′ so it will go to ground potential until the switch starts to bounce. Notice that during the switch bounce, the potential at $V_S$ does not rise very far. This is due to the fact that capacitor C1 has had a chance to fully discharge and only begins to very slowly charge during the switch bounce period. The slight bumps in the positive direction of the $V_S$ signal shown during the switch bounce actually occur because the capacitor starts to charge. But since the capacitor discharges only through resistor R1′ shown in FIG. 31*a* and charges through both resistors R1′ and R1, its discharge time constant is much shorter than its charge time constant. The difference in the charging to discharging time constants is made larger by employing a small resistance R1′ and a very large resistance R1.

The third waveform shown in FIG. 31*d* shows the voltage across the capacitor. Notice that, at the time of switch closure, it discharges fairly rapidly but at the time of switch bounce, or when the switch is actually opening, it charges very slowly.

The fourth waveform, shown in FIG. 31*d*, illustrates the voltage $V_L$ at the output side of the capacitor. The voltage $V_L$ is equal to the current through resistor R1′ times the resistance value of R1′. Since there is a current through resistor R1′ only during the charge or discharge of capacitor C1, the voltage at $V_L$ at the output side of the capacitor will appear large in magnitude during the discharging of C1 because the current is only limited by resistor R1′. During the charging of capacitor C1, the voltage at $V_L$ will appear very small in magnitude because the current is smaller since it is limited by both resistor R1′ and resistor R1. Thus, voltage $V_L$ will appear as shown in the fourth waveform of this figure. The high voltage spike appears as a pulse to the encoder 221 shown in FIG. 31 passing through the encoder and generating an output signal, while the very low potential pulses due to the switch bounce do not appear as a high enough signal to activate the encoder.

The encoder 221 is a conventional circuit found in many types of data processing equipment. Each switch output signal transmitted to encoder 221 drives a set of diodes such as diodes D1, D2 and D3 shown in FIG. 31*a*. This set of diodes allows the signal generated at the output terminals of any of the switches S1′–S54′ to be transmitted to output terminals labeled bit 1-bit 7. For example, because of the presence of diode D1, switch S54′ when activated generates a signal which passes through diode D1 to the bit 1 output terminal. Notice that for switch S54′ no signal is generated at the bit 2 output terminal while, because of diode D2, a signal is generated at the bit 3 output terminal. Because of diode D3, a signal is generated at the bit 4 output terminal. Therefore, when switch S54′ is activated, an output coded signal which has "ones" for bits 1, 3 and 4 is generated. In a similar manner, other switches will cause other coded output signals to be generated in accordance with the diode arrangement of encoder 221.

Keyboard control logic

FIGURE 31*b* illustrates those functions of the keyboard logic which make up the control logic of the keyboard. This figure more particularly illustrates the functions of the character load control 223, AND-gate 225 and driver 226, transmit control logic 230, CTS inhibit logic 232, and CTS detector 233.

By reference to FIG. 31, the interconnection of these functions can be more easily understood. The details of each function are illustrated in FIG. 31*b*.

When the DATA PRESENT signal is generated by the encoder 221 and stored in the buffer register 222, it is transmitted to AND-gate 236. When the VERTICAL SYNC signal occurs and AND-gate 236 is enabled by the INHIBIT TRANSFER signal, the bit data in the buffer register 222 is transferred into the shift register 224. The delay circuit 237 allows the transfer to take place and then generates a CLEAR signal which clears the buffer register 222 to all zeros again.

After the data from the encoder 221 is transferred through the buffer register 222 to the shift register 224, the next CTS signal to occur will cause the contents of the shift register 224 to be transferred to the display controller 21. The CTS signal is detected by the CTS detector 233 which is illustrated in FIG. 31*b*.

OR-gates 238, 239 and the inverters 240, 241 form a flip-flop which is set by the occurrence of the VERTICAL SYNC signal through OR-gate 239. It is cleared by the next HORIZONTAL SYNC signal following the VERTICAL SYNC signal through OR-gate 238. Thus, the output signal of inverter 240 is low during the horizontal synchronizing time after the VERTICAL SYNC signal. This time period is where the CTS signal occurs if present. If the CTS signal is present, AND-gate 242 will go True.

The flip-flop formed by OR-gates 238 and 239 and inverters 240 and 241 operates in the following manner:

The VERTICAL SYNC and the HORIZONTAL SYNC input signals are normally in their high state. If the output signal of inverter 240 is high which means that the VERTICAL SYNC signal has not occurred yet, a low signal at the VERTICAL SYNC input terminal of OR-gate 239 will create a low level signal at its output terminal. This low output signal, when inverted by inverter 241, creates a high signal level at the input terminal to OR-gate 238. This high level signal, when applied with the high level of the HORIZONTAL SYNC signal to OR-gate 238, causes a high level signal at its output terminal. This high level signal then creates a low level signal at the output terminal of inverter 240.

This low signal condition at the output terminal of inverter 240 is transmitted through OR-gate 239 causing the output signal of this gate to remain low even after the VERTICAL SYNC signal is no longer present. The output signal of inverter 241 going high causes the output signal of OR-gate 238 to remain high. Thus, a "lock up" condition occurs. This lock up condition remains until the HORIZONTAL SYNC input signal to OR-gate 238 occurs which causes the output signal of OR-gate 238 to return to the low condition causing the output signal of inverter 240 to rise which then causes the output signal to go high since both of its input signals are high. This output signal is transmitted through inverter 241 to OR-gate 238 causing a lock up condition of the flip-flop to occur in the opposite state.

Thus, the output signal of inverter 240 transfers from a high condition to a low condition at the time of the VERTICAL SYNC signal and then returns back to its high condition after the next HORIZONTAL SYNC signal occurs. During this period, if a CTS signal occurs, conjunction in AND-gate 242 occurs.

This CTS signal is then utilized by the transmit control logic 230 and the CTS inhibit logic 232.

The transmit control logic 230 has another flip-flop arrangement made of gates which generate the INHIBIT TRANSFER signal.

OR-gates 243 and 244 and inverters 245 and 246 are arranged such that the INHIBIT TRANSFER signal goes high inhibiting AND-gate 236 right after the occurrence of the CTS signal. This flip-flop arrangement, comprising OR-gates 243 and 244 and inverters 245 and 246, is cleared by the occurrence of the next VERTICAL SYNC signal.

During the time that this flip-flop arrangement has been set by the CTS signal occurring, AND-gate 247 is enabled allowing HORIZONTAL SYNC pulses to generate shift pulses at its output terminal. These shift pulses are used to continuously shift the shift register 224. At the same time, the same signal that enabled AND-gate 247 becomes TRANSMIT signal which enables AND-gate 225 allowing the data contained in the shift register 224 to transfer through AND-gate 225 and driver 226.

The CTS inhibit logic 232 is also shown in FIG. 31*b*. This logic performs the function of blocking out the CTS signal from the normal video signal and restoring the HORIZONTAL and VERTICAL SYNC signals to form a composite synchronizing and video signal which the display monitor can accept. Inverter 250's output signal goes high at the occurrence of the CTS signal. This high level signal inhibits via AND-gate 251 the CTS signal, allowing only the video data to occur at the output terminal of AND-gate 251. The video sync combiner 252 is an additive mixer which mixes the synchronizing signals together with the video giving a composite signal at its output terminal. Driver 253 then boosts the signal to drive the monitor.

Buffer and shift registers

FIGURE 31*c* illustrates the buffer register 222 and the shift register 224.

The buffer register 222 is a series of OR-gates and inverters arranged as a set of flip-flops. The gates and inverters 253, 254, and 255, 256, respectively, form a flip-flop which stores the DATA PRESENT signal. Each of the encoder output signals, bit 1 through bit 7, are stored in a similar arrangement.

Any time data occurs at the output terminals of the encoder 221, it is stored in this group of flip-flops. After data is stored in this arrangement of flip-flops, it is transferred to the shift register 224 with the TRANSFER signal through AND-gates **257*a* through 257*g* loading the shift register 224 through its present input terminals P. Shift register 224, comprising flip-flops 260*a*–260*g*, is a standard serial shift register. After the shift register 224 is loaded and the CTS signal occurs, the shift pulses are generated shifting the stored data serially to the display controller 21. As the shift register 224 shifts serially, it is cleared due to the fact that the clear input terminal of flip-flop 260*a* is grounded and the set input is held at a high potential. Thus, when the shift register 224** has finished shifting, it contains all zeros and is ready to be reloaded with new data.

Communication data line interface

Figure 32:
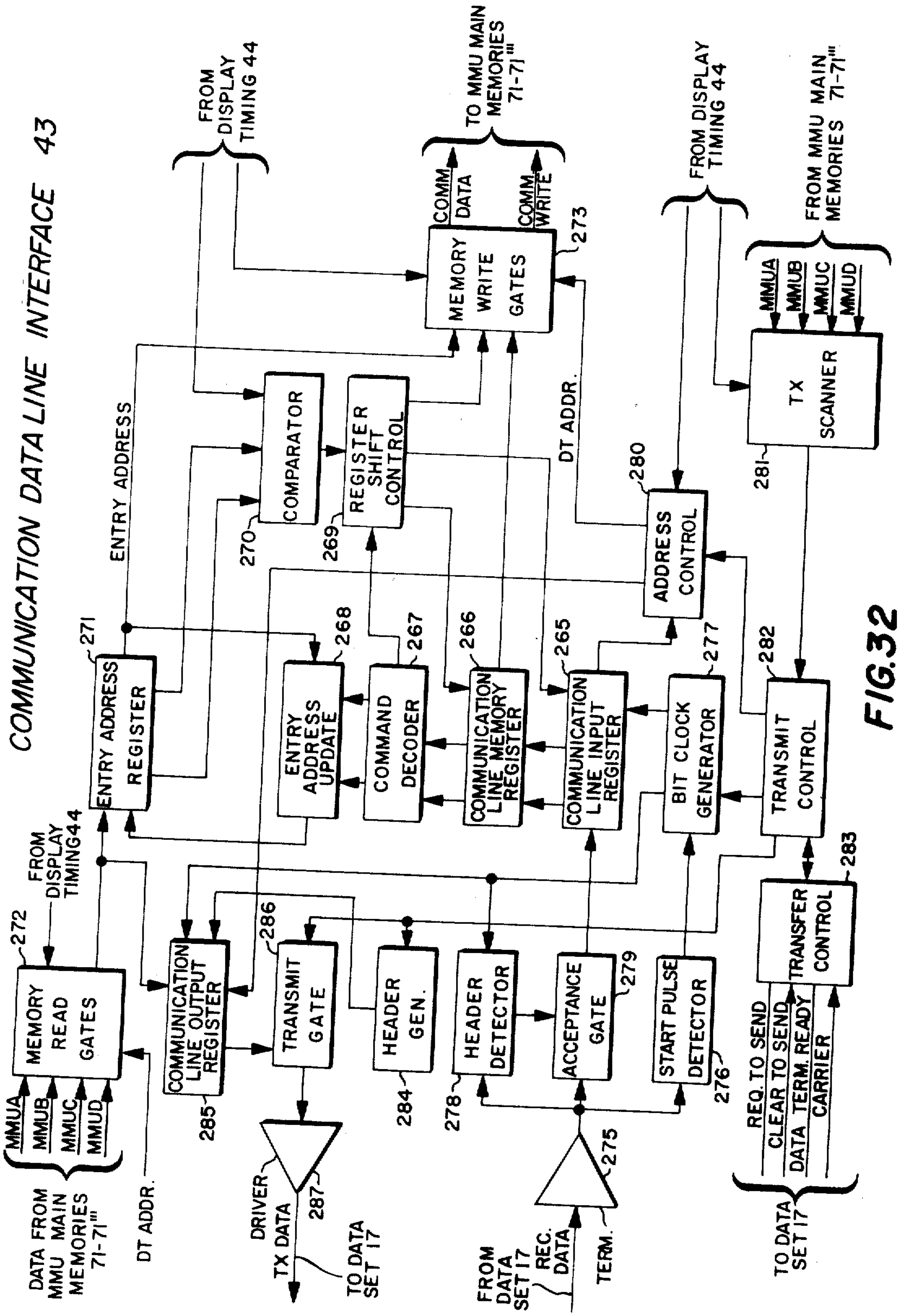
FIG. 32 illustrates in detail the logic circuitry of the communication data line interface.

FIGURE 32 is a more detailed block diagram of the communication data line interface 43 shown in FIGS. 1 and 10 which provides data signal and command signal interface between the external equipment 17 (data set) and the display memory 33. The communication data line interface 43 accepts its timing signals from the display timing logic 44 and is capable of selectively reading from any of the main memory units 71 through 71''' and writing data back to any of the main memory units in accordance with the function being performed at any given time. It is capable of generating to and accepting from the data set 17 a series of control signals required for proper operation of data transfer between the communication data line interface 43 and the data set 17. It accepts data from the data set 17 for storage in display memory 33 and for updating the entry address value as well as other information.

The communication data line interface 43 is capable of sequentially scanning each display terminal's memory segment for requests to transmit data via the communication line. When it finds a request to transmit data from a given display terminal 20, 22, it sequentially reads that terminal's data out onto the communication line 16 via the data set 17. It reads and transmits the data to be sent a character at a time starting with the character located at the position of the entry marker and ending when the End-of-Text symbol is reached.

For each message transmitted by the communication data line interface 43 to the data set 17, a header message is generated preceding the data to be transmitted. This header message consists of the appropriate communication control characters as well as address data required by multi-display terminals operating on one communication circuit.

Many functions of the communication data line interface 43 and the keyboard input multiplexer 69 are identical. This can be seen when FIG. 32 is compared with FIG. 14 and the discussion of the keyboard input multiplexer 69 is recalled.

For example, the communication line input register 265 is similar to the keyboard input register 74 of the keyboard input multiplexer 69; the communication line memory register 266 is similar to the keyboard memory register 76 of the keyboard input multiplexer; and the command decoder 267 is similar to the command decoder 75. In addition, the entry address update 268 as well as the shift register control 269, the comparator 270, the entry address register 271, the memory read gates 272, and the memory write gates 273 are similar to the entry address control 82, the register shift control 78, the comparator 79, the entry address register 81, the memory read gates 116, and the keyboard memory write gates 77, respectively. Because of this similarity, the detailed logic of the communication data line interface 43 will be discussed briefly.

The following paragraphs will illustrate the different modes of operation of the communication data line interface.

Receive mode

Referring to FIG. 32, when data starts being received from the data set 17 by the terminator circuit 275, the start pulse detector 276 determines that a signal transition has occurred and that data is being received. The output signal of the start pulse detector 276 is transmitted to a bit clock generator 277 which counts the bits of the incoming character and generates a bit clock signal which is used by the header detector circuitry 278 and the communication line input register 265. The header detector circuitry 278 determines that the first character is the proper header control character which allows the acceptance gate 279 to open and the received data then is accepted by the communication line input register 265. An address character follows the header control character. The address character defines which keyboard display terminal 20, 22 is to receive the incoming message. The address control logic 280 then transmits the proper DT address signal to the memory write gates 273 selecting the memory segment into which the data being received is to be written. The proper communication control character is then received which designates that the succeeding characters to be received are text characters. These characters received consist of characters to be stored away in memory as well as entry marker control characters. Each character is received and then passed on to the communication line memory register 266 from which it is written to memory via the memory write gates 273 or command decoded to perform an update of the entry address value. After a character is received into the communication line input register 265, operation of the communication data line interface circuitry to write data to memory 33 or update the entry marker is very similar to the keyboard input multiplexer logic 69, shown in FIG. 14.

When a received character reaches the communication line memory register 266, the command decoder 267 determines whether it is a character to be stored for display or whether it is a command to be used to update the entry address register 271. As in the keyboard input multiplexer 69, any data to be stored is written at the position defined by the entry address. The entry address is extracted from memory 33 prior to the writing of data to memory. The entry address is read via the memory read gates 272, updated and returned immediately to memory as in the case of the keyboard input multiplexer. The old value is retained in the entry address register 271 for comparison in the comparator 270 with the memory address count from the display timing 44. The output signal of the comparator 270 designates the time when the character location to be written into is at the output of the delay line memory. This signal from the comparator activates the register shift control 269 which in turn controls the shifting of the communication line memory register 266 through the memory write gates 273 and into the proper location of memory.

In the case when the character received is not a character to be stored away into memory but is a command which requires the updating of the entry address, the command decoder 267 sends the proper signals to the entry address update logic 268 which updates the entry address value from memory 33 and returns it to memory in its updated form. This operation is almost identical to the corresponding operation in the keyboard input multiplexer 69.

Through the use of the address control character in the header, the computer at the other end of the communication line can transmit multiple messages to the multiple terminal data editing display system during one transmission frame. The computer can arrange the messages it is transmitting in any order required and as many messages as desired. After the last message is received by the communication data line interface, the proper communication control character which activates the turning around of the communication line is received. The turning around of the line then allows the communication data line interface to scan the various main memory units for messages to be transmitted and transmission from the multiple terminal data editing display system to the processor 19 takes place.

Transmit mode

When the communication data line interface 43 is in the transmit mode, it scans MMUA 71 for all messages that are to be transmitted. It transmits these messages and then turns the line around returning to the receive mode for messages from the processor 19. The next time it returns to the transmit mode, it will scan MMUB 71′ for messages to be transmitted. After all the messages in MMUB are transmitted, the line is again turned around and the communication data line interface is in the receive mode. Upon the next time it is to transmit data, it scans MMUC 71″ and processes all requests to transmit before turning the line around. It continues to operate in this manner each time it goes into the transmit mode. It transmits all data from one MMU and then turns the line around. The TX scanner 281, shown in FIG. 32, performs this function of scanning the MMU's for messages to be transmitted. When main memory unit (MMU) is found to contain a message to be transmitted, the transmit control logic 182 is notified. The transmit control logic 182 stores the proper address to be transmitted in the address control logic 280 where the address this time indicates the terminal identification which is transmitting the message to the processor 19. The transmit control logic 182 interfaces with the transfer control 283 which in turn generates the proper control signals to the data set 17. The proper control signals must be generated to the data set as well as received from the data set before transmission can take place. The transmit control logic 182 starts the bit clock generator 277 which generates the proper timing for the transmission of data at the communication data rate. A signal from the transmit control logic 182 to the header generator 284 causes a header message containing proper communication control characters to be sent to the communication line output register 285 through the transmit gate 286 and then on to the communication line 15 via the driver 287. The display terminal address from the address control logic 280 is passed on to the communication line output register 285 which passes it on through the transmit gate 286 to the communication line 15. After the address character has been transmitted, a communication control character is generated in the transmit control logic 182 which designates that subsequent characters are data characters. The data characters to be transmitted are then selected from the proper main memory unit by the memory read gates 272 which pass them on to the communication line output register 285 to be transmitted via the transmit gate 286 and the output driver 287.

Each time a character is transmitted on the line, the entry address update logic 268 increments the entry address value by one, causing the characters to be taken from memory sequentially and transmitted. When the End-of-Text code is read from memory, transmission of data terminates for that particular terminal and the transmit scanner starts scanning again for another terminal requesting transmission.

Data from all terminals requesting transmission assigned to a given main memory unit is transmitted. When the last terminal requesting transmission has its message transmitted, the proper control characters are generated which turns the line around allowing the processor 19 to transmit data to the communication data line interface 43.

Main Memory

Illustrated in FIG. 10 are four main memory units, MMUA 71 through MMUD 71'''. These four main memory units are identical and completely interchangeable. Since all four of these units are identical, only one will be described herein.

Figure 33:
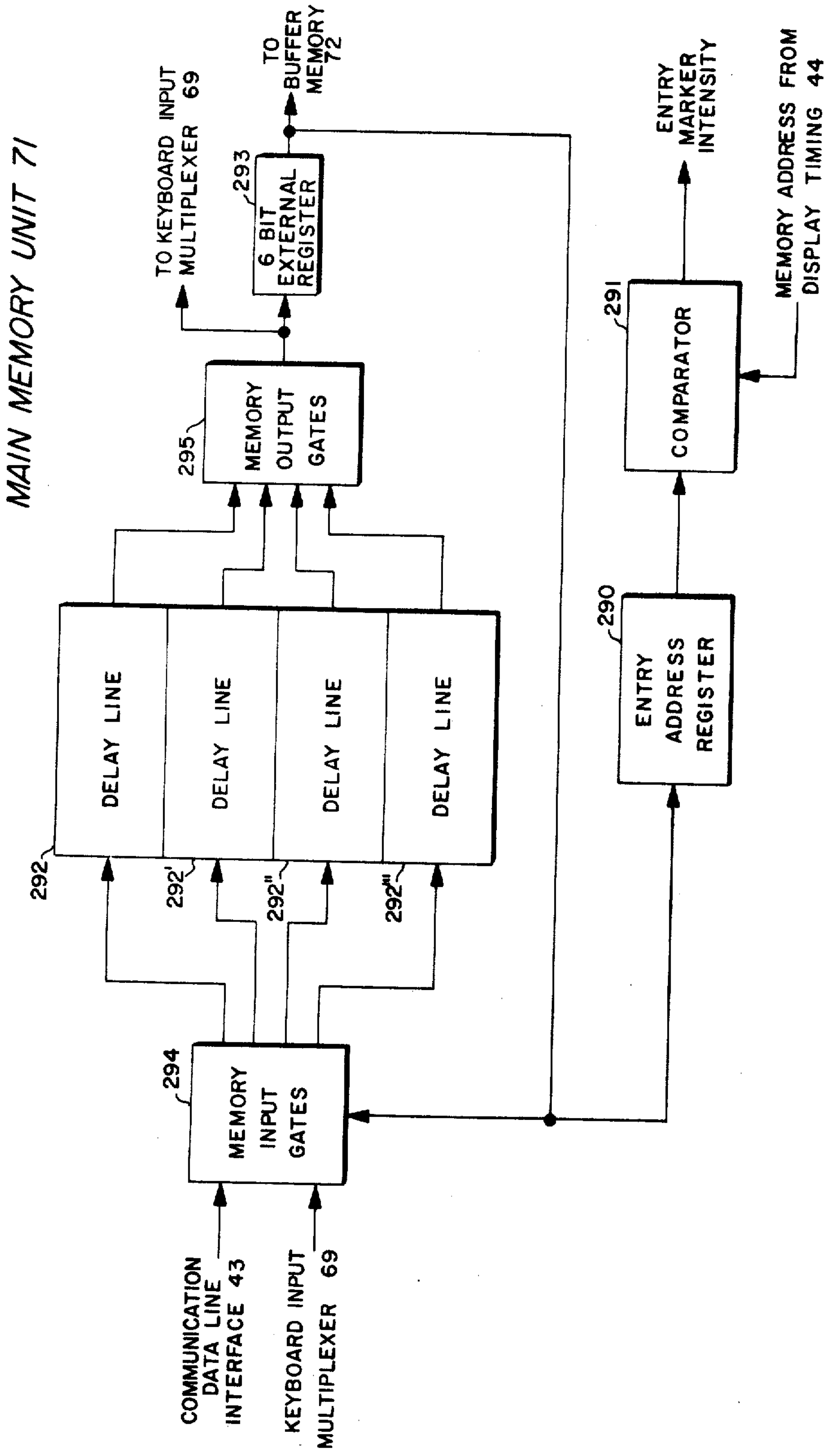
FIG. 33 illustrates in more detail the main memory unit shown in FIG. 10.

FIGURE 33 illustrates in block diagram form one of the main memory units. Each main memory is capable of being loaded by the communication data line interface 43 or the keyboard input multiplexer 69. The main memory units transmit data to the keyboard input multiplexer 69 for control purposes to the communication data line interface 43 for transmission to the processor 19 and to the buffer memory units 72 prior to display generation. Associated with each main memory 71 is an entry address register 290 and comparator 291 which, in conjunction with the display timing 44, generate an entry marker intensity signal.

As shown in FIG. 33, each main memory unit is composed of four delay lines 292, 292', 292'' and 292'''. These delay lines are arranged as shown in the figure where data recirculates from the output terminals of the delay lines through a six bit external register 293 back to the input of the delay lines. The recirculation of data around this loop allows cyclic access to all memory locations for storage or retrieval of data. This cyclic arrangement also allows for a cyclic display of data which is always required for refreshing a CRT type display.

Data recirculates back into the memory input gates 294 at a 6MC rate. The memory input gates 294 demultiplexes this 6MC data into four 1.5MC signals. These signals feed the four 1.5MC delay lines 292, 292', 292'' and 292''' whose output signals are transmitted to the memory output gates 295. The memory output gates multiplexes the four 1.5MC signals down into a single 6MC signal for use by the keyboard input multiplexer 69 and the communication data line interface 43. This 6MC signal also feeds the six bit external register 293 which in turn recirculates the data back into the memory input gates 294.

The six bit external register 293 provides a "look ahead before write" capability. That is, this six bit external register provides a one character delay which may be utilized by the keyboard input multiplexer 69 to monitor what character is present before writing data to memory.

The entry address register 290 cyclically reads out of memory each entry address value stored corresponding to each display terminal 20, 22. After an entry address value is read from memory into the entry address register 290, it is held there until a comparison is made with the memory address count (MAC) from the display timing 44. This comparison in made by the comparator 291 indicating that the entry marker is to be displayed at the location on the display defined by the stored memory address value. This entry marker intensity signal is routed to the corresponding video distributors 36–36''' which mixes this signal with the composite video information to be received by the display terminal.

The entry address register 290 and the comparator 291 are almost identical to the entry address registers and comparators found in the keyboard input multiplexer 69 and the communication interface 43. Since they are so similar, the detail logic of these circuits will not be explained.

Memory input gates

Figure 33A:
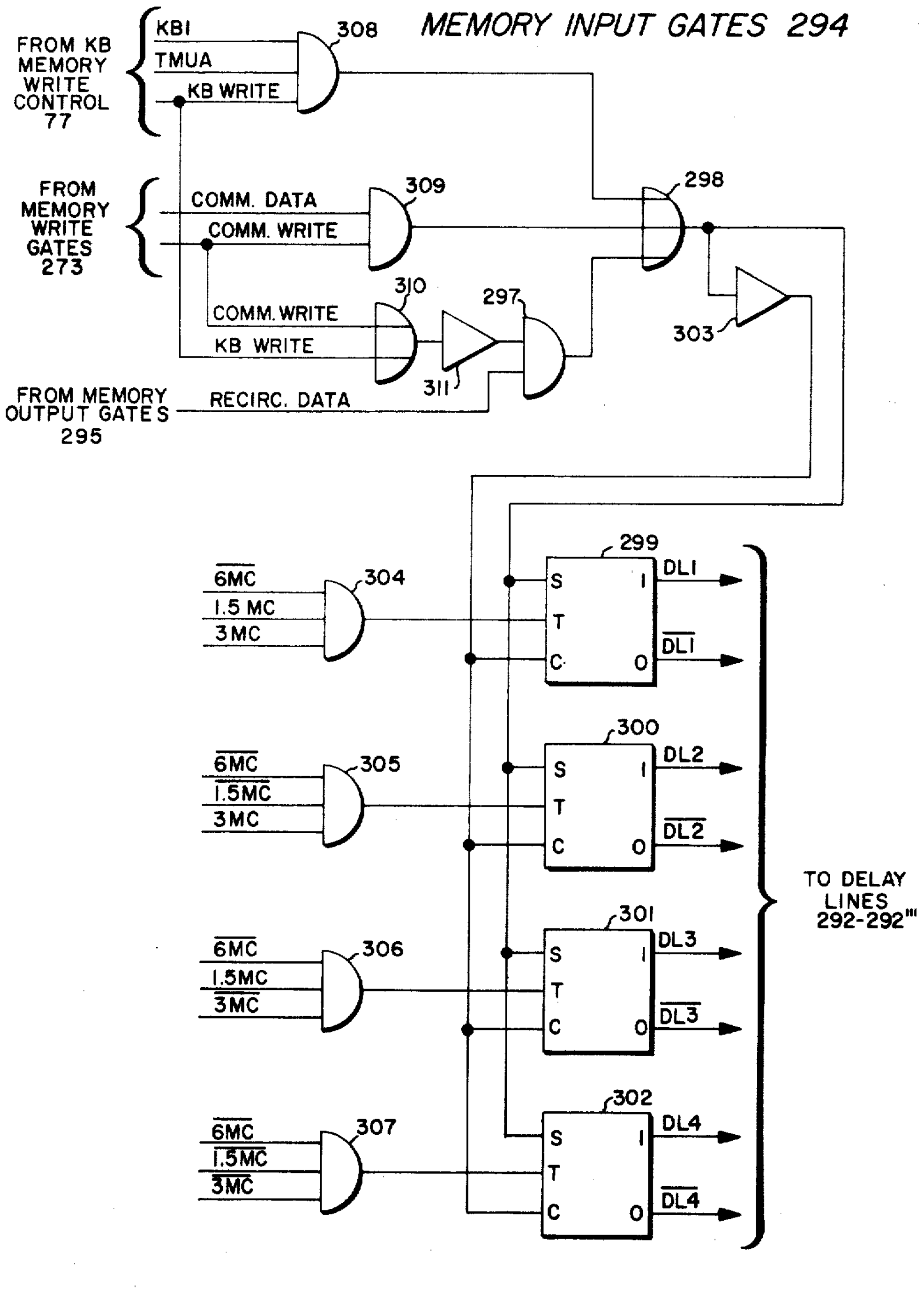
FIG. 33*a* illustrates in more detail the memory input gates shown in FIG. 33.

The memory input gates 294 are illustrated in detail in FIG. 33*a*. These gates allow data to be written from the memory registers 76 of the keyboard input multiplexer 69 and the communication data line interface 43 to the delay lines 292–292''' when either the KB WRITE or the COMM. WRITE signal from memory write gates 273 is present. When neither WRITE signal is present, the data in the delay lines is recirculated.

As stated before, the main memory 71 comprises two pairs of identical delay lines (four lines in all) with normal delay times of 2.0833 milliseconds. The use of four lines allows a four-to-one expansion of bit time before storage, thereby improving memory reliability. In this time expansion, one pair of delay lines circulates the even-numbered bits ($B_2$, $B_4$ and $B_6$) while the other pair circulates the odd-numbered bits of each code or character. Within each pair of delay lines, the bits are alternatively staggered through the delay lines on a 1, 2, 1, 2, 1, 2, etc., basis as shown in FIG. 33*b* which also shows timing of the various events associated with the main memory 71.

Figure 34:
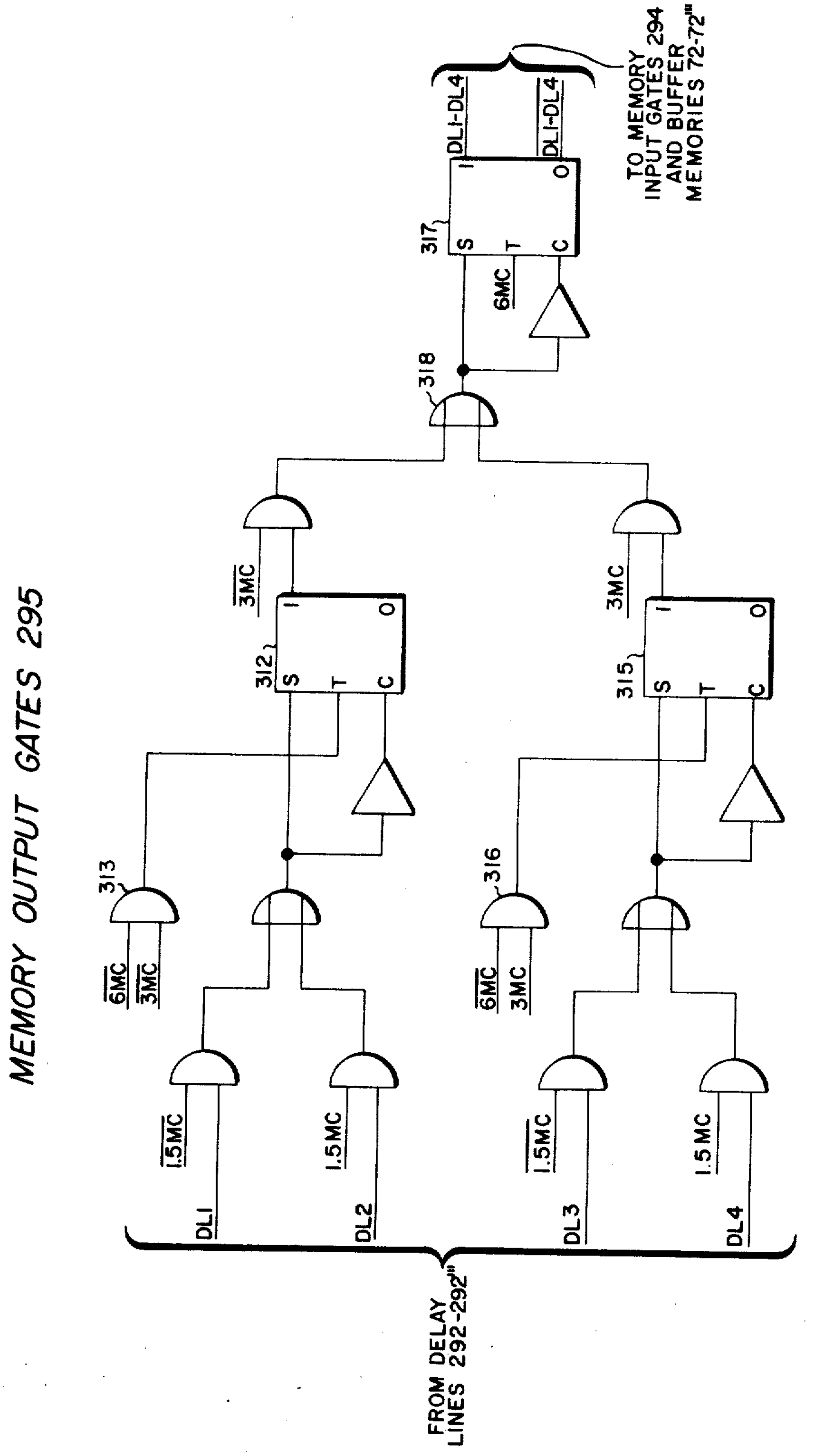
FIG. 34 illustrates in more detail the memory output gates shown in FIG. 33.

Output signals from the four delay lines are combined after time selection which merges the bits back into a single code or character and are returned to the memory input for recirculation. Reference is made to FIGS. 33*a* and 34 for the logic circuits showing the input and output bit expansion and compression, respectively.

Figure 33B:
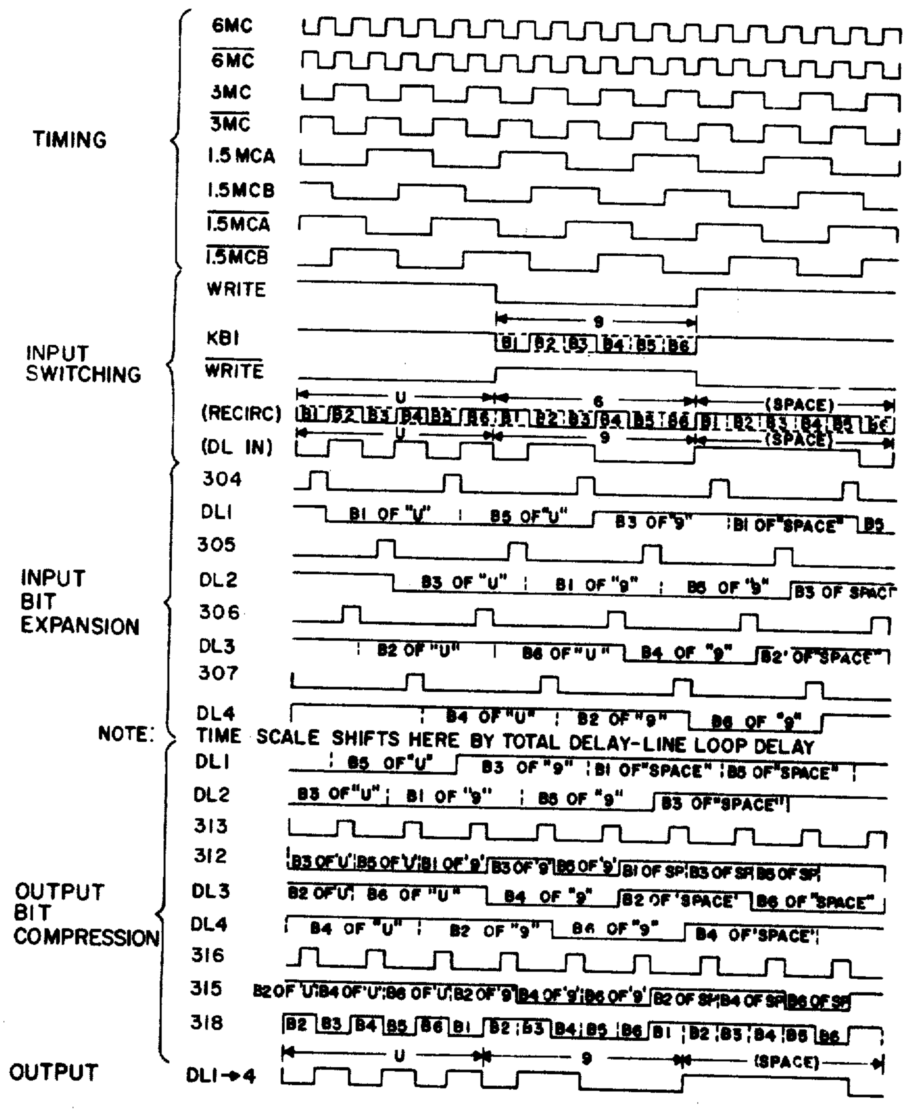
FIG. 33*b* is a timing chart illustrating the relationship of the various timing signals used in the main delay lines.

With reference to FIGS. 33*a* and 33*b*, when neither WRITE signal is True (which is the case at all times except when writing new data into the delay lines), AND-gate 297 is enabled, thus closing the recirculation path around the loop. If the data from the delay lines being recirculated is applied to the input terminal RECIRC. DATA of AND-gate 297, conjunction occurs in AND-gate 297 and an output signal is generated and applied to OR-gate 298. This output signal causes conjunction in OR-gate 298 resulting in the sequential setting of flip-flops 299, 300, 301 and 302. If the RECIRC. DATA from the memory output gates 295 is False, OR-gate 298 produces a high output signal which is inverted by inverter 303 and applied to the C terminals of the flip-flops 299–302 to reset them. Thus, when flip-flops 299–302 are pulsed or triggered by the clocking pulses applied to them through AND-gates 304–307, they will assume a state depending upon the state of the delay line information at that instant if neither WRITE signal is True.

When either the COMM. WRITE or KB WRITE signal is True during the writing of new data into the delay lines, AND-gate 308 or AND-gate 309 is enabled. OR-gate 310, whose output signal is inverted by inverter 311, is also enabled by those signals and conjunction occurs therein. The output signal of inverter 311, when applied to AND-gate 297, blocks the RECIRC. DATA path, thus preventing recirculation of stored data during the presence of a WRITE signal. Data input to the KB1 data input terminal of AND-gate 308 or the COMM. DATA input terminal of AND-gate 309 then may occur. This causes conjunction to occur in AND-gate 308 or 309 if the set input signal is True. The output signal of AND-gate 308 or 309 is applied to OR-gate 298 wherein conjunction occurs resulting in the enabling of the set input terminals of flip-flops 299–302. If the data input to AND-gate 308 or 309 is False, the reset terminals of flip-flops 299–302 are enabled.

Thus, the recirculation path is blocked and new data is entered into these flip-flops upon conjunction occurring in AND-gates 304–307 and upon the occurrence of the signals indicated at the input terminals of these gates. This is illustrated in FIG. 33*b* by the blocking of the character 6 and the entry instead of the character 9 as the second code or character group.

The resulting strobing or triggering signals are shown in the "input bit expansion" portion of FIG. 33*b*. Input signals are applied to all four flip-flops in parallel, but only that flip-flop which is clocked by a particular strobing or triggering signal is affected by the conditions at its input terminals at clocking time. Thus, the bits are expanded in time by a factor of four, as shown by lines DL1, DL2, DL3 and DL4 in FIG. 33*b* which represents input signals to the delay lines themselves.

Memory output gates

At the output terminals of the four delay lines, the bits are recombined in proper order, as shown in FIG. 34, by commutating the signals of delay lines DL1 and DL2 across the input terminals of flip-flop 312 at 1.5MC rate (phase A) while triggering this flip-flop with a signal shown in FIG. 33*b* as 313. This trigger signal is the result of the conjunction of $\overline{6MC}$ and $\overline{3MC}$ signals in AND-gate 313. Simultaneously with the above action, commutation of the bits from delay lines DL3 and DL4 occurs across the input terminals of flip-flop 315 in a similar manner but using phase B of the 1.5MC signals while triggering the flip-flop with a signal shown in FIG. 33*b* as 316. This triggering signal is the result of the conjunction of signals $\overline{6MC}$ and 3MC in AND-gate 316. This action combines the output of each pair of delay lines, as shown by the signals 312 and 315 and these two signals are then commutated across the input terminals of flip-flop 317 at a 3MC rate in a similar manner to that explained above to produce the DL1–4 and $\overline{\text{DL1–4}}$ output signals of which only DL1–4 signal is shown in FIG. 33*b*.

When the WRITE signal is not True, allowing recirculation of the delay line loop, the signals at DL1–DL4 and $\overline{\text{DL1–DL4}}$ pass through AND-gate 297 and OR-gate 298, as shown in FIG. 33*a*, thus maintaining the data in memory. Output signals DL1–DL4 and $\overline{\text{DL1–DL4}}$ are also applied to the 6MC delay lines for processing by the character generator 34.

Memory data organization

The digitally coded data stored in the main memory units 71–71''' is organized in a manner, such that, it is suitably available for generation of a cyclic presentation on a television raster scan display.

Figure 35:
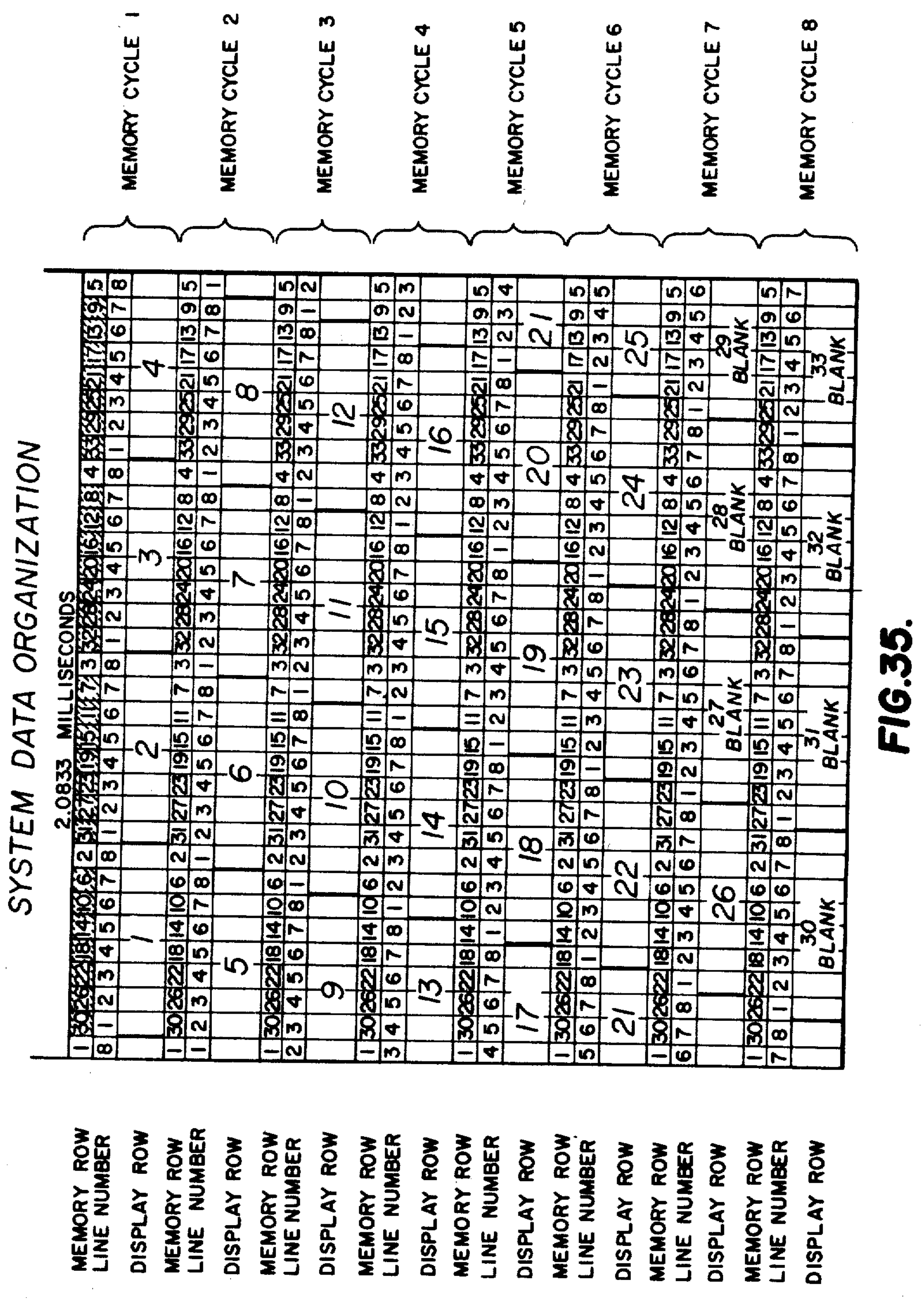
FIG. 35 is a chart illustrating the timing relationship and the organization of the data flowing through the system illustrated in FIG. 1.

FIGURE 35 is a timing diagram of eight memory cycles which indicate the time relationship between the 33 memory rows of stored data and the 33 display row times which make up one display field. This particular figure depicts the 26 display row case where the memory partitioning is determined by the S1 jumper setting. This figure may be easily converted to a two, four or eight display terminal timing diagram by reference to FIG. 10*a*. Only the display row numbers would change and only the 33rd display row would be blank for these other diagrams.

As shown in the figure, the memory is divided into 33 segments or memory rows, each lasting for 64 microseconds. Each such row is further divided into 64 "slots" of 1 microsecond duration each. The slots are numbered from 0 through 63 in each row. Rows are numbered from 1 through 33. Each row in FIG. 35 relates to an interval of time in main memory units 71–71''', containing one row of stored character data. Each row of character data stored in memory represents a displayable row of characters for the TV monitor 22. The memory row numbers indicated in FIG. 35 correspond to textual row numbers on the display for the 26 display row system. That is, the character data stored in memory row 1 determines what will appear in the first row of text on the display. (For an S8 jumper setting, memory row 5 would determine display row 1 of the display terminal 2.) Data is never written into the seven blank rows 27 through 33 for an S1 jumper setting. Provision for these blank rows in memory allows exact data synchronization between the main memory and the television raster. Blank rows 27 through 33 in memory prevent data from being transmitted to television display monitor 22 during the raster vertical retrace time. The vertical retrace time is the time required by the CRT electron beam to return to the top of the screen after completing the previous raster.

For other S jumper settings where memory rows 27 through 32 are displayed, more than one vertical synchronizing signal is used to allow time for the vertical retrace to occur on one display while another is displaying data.

The time each row of data is displayed on television monitor 22 is also indicated in FIG. 35. Each display row is equivalent to exactly eight memory rows. It should be noted that when memory row 1 becomes available, display row 2 begins, and so forth. This is emphasized in the first line of FIG. 35 by the cross hatching of the memory storage areas not utilized in the delay line memory but passed over during display row 1 time. Also note that during display rows 27 through 33, a blank memory row is always available for each blank display row. Thus, if vertical retrace of the electron beam is accomplished during display rows 27 through 33, no loss of display data will be incurred. Since the delay line memory is time synchronous with the television raster and memory, row number 1 is always available at the beginning of a new TV raster.

In FIG. 35, each complete cycle is equivalent to one display field or one vertical raster cycle. Therefore, two cycles of this timing diagram are required to make up one complete frame of TV video. From the above, it is now apparent that each field of the television presentation is equivalent to exactly eight data cycles of main memory units 71–71''', or 16.666 milliseconds. Also, each memory row is available for display once each field time or twice during a given frame. As a result, a 2:1 interlace is obtained. The first field presents the odd-numbered raster lines indicated by FIG. 11*b* and the second field presents the even-numbered raster lines indicated by FIG. 11*c*.

In the case of S jumper settings other than S1, the timing of the display row generation is exactly the same. However, depending on what jumper setting is used, the display rows after generation are distributed in groups to more than one display terminal. For example, for an S2 jumper setting, the first sixteen display rows generated are gated to the first display monitor and the second sixteen display rows are gated to the second display monitor, thus forming two independent video signals derived from the same memory. Since the two groups of sixteen display rows are generated consecutively, the beginning and end of a display field for each monitor must be different. Hence, each must have a different vertical synchronizing time. The picking of the vertical synchronizing time correctly guarantees proper display vertical centering on each monitor.

The line numbers indicated in FIG. 35 coincide with television raster lines where line number one through number eight during field one correspond to the odd-numbered raster lines indicated in FIG. 11*a*, and the same lines during field number two correspond to the even-numbered lines of FIG. 11*a*. These line numbers are generated by display timing 44 and act as a time reference to character generator 34 to indicate what portion or raster line of a character is to be composed.

A timing chart showing data arrangement by characters in a memory row is illustrated in FIG. 36. Each row stored in memory is time synchronous with each horizontal sweep time of the television raster. Each horizontal sweep time, of course, corresponds to a television raster line referred to hereinbefore. In the same manner in which blank memory rows were provided to allow time for vertical retrace of the CRT beam, blank character times are provided in a memory row to allow horizontal retrace time of the electron beam. This is illustrated in FIG. 36 where character times sixty-three through sixteen are left blank. FIGURE 36 also shows the timing of the horizontal synchronizing pulse. This horizontal synchronizing pulse is required by television monitor 22 to trigger the horizontal deflection circuits and occurs once for each memory row, thereby forcing the horizontal sweep circuits to be time synchronous with each memory row.

To illustrate data flow from main memory unit 71 to the display module 22, the following example is given. During a given line number eight of FIG. 35, a particular row of data in main memory unit 71 is transferred to buffer memory unit 72. That is, memory row number 2 is time coincident with the line number eight control signal just prior to generation of display row 2. During the presence of the line eight control signal, memory row 2 is transferred to buffer memory unit 72 where it is recirculated for eight line number times or until the next time the LINE 8 signal occurs. It is transferred to buffer memory unit 72 retaining the same data arrangement by character it had in main memory unit 71. This data arrangement is shown in FIG. 36. During the time that this row of data is retained by buffer memory unit 72, it is recycled at the same rate and in synchronization with the horizontal sweep of television monitor 22. Therefore, referring back to FIG. 35, memory row 2 is presented to character generator 34 eight times during display row 2. These eight times correspond to the odd-numbered raster lines of FIG. 11*a* during field one and to the even-numbered raster lines during field two. Thus, character generator 34 has presented to it the same character code of a given memory row eight times during the display of a row of text. In this manner, it is able to determine from the character code presented and the line number count, exactly what video word must be composed and transmitted to TV monitor 22. FIGURES 11*b* and 11*c* illustrate the video words composed and transmitted for the raster lines forming the character "A."

Display timing logic

Figure 37:
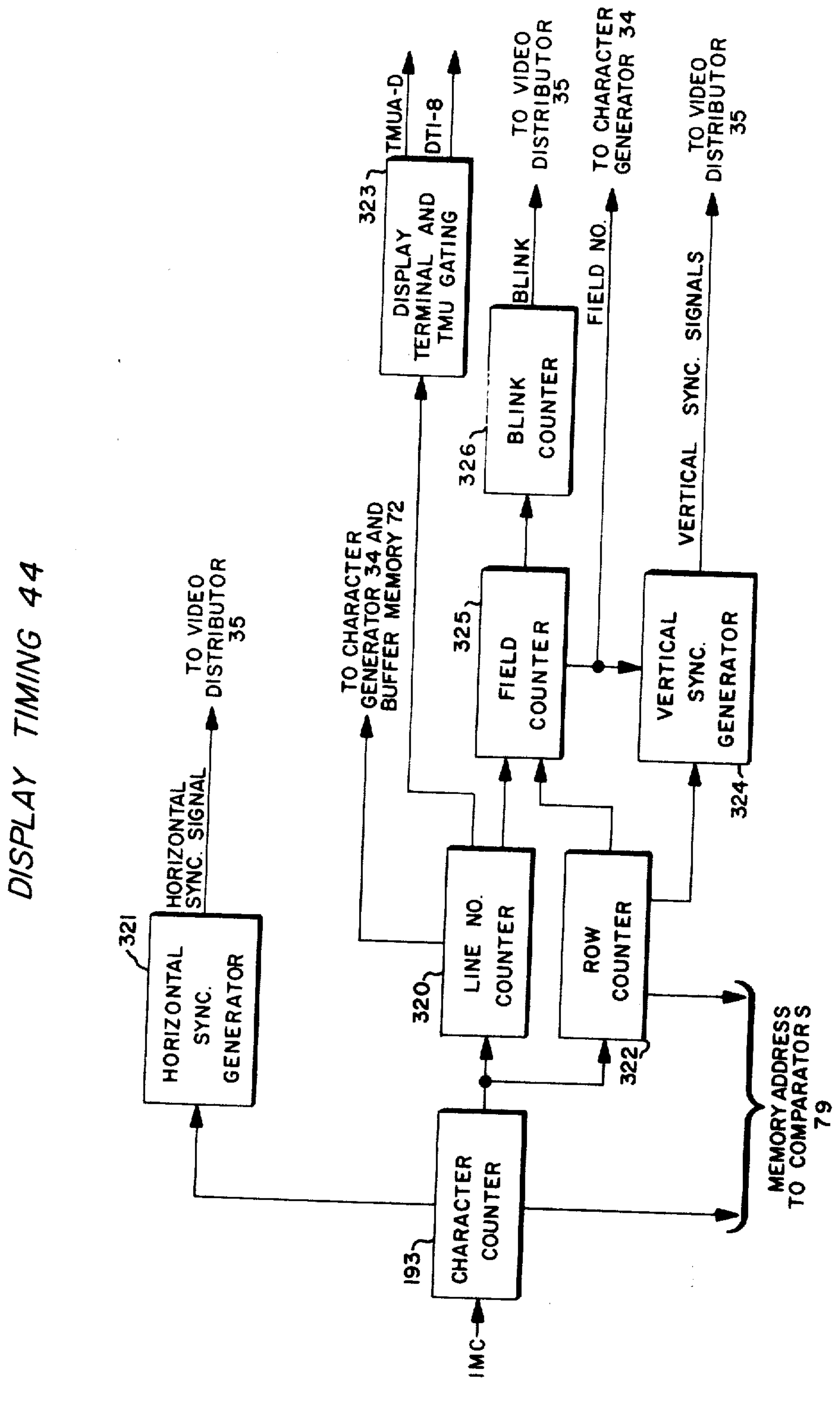
FIG. 37 illustrates in more detail the display timing logic shown in FIGS. 1, 1*a*, 1*c* and 10.

FIGURE 37 is a block diagram of the display timing 44 shown in FIG. 1. This logic generates all repetitive timing signals for the system. The fact that each functional unit of the system uses the same repetitive timing signals guarantees synchronization between each unit. The display timing logic fixes the time interval or memory location in the delay line memories to which a given character will be assigned. When a given row of data is transferred to buffer memory unit 72, it specifies to character generator 34 what raster line of video information it is to generate, and it generates horizontal and vertical synchronizing signals which synchronize the television rasters of each display monitor 22 to the rest of the multiple terminal data editing display system. Since a storage location in the delay line memory is the position in time of the desired data, the logic must keep accurate count of this position to be able to recover the data upon command. This is done by a character counter 193 which is timed by the 1MC clock pulse of the clock generator shown in FIG. 8.

Character counter 193 is a six stage flip-flop counter which steps one count each microsecond. It counts in straight binary form from an initial setting where all of the flip-flops represent a binary 0 to a binary 63 and then recycles. By definition, the contents of this counter always refer to the memory address of a given character within a given memory row of data.

The character counter 193 feeds the line counter 320, the horizontal sync generator 321 and the row counter 322. It steps the row counter 322 in a binary fashion as will be described later. The contents of the row counter 322 together with the contents of the character counter 193 make up the memory address count (MAC) used by the various comparators 79, 270 and 291 in the system. The line number counter 320 generates a sequence of signals used by the character generator 34 and the display terminal and TMU gating logic 323. One of the line number outputs is also used in the logic which loads the buffer memory unit 72.

The horizontal sync generator 321, driven by an output from the character counter 193, provides horizontal synchronization signals to the video distributor for subsequent transmission to the display monitors. The keyboard input multiplexer 69 also utilizes the horizontal sync signals.

The row counter 322 feeds the vertical sync generator 324 which generates a set of vertical sync signals utilized by the video distributors 35. The field counter 325 is also driven by the row counter 322 as well as the line number counter 320. The field counter 325 determines which raster field the display is generating at a given time and its output is counted down further by the blink counter 326 which controls the rate at which characters blink on the display. The field counter 325 also feeds the character generator 34 which designates which field of video information is to be generated at any given time. The display terminal and TMU gating logic 323 generates the MMUA through MMUD timing signals used by the memory read gates 116 and 272 of the keyboard input multiplexer 69 and the communication interface 43. The display terminal and TMU gating logic also generates the DT1 through DT8 signals which are used by the video distribution logic 35.

The following paragraphs describe in more detail the functional blocks shown in FIG. 37.

Character counter

Figure 38:
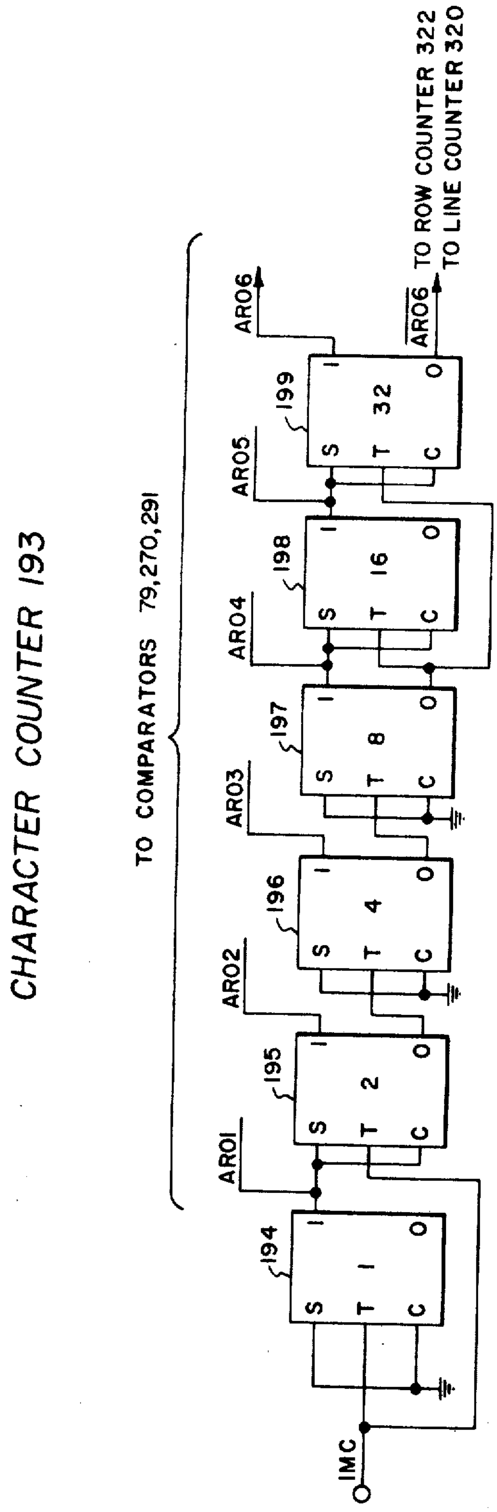
FIG. 38 illustrates in more detail the character counter shown in FIG. 37.

FIGURE 38 is a logic diagram of character counter 193 which is essentially a ripple counter. Flip-flop 194 is toggled on the falling edge of every 1MC clock pulse. Toggling herein is defined as the flip-flop changing into the opposite condition of its present state. Flip-flop 195 toggles on every other falling edge of the 1MC clock pulse. Flip-flop 196 toggles on every fourth edge of the clock pulse. Flip-flop 197 toggles on very eighth edge of the clock pulse. Flip-flop 198 toggles on every sixteenth edge of the clock pulse, and flip-flop 199 toggles on every thirty-second edge of the clock pulse. The numerals in the flip-flop symbols of FIG. 38 indicate the numerical weight represented by the setting of that particular flip-flop of the counter, assuming that all other flip-flops in the counter at that time are reset.

Horizontal synchronizing generator

The horizontal synchronizing generator 321 monitors character counter 193 for binary counts of eight and nine.

Figure 39:
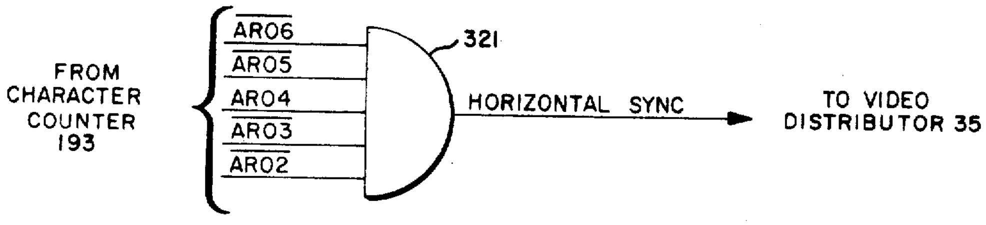
FIG. 39 illustrates in more detail the horizontal synchronizing generator shown in FIG. 37.

When these counts are reached, the horizontal synchronizing generator 321 generates the horizontal synchronizing pulse illustrated in FIG. 36. FIGURE 39 illustrates a logic diagram of the horizontal synchronizing generator 321 which is simply a five input AND-gate which decodes the counts eight and nine of the character counter 193.

Line counter

Figure 40:
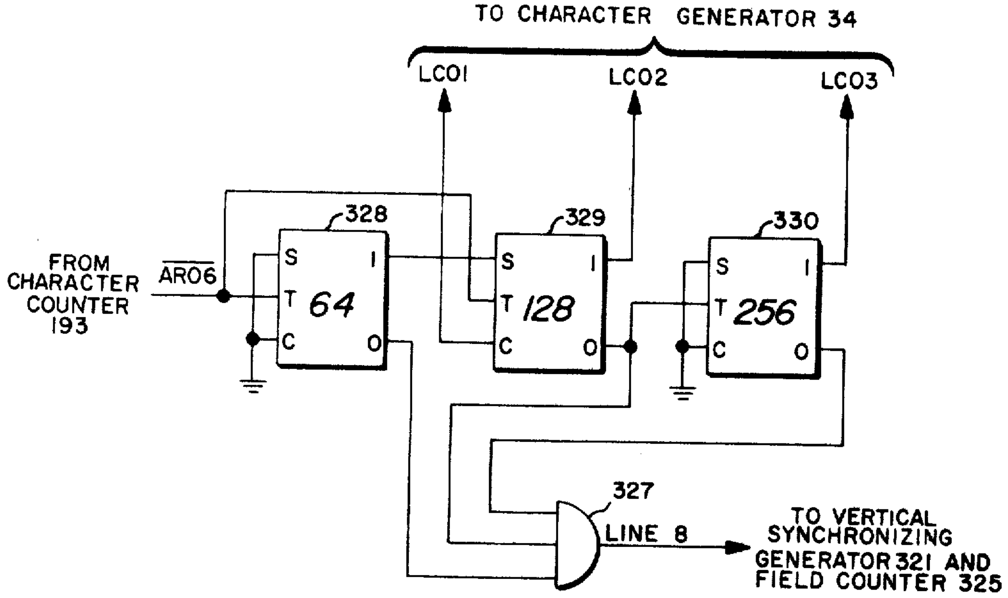
FIG. 40 illustrates in more detail a portion of the line counter shown in FIG. 37.

For each cycle of the character counter 193, i.e., a binary count of sixty-three, a signal $\overline{AR06}$ is transmitted to the line counter 320 and the row counter 322. Line counter 320 is a normal binary counter which counts from a binary 0 through a binary 7, thereby generating eight binary values corresponding to the line signals labeled LINE NUMBER in FIG. 35. FIGURE 40 is a logic diagram of this counter which is similar to character counter 193 shown in FIG. 38. FIGURE 40 illustrates the logic for decoding LINE 8 or the binary 7 signal. This decoding is accomplished by AND-gate 327. The input signals to AND-gate 327 are the output signals from the 0-output terminals of flip-flops 328, 329 and 330. LINE 8 appears as a pulse sixty-four microseconds wide occurring every eight line times or approximately every 512 microseconds.

Row counter

Figure 41:
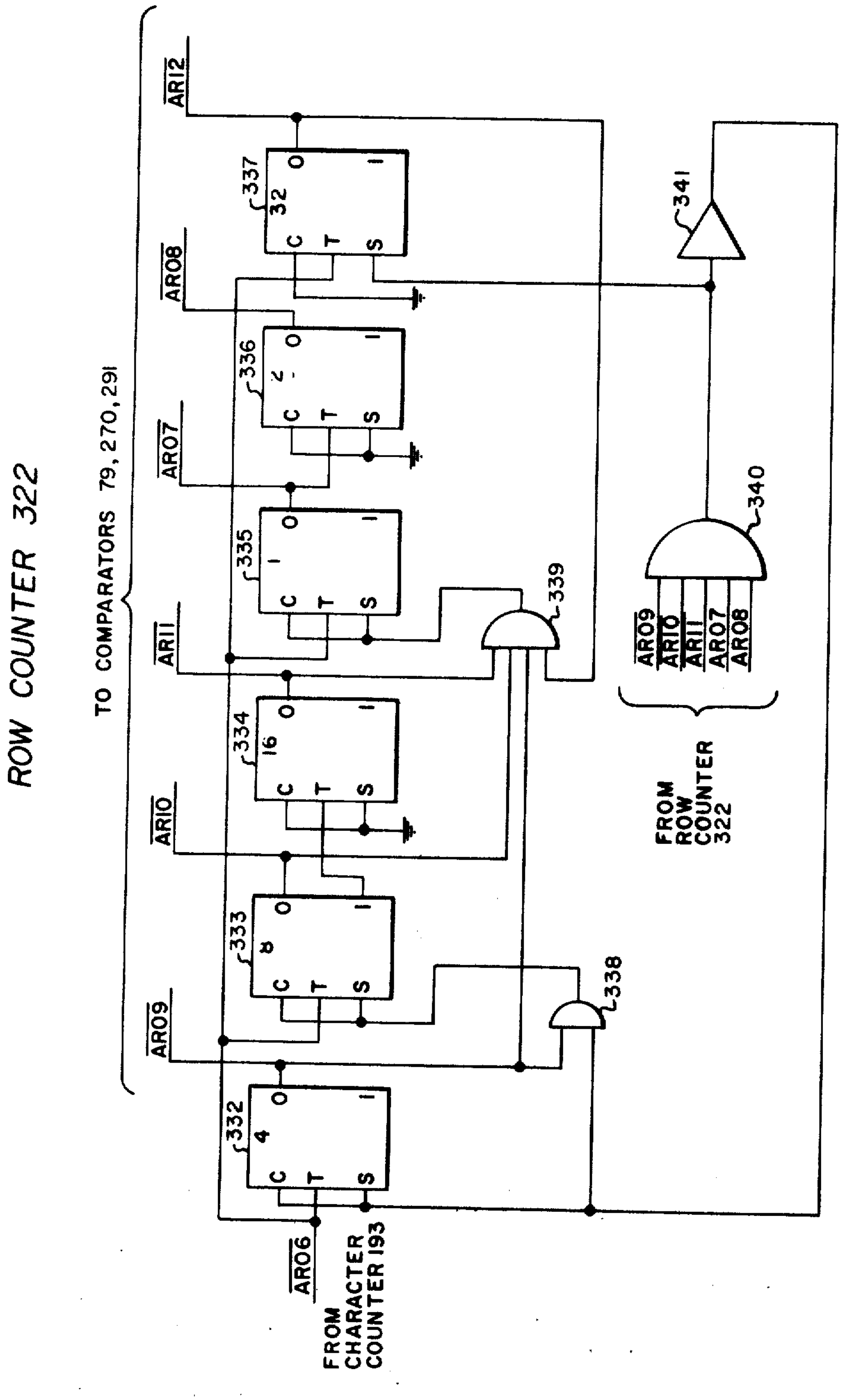
FIG. 41 illustrates in more detail the row counter shown in FIG. 37.

The contents of row counter 322 are, by definition, the memory address row location. Row counter 322 is triggered by the output signal $\overline{AR06}$ of the 0-output terminal of flip-flop 199 of character counter 193 every sixty-four microseconds, thus forming the memory row arrangement illustrated in FIG. 35. FIGURE 41 is a logic diagram of this counter comprising serially connected flip-flops 332, 333, 334, 335, 336 and 337. AND-gates 338, 339, 340 and inverter 341 cause this counter to count in the manner illustrated in FIG. 42. FIGURE 42 is an output table of row counter 322. The first column labeled STATE in the table is the step number of the counter. The counter steps through thirty-three different states and then repeats itself.

The next six columns of binary 1's and 0's, reading from left to right in the table, show the states of each flip-flop in the counter at a particular time. These six columns indicate the thirty-three different states the counter can assume during operation. Each of these columns is assigned a binary weight with the binary weights arranged in an order different from most binary counters. Note that signal AR09 has a binary weight of four, signal AR10 has a binary weight of eight, signal AR11 has a binary weight of sixteen, signal AR07 has a binary weight of one, signal AR08 has a binary weight of two, and signal AR12 has a binary weight of thirty-two, indicated by numerals in flip-flops 332–337. With these binary weights assigned, each state of the counter may be evaluated as shown in the next column of FIG. 42, labeled BINARY VALUE. Each of these binary values corresponds to a memory row number as shown in the last column of the table. Note that the sequence in which these row numbers appear corresponds exactly to the sequence of the memory row numbers which are shown in FIG. 35. By implementing row counter 322 to count in the manner illustrated in FIG. 42, and by using row counter 322 in conjunction with comparator 79 to write into memory, memory data by rows is automatically time organized as shown in FIG. 35.

Vertical synchronizing generator

The vertical sync generator 324 creates eight different vertical sync signals which are used by the video distribution logic 35. Eight different sync signals are utilized in the case where there are eight display terminals 20, 22 tied to a given terminal memory unit, 71, 72 and 36. When there are eight display terminals 20, 22, each displays four rows of data and the eight VERTICAL SYNC signals are required in order to center each given display. That is, each display is centered by virtue of the fact that its vertical sync timing occurs at the right time.

Figures 42A, 43:
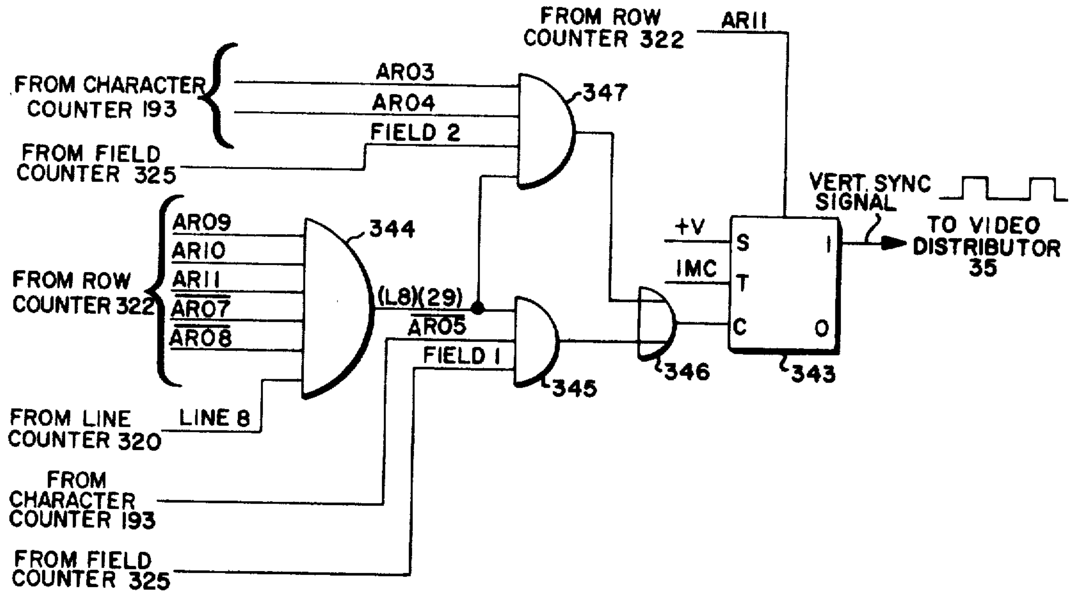
FIG. 42*a* is a chart illustrating the relationship of the various vertical synchronizing signals.
FIG. 43 illustrates in more detail a part of the vertical synchronizing generator shown in FIG. 37.

FIGURE 42*a*, the vertical sync table, illustrates the time at which each VERTICAL SYNC signal is generated in terms of memory row and display row. The table also indicates which VERTICAL SYNC signals are utilized by which displays for various memory partitioning configuration.

Using FIG. 35, which is a timing diagram showing the relationship between memory rows and display rows along with FIG. 42*a*, one can see that the number 8 VERTICAL SYNC signal occurs when display row 17 and memory row 13 are coincident. This occurs at the beginning of display row 17 as can be seen in FIG. 35. As was explained hereinbefore, memory rows 1 through 4 are displayed by display terminal 1 when S8 is set. Now referring to FIG. 35, one can see that for a VERTICAL SYNC signal occurring at row 17 in memory row 13, the display rows 1 through 4 would be approximately eight milliseconds after the vertical sync time. As can be seen in FIG. 35, display row 17 occurs approximately 8MS in time after display rows 1 through 4. Therefore, if the VERTICAL SYNC signal occurs at display row 17, display rows 1 through 4 will be approximately centered vertically on the display.

Taking another example, in FIG. 42*a*, display terminal 5 for an eight display terminal system would select the number 4 VERTICAL SYNC signal which occurs during display row 33. As can be seen in FIG. 10*a*, display terminal 5 on an eight display terminal system would display memory rows 17, 18, 19 and 20. Now referring back to FIG. 35 again, display row 33 occurs approximately 8MS after memory rows 17, 18, 19 and 20. Thus, that display would also be approximately centered.

Figure 43A:
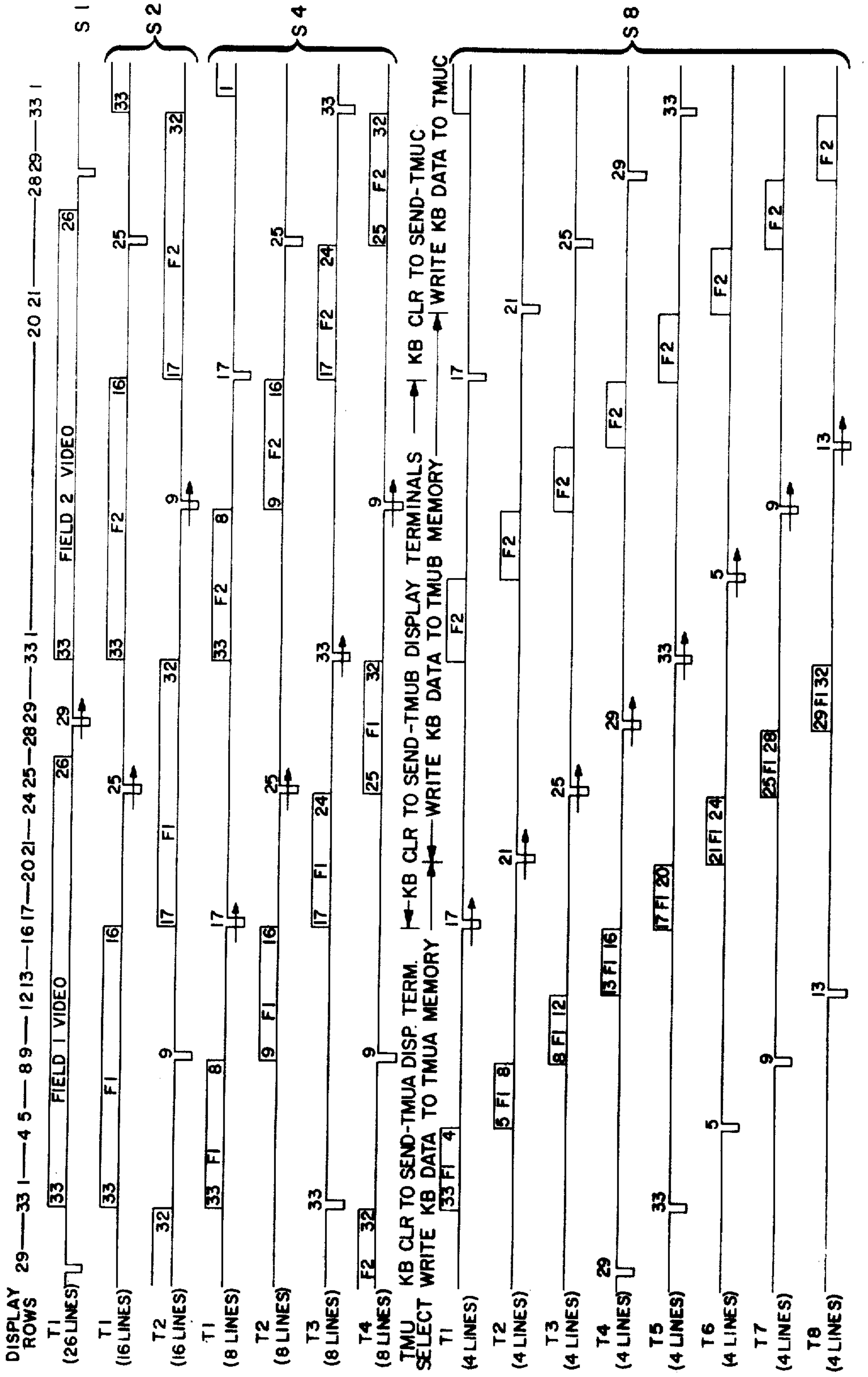
FIG. 43*a* is a video distribution timing diagram.

FIGURE 43*a* illustrates the detailed timing of each VERTICAL SYNC signal with respect to the video information to every display monitor for all possible S jumper settings.

This figure shows the timing for both fields of video seen by each terminal. It gives the display row numbers indicating when they are generated by the character generator and the time of each vertical sync to guarantee vertical centering of the display.

A set of counts of row counter 322 are decoded by the vertical sync generator 324 along with a field count of field counter 325 shown in FIG. 37 to obtain the vertical synchronizing signals. Each vertical synchronizing signal is a 192 microsecond pulse which occurs at the beginning of each field. When it occurs during field number one, it falls at the beginning of LINE 8 heretofore explained with reference to FIG. 40. When it occurs in conjunction with field number two, it always falls twelve microseconds after the beginning of a LINE 8. This causes a staggering by twelve microseconds of the vertical synchronizing signal every other field time, thereby guaranteeing proper interlace of the two fields of the display. The results of this staggering effect in the vertical synchronizing signal is to cause the television raster during field number two to be slightly displaced from the television raster during field number one. This displacement is just the right amount to cause the raster lines of field two to interleave between the raster lines of field one. In this manner, the 2:1 interlace required by standard television monitors is achieved.

The logic of the vertical sync generator 324 is illustrated in FIG. 43. The vertical synchronizing signal appears at the 1-output terminal of flip-flop 343. The signal pulse appears when the flip-flop 343 is cleared and disappears when the flip-flop is set. Using the vertical sync table of FIG. 42*a*, it can be seen that conjunction should occur and an output signal is generated in AND-gate 344 when row 29 and line number 8 have been encountered. Referring to FIG. 35, it is noted that line number 8 and row 29 are coincident once every sixteen milliseconds.

FIGURE 43 is an example of the logic used in the generation of one of the vertical synchronizing signals. With reference to FIG. 43, it is noted that the output signal of AND-gate 344 is transmitted to one of the input terminals of AND-gate 345. Signals to the two other input terminals of AND-gate 345 are obtained from character counter 193 and field counter 325 of FIG. 37. Since signal $\overline{AR05}$ is low (True) at the beginning of each character count during field one of a TV raster display operation, AND-gate 345 will be enabled. A low level output signal from AND-gate 344 will cause conjunction in AND-gate 345 which will be transmitted to OR-gate 346 causing conjunction therein and resulting in an output signal being transmitted to the clear terminal of flip-flop 343. Thus, flip-flop 343 will be cleared at the beginning of the character count or when signal $\overline{AR05}$ is present. If field two of the display operation is occurring, then AND-gate 347 and OR-gate 346 are used to clear flip-flop 343. In this instance, resetting of the flip-flop takes place when signals AR03 and AR04 are present which corresponds to character count twelve. Thus, the rising edge of every other vertical synchronizing signal will be delayed by twelve microseconds. Flip-flop 343 is set when signal AR11 goes False, i.e., to a high level. Signal AR11 goes False 192 microseconds after row count 29 occurs. Referring to FIG. 42, it is noted that signal AR11 goes False at the beginning of memory row number 13.

Field counter

The output signal of the field counter 325 is used by character generator 34 to determine whether it is to generate video signals for an odd raster line or an even raster line of a display frame. The logic of field counter 325 is shown in the top portion of FIG. 44. The AR12 input signal to AND-gate 348 corresponds to memory row 33. This can be seen by referring to the table shown in FIG. 42. In FIG. 35, it can be seen that line number 8 and memory row 33 occur together only once every eight memory cycles or once each sixteen milliseconds. Therefore, the output signal from AND-gate 348 will appear once each sixteen milliseconds and last for approximately sixty-four microseconds. The output signal from AND-gate 348 is inverted by inverter 39 and the inverter signal is applied to AND-gate 350. AND-gate 350 is inhibited by the False input signal. The True output signal from AND-gate 48 is also applied to the set terminal of flip-flop 351 for sixty-four microseconds while the input signal to its clear terminal is held at a high potential or False condition. Thus, flip-flop 351 is set to its 1-state. When flip-flop 351 goes from its 0- to its 1-state, the potential at its 0-output terminals rises to a high level. The next time the LINE 8 signal occurs (the next row 1, see FIG. 35), the AR12 signal (row 33) is False. Therefore, the output signal of AND-gate 348 is False and the output signal of inverter 349 will be True. Thus, with the Line 8 signal True and the output signal of inverter 349 True, AND-gate 350 will be enabled. AND-gate 350 transmits an output signal to the clear terminal of flip-flop 351 which causes flip-flop 351 to reset with the next falling edge of the 1MC clock pulse. The falling edge of the signal from the 0-output terminal of flip-flop 351 is transmitted to the T terminal of flip-flop 352 and triggers this flip-flop to the opposite state of its present condition. Thus, flip-flop 352 is toggled approximately every sixteen milliseconds creating the field one and field two signals from its 1- and 0-output terminals.

Blink counter

Figure 44:
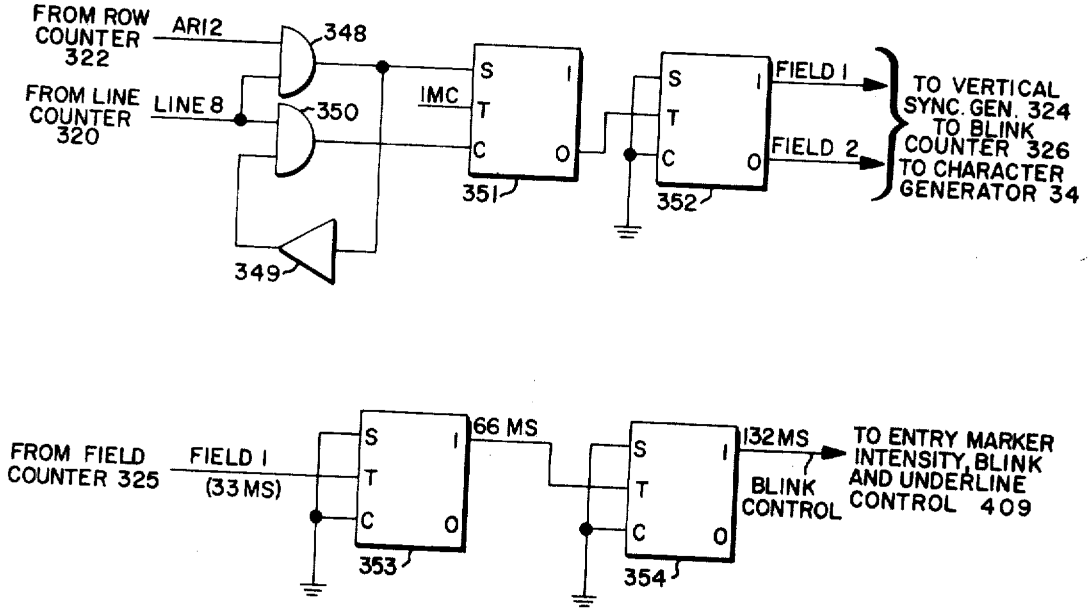
FIG. 44 illustrates in more detail the field and blink counters shown in FIG. 37.

Field counter 325 is used to drive a blink counter 326 also shown in FIG. 44 whose output signal transmitted to the video distributor logic 35 is a cyclic signal used to blink characters on the screen of display monitor 22. Flip-flops 353 and 354 are connected such that the trigger terminal of flip-flop 353 is connected to the 1-output terminal of flip-flop 352 and the 1-output terminal of flip-flop 353 is connected to the trigger terminal of flip-flop 354. The 33 millisecond signal from the 1-output terminal of the field counter 325 is reduced to a frequency of 66 milliseconds by flip-flop 353 and reduced again to 132 milliseconds by flip-flop 354, thereby generating a blink control signal with a 132 millisecond period. This 132 millisecond signal is applied to the blink/blank control and the EM INT. and underline control as a timing signal.

Display terminal and TMU gating logic

Figure 45:
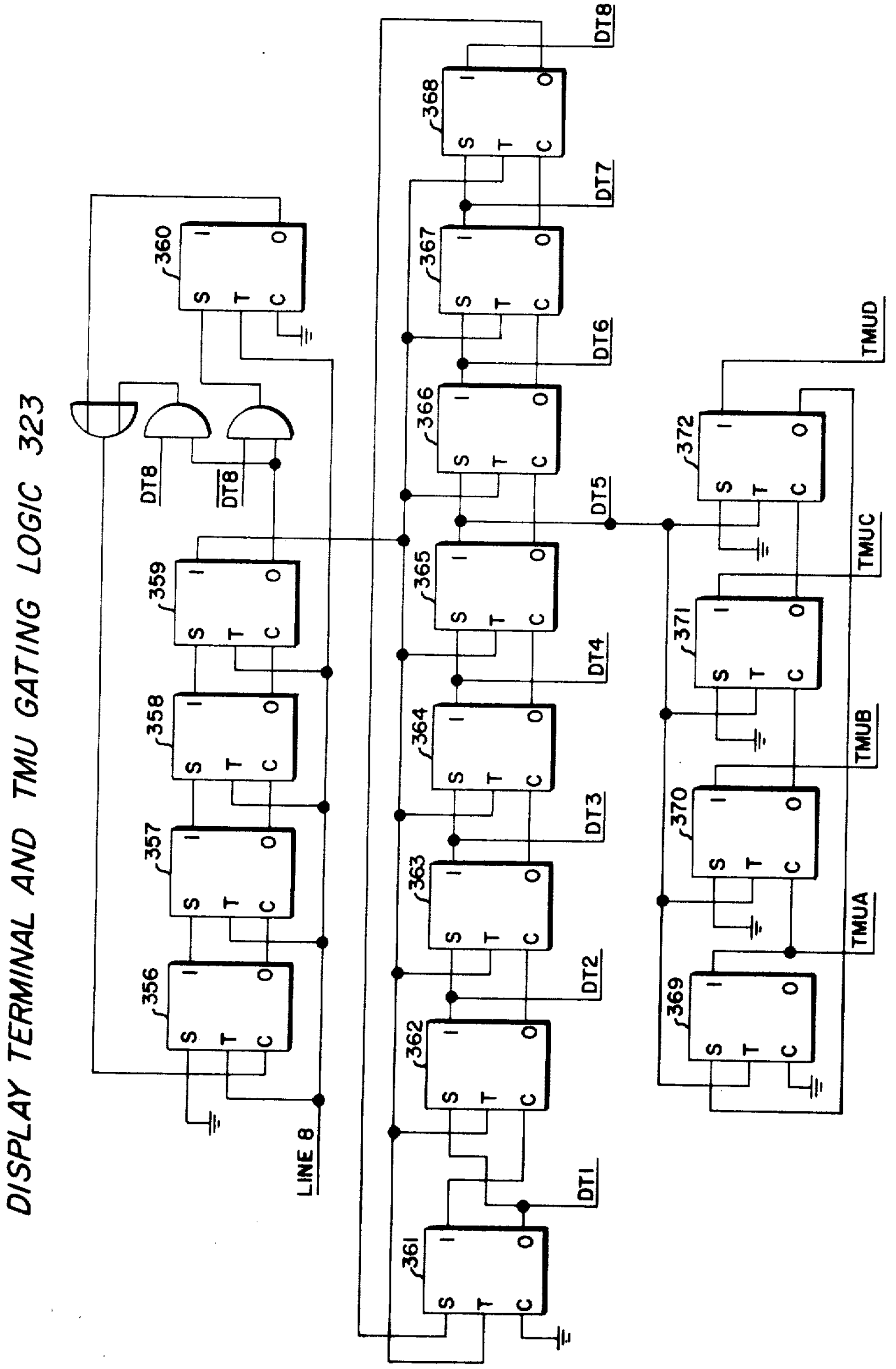
FIG. 45 illustrates in more detail the display terminal and TMU gating logic shown in FIG. 37.

The display terminal and TMU gating logic 323 illustrated in simplified logic form in FIG. 45 performs the function of generating basic timing signals which are used by the video distributors 36 through 36''' for gating various portions of the video information generated to each of the given displays 22. It also generates timing signals used by the keyboard input multiplexer 69 and the communication interface 43 for reading data into and out of memory. The display terminal and TMU gating logic 323 generates two types of timing signals, the DT1 through DT8 signals and the TMUA through TMUD signals.

As can be seen in FIG. 45, the display terminal and TMU gating logic 323 is a counter consisting of three sections. The first section, consisting of flip-flops 356 through 360, counts the occurrence of the LINE 8 signal which occurs once every display row as described hereinbefore. This counter counts four LINE 8 signals, or what corresponds to four full display rows of information.

The output of flip-flop 359 feeds the second section of this logic, flip-flops 361 through 368. This second section, as can be seen in the figure, generates the DT1 through DT8 signals. This section is composed of an arrangement of flip-flops which are basically in serial shift register form. That is, each time a falling signal transition occurs at the one output of flip-flop 359, all of the flip-flops are triggered. When each flip-flop is triggered, the state of the preceding stage is read into that particular stage. When power is first turned on, all of the flip-flops in FIG. 45 are preset by the preset pulser 66 of the master clock generator of FIG. 8 (not shown in this figure) at power turn-on makes all of the 1-output signals of flip-flops 361 through 368 go low. Therefore, signals DT2 through DT8 will all be low while signal DT1 coming from the 0-output terminal of flip-flop 361 will be high. In this case, a high level signal is an "on" condition so signal DT1 indicates an "on" condition at this point.

When the first transition occurs at the output terminal of flip-flop 359, all of the flip-flops 361 through 368 are triggered. Flip-flops 361 will be cleared since its clear input is grounded. Flip-flop 362 will also be cleared since the 1-output of 361 is low and the 0-output terminal of 361 is high. At this first transition, none of the other flip-flops 363 through 368 will change states since each has a low level at its set input terminal. At this point in time, DT2 is the only signal which is high. DT2 remains high until the next transition of the output signals of flip-flop 359. At this time, the signal output of flip-flop 362 is such that flip-flop 363 will change states while none of the other flip-flops will change states. At this point in time, signal DT3 of the terminal is "on" and all DT terminals are not. This procedure will continue with each transition of the output signals of flip-flop 359 until the high level condition has shifted through to terminal DT8. The 0-output signal of flip-flop 368 feeds back into the set input terminal of flip-flop 361. Therefore, after terminal DT8 is high, then flip-flop 361 will change states making terminal DT1 high again. This section of the display terminal and TMU gating logic 323 recycles in this fashion continuously.

The third section of the display terminal and TMU gating logic 323 generates the TMUA through TMUD timing gates. This third section is again a serial shift counter similar to the second section above. It is composed of flip-flops 369 through 372 which are triggered by the transition of the signal of terminal DT5. Again these flip-flops cycle continuously as the flip-flops 361–368 did.

Buffer Memory

As shown in FIG. 10, there are four buffer memory units 72–72''' (BMUA through BMUD), each associated with one of the main memory units 71–71'''. All four BMU's are identical, so only one will be described herein.

Figures 46, 47:
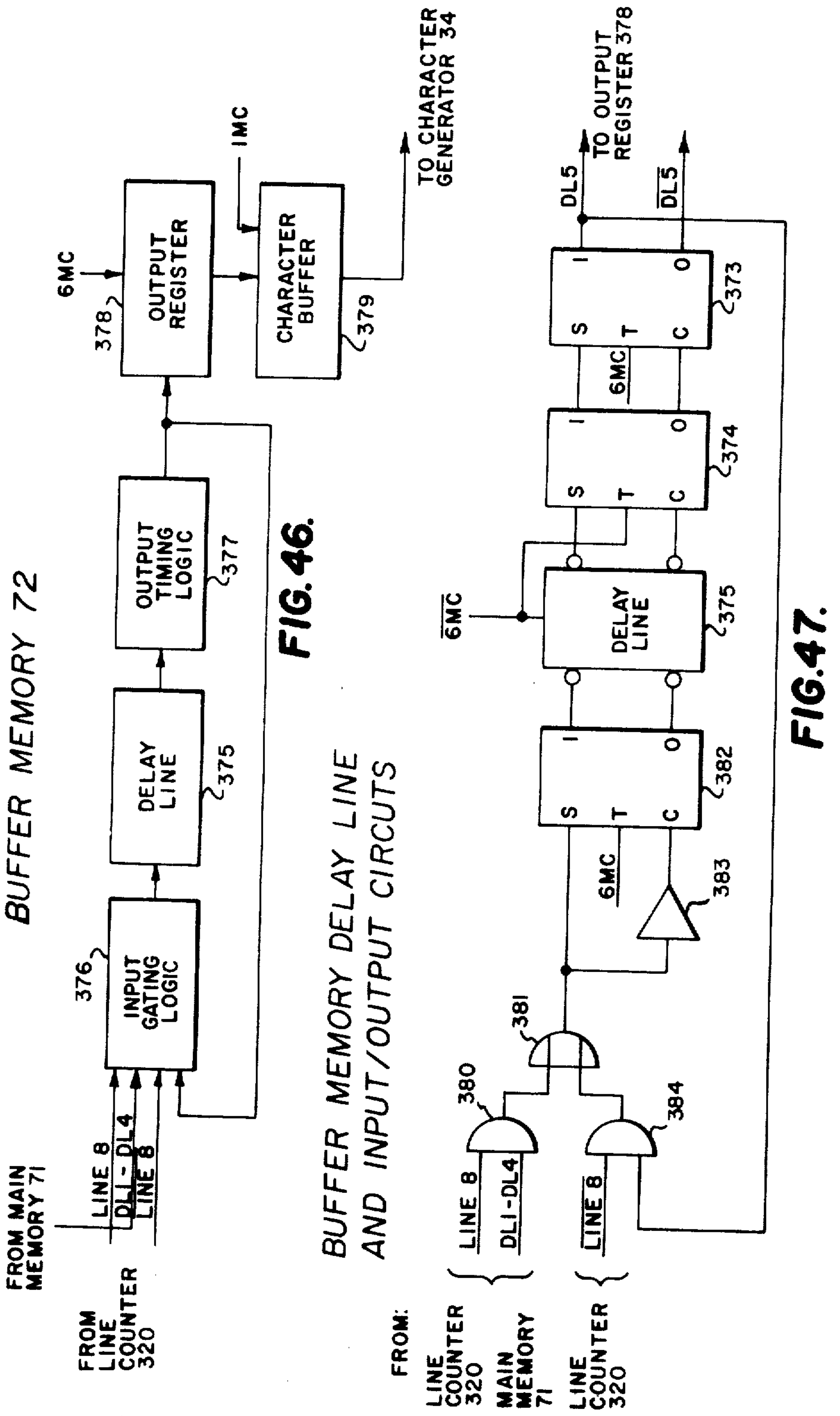
FIG. 46 illustrates in more detail a block diagram of the buffer memory shown in FIG. 10.
FIG. 47 illustrates in detail the buffer memory delay line and input/output circuits shown in FIG. 46.

The buffer memory unit 72, shown in detail in FIG. 46, uses a 6MC glass delay line 375 for storage. This memory is capable of accepting one complete memory row of data from main memory unit 71 and holding the data by recycling it in the same fashion as the main memory. Buffer memory unit 72 recycles each memory row of data for one complete display row time or eight cycles of the buffer memory. Data is transmitted to the buffer memory at a 6MC bit rate through input gating logic 376. Delay line 375 receives the data from input gating logic 376 and recycles it through output timing logic 377 back to input gating logic 376 sixty-four microseconds later. Character data is transferred from output timing logic 377 to output register 378 continuously in serial form. Output register 378 is a six bit shift register which shifts at a 6MC rate as it accepts each bit of data from the output timing logic 377. As soon as the output register 378 has accumulated one six bit character, character buffer 379 receives that character in bit parallel form during the time the first bit of the next character is being transmitted into the first flip-flop of output register 378. The character buffer 379 transmits each character it receives to the character generator 34 in bit parallel form.

Buffer memory input/output circuits

FIGURE 47 illustrates the logic of the input gating logic 376, the buffer memory delay line 375, and the output timing logic 377. Input AND-gate 380 receives data from main memory unit 71 when LINE 8 is True. LINE 8 is a sixty-four microsecond wide timing signal that occurs once each 512 microseconds (note FIG. 35 for timing detail). The data from main memory unit 71 is transmitted to AND-gate 380 at a 6MC rate in bit serial form. During the time that the LINE 8 signal is True, data flows through AND-gate 380 and OR-gate 381 to the S terminal of flip-flop 382 and through inverter 383 to the C terminal of the flip-flop, thereby setting and resetting flip-flop 382 according to the data received. While data is being accepted from main memory unit 71 and transmitted to the buffer memory delay line, the $\overline{\text{LINE}}$ $\overline{8}$ signal presented to AND-gate 384 inhibits data from being transferred from flip-flop 373 to AND-gate 384 for recirculation through the buffer memory delay line. Thus, as new data is read into the buffer memory unit 72, all old data stored is erased or lost.

All data flowing through flip-flop 382 is presented to delay line 375 which has a delay time of sixty-four microseconds. The internal circuitry of delay line 375 is driven by the $\overline{\text{6MC}}$ clock signal which transmits the data stored in time sequence to flip-flop 374. This same clocking signal also triggers flip-flop 374, thus reestablishing in flip-flop 374 the data bit by bit in the time sequence of delay line memory 375. Flip-flop 373 is used to retime the data to the 6MC clock timing rate so that it is in time sequence with the clock timing of the main memory data being read into the buffer memory.

The output signals DL5 and $\overline{\text{DL5}}$ of flip-flop 373 are transmitted to output register 378 shown in FIG. 46. This register, along with the character buffer 379, is shown in more detail in FIG. 48. Output register 378 comprises a plurality of flip-flops 385 through 390 serially arranged in shift register form and triggered by the 6MC clock pulse of the clock generator. The data appears at the output timing logic 377 in bit serial form and is shifted through output register 378 at a 6MC pulse rate. As can be seen in the logic diagram of FIG. 48, once each microsecond all bits stored in output register 378 are shifted in parallel to character buffer 379. The character buffer comprises flip-flops 391 through 396 of FIG. 48. Both the 1- and 0-output terminal signals of each of the character buffer flip-flops 391–396 are transmitted to the character generator 34. At this point, it should be clear that the character generator is receiving data from the character buffer 379 in bit parallel form at a 1MC character rate with no interruption between characters.

Character generator

The character generator 34 is essentially a code conversion device. It accepts data from the four buffer memory units 72, 72', 72'' and 72''' on a time multiplex basis. It receives six bits of character data from each buffer memory each microsecond which means four six-bit codes are presented to the character generator every microsecond or one code per one-fourth microsecond. At the same time, the character generator is receiving line and field number control signals from the display timing 44. Each of the character codes along with the line and field number count is converted to a twelve bit word of information which corresponds to twelve picture segments of a character position as described hereinbefore. This twelve bit word is then transmitted in parallel to the corresponding video distributor 35. Each twelve bit video word resulting from an input from BMUA is transmitted to VDUA. Each resulting twelve bit video word from an input from BMUB is transmitted to VDUB. Each resulting twelve bit video word from an input from BMUC is transmitted to VDUC and each resulting video word from an input from BMUD is transmitted to VDUD.

Figure 49:
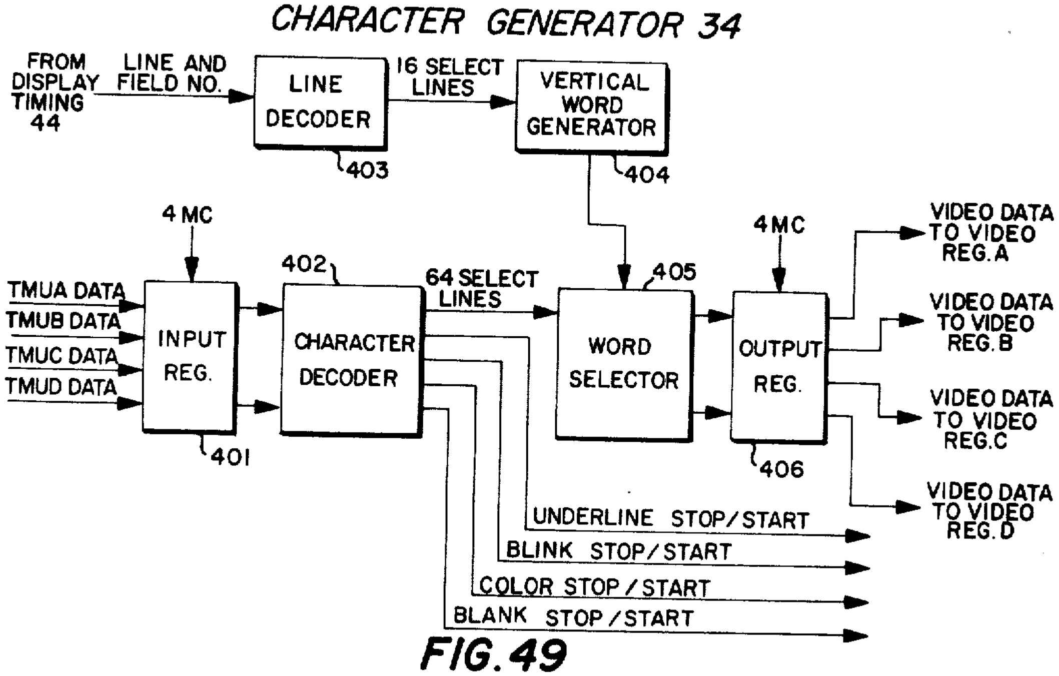
FIG. 49 illustrates in more detail the character generator shown in FIGS. 1, 1*a*, 1*c* and 10.

FIGURE 49 is a block diagram of character generator 34. Input register 401 continuously accepts character codes from the four buffer memory units at a 4MC rate as described in the preceding paragraph. The output signals of the input register 401 are presented to the character decoder 402 in parallel format.

The line decoder 403 accepts three bits of data representing a line count and one bit of data representing a field number from the display timing 44 shown in FIGS. 1 and 10. It decodes these four bits of data into sixteen different control signals or select lines. These sixteen control or selection signals drive a vertical word generator 404, which comprises approximately one hundred combinations of sixteen bit words corresponding to vertical groups of picture segments of the character array used in this data editing display system (see FIG. 11*a*). The logic of vertical word generator 404 comprises a set of multi-input OR-gates. Each multi-input OR-gate is driven by a set of output signals from the line decoder 403. To determine what logical operations are to be performed, every character to be generated is plotted graphically as illustrated in FIG. 13. From this plot of all the characters, every different combination of vertical picture segments is determined. For example, in the case of the symbol A, there are three different vertical words required. Referring to the character A in FIG. 11*a*, these words are defined as follows:

(1) The vertical word described by picture segment three of all raster lines. This vertical word is identical to the vertical word formed by picture segment nine;

(2) The vertical word described by picture segment four of all raster lines. This vertical word is identical to picture segment eight; and (3) The vertical word described by picture segment five of all raster lines. This vertical word is the same for picture segments six and seven.

In this manner each character of the character set chosen is plotted and all different vertical word combinations are determined for the set of character symbols implemented. The one hundred different vertical words referred hereinbefore result when the set of character symbols shown in FIG. 13 are plotted and implemented.

Character decoder 402 accepts character data from the input register 401, at a 4MC rate. Each character is accepted parallelly by bit and is decoded into sixty-four different control signals by character decoder 402. These sixty-four different control signals are combined in a word selector 405 with the output signals from the vertical word generator 404. Word selector 405 comprises a set of twelve logic trees of AND- and OR-gates. Each logic tree output signal corresponds to a bit or picture segment in the video word transmitted to the display. These twelve video bits of information are presented in parallel to the output register 406 at the same time a new character is being presented to the character decoder 402.

In addition to the generation of sixty-four select lines for use by the word selector 405, the character decoder generates other control signals for the blink/blank control 407, the color control 408 and the EM INT. and underline control 409.

The output register 406 accepts the video words generated by the word selector 405 at a 4MC rate and distributes each word to the corresponding video distributors 36, 36', 36" and 36'".

Line decoder

Figure 50:
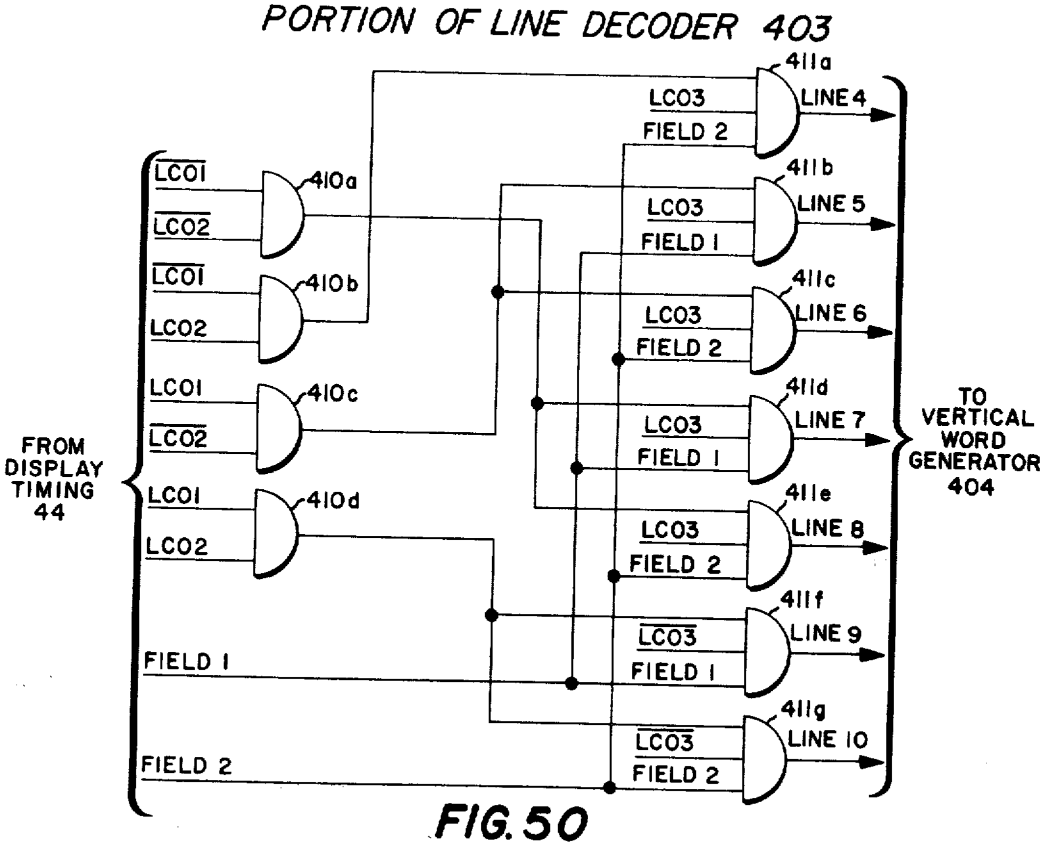
FIG. 50 illustrates in more detail a portion of the line decoder shown in FIG. 37.

FIGURE 50 shows a portion of the logic of the line decoder 403 shown in FIG. 49. The LC01, LC02, LC03 and FIELD 1 and FIELD 2 input signals are from the display timing 44 heretofore discussed. AND-gates **410*a* through 410*d* decode the LC01 and LC02 signals into four select signals which are combined in AND-gates 411*a* through 411*g* with the LC03 and FIELD 1 and FIELD 2 signals. The output signals of AND-gates 411*a* through 411*g* represent seven of the sixteen select lines generated by the line decoder 403**.

Vertical word generator

Figure 51:
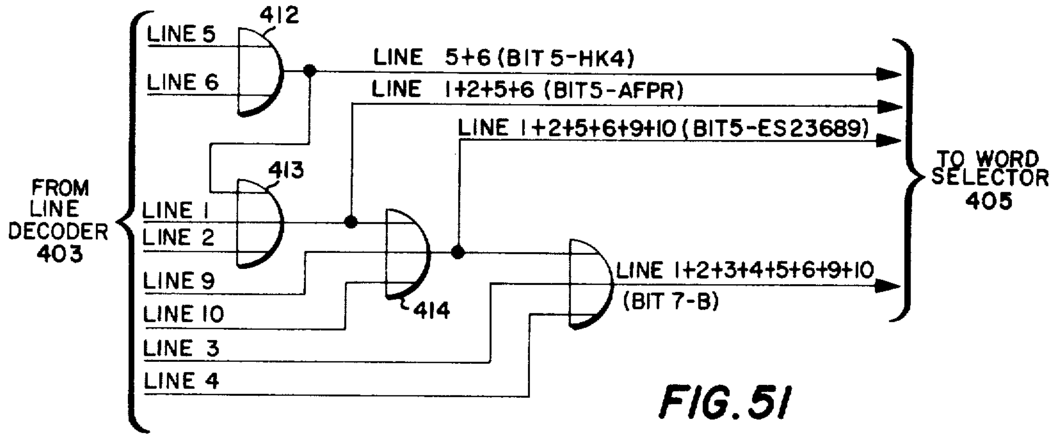
FIG. 51 illustrates in more detail a portion of the vertical word generator shown in FIG. 49.

A portion of the vertical word generator 404 is shown in FIG. 51. This portion generates bit 5 for the symbols A, F, P, R, H, K, 4, E, S, 2, 3, 6, 8, 9 and bit 7 for the symbol B. Line numbers 1, 2, 3, 4, 5, 6, 9 and 10 are accepted from the line decoder 403 and formed into the various output signals shown in FIG. 51. It should be noted from this figure that once a group of lines have been combined, they are used in as many places as possible. For example, signals representing LINE 5 and LINE 6 are transmitted as input signals to OR-gate 412 and the output signal of this OR-gate is used as bit or picture segment 5 in the symbols H, K and 4. This same signal is used as an input signal by OR-gate 413 to generate an output signal representing LINES 1+2+5+6. The output signal of OR-gate 413 is used as an input signal to OR-gate 414 to generate a signal representing LINES 1+2+5+6+9+10.

Character decoder

Figure 52:
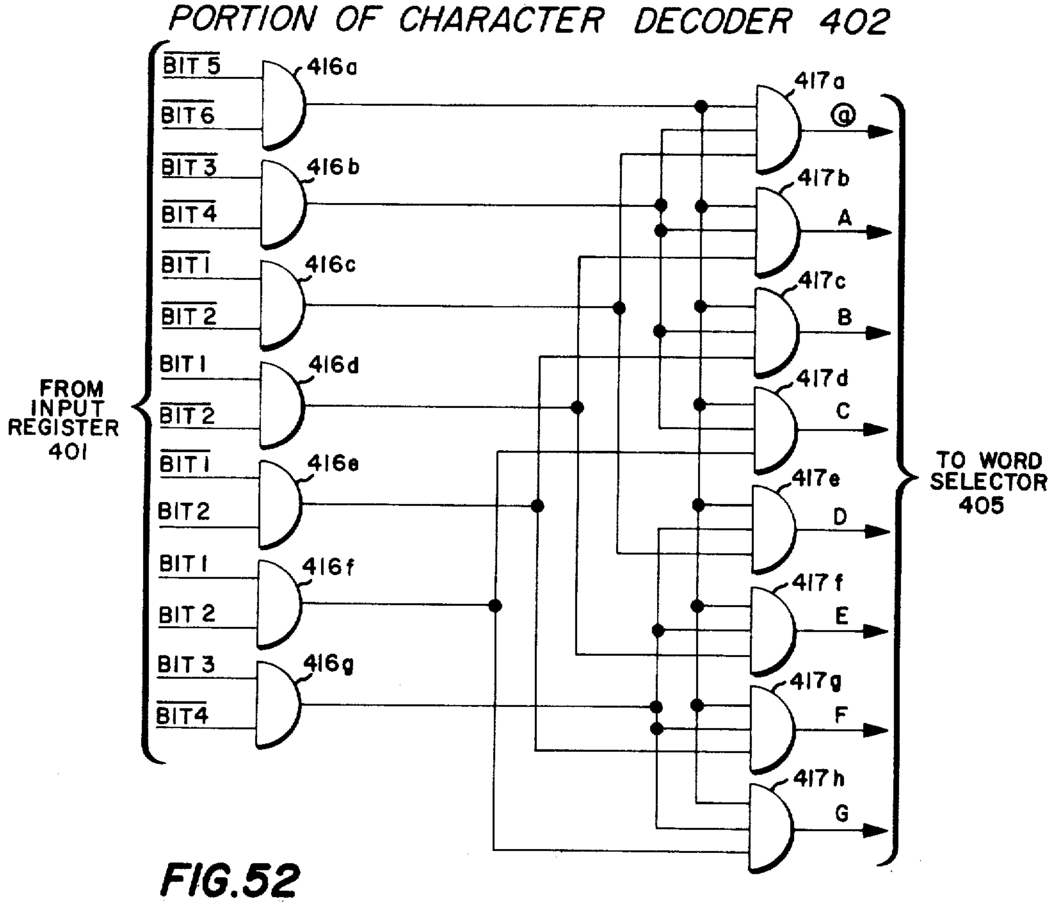
FIG. 52 illustrates in more detail the character decoder shown in FIG. 49.

FIGURE 52 illustrates a portion of the logic of the character decoder 402. The character decoder monitors the bit output signals from the input register 401. AND-gates **416*a*–416*g* decode the combinations of their input signals as shown in the figure. The output signals of AND-gates 416*a*–416*g* are combined in AND-gates 417*a*–417*h* to form signals which represent select signals for the symbols A through G and the @ sign. The remainder of the character decoder logic 402 is implemented in a similar way as is the logic of those symbols illustrated in FIG. 52. The output signals of the character decoder 402 are transmitted to the word selector 405** as the sixty-four select lines discussed above.

Word selector

Figure 53:
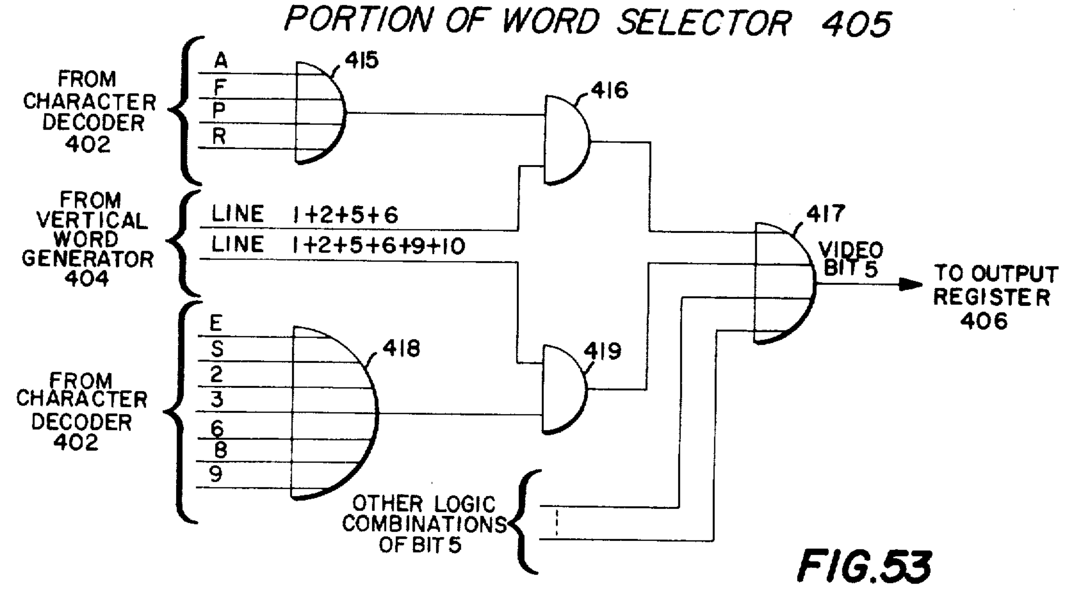
FIG. 53 illustrates in more detail a portion of the word selector shown in FIG. 49.

A portion of the word selector logic 405 is shown in FIG. 53. In this figure, the input signals A, F, P and R to OR-gate 415 all contain a video bit 5 intensified on raster line numbers 1, 2, 5 and 6. As noted, in FIG. 53, the input signal LINES 1+2+5+6 are logically combined in AND-gate 416 with the ouput signal of OR-gate 415. Each time the output signal of AND-gate 416 goes True, a VIDEO BIT 5 signal is generated by OR-gate 417. In a similar manner, the input signals of OR-gate 418 are logically combined in AND-gate 419 with the signals representative of line numbers shown to produce an output signal which is transmitted to one of the input terminals of OR-gate 417. The resulting output signal of OR-gate 417 is the VIDEO BIT 5 signal generated and illustrated in FIG. 53. A similar set of logic circuitry makes up the remainder of the word selector logic. All of these OR/AND-gate combinations are transmitted through OR-gate 417 as indicated in the figure. Thus far the logic tree corresponding to VIDEO BIT 5 has been described. Each other video bit, one through four and six through twelve, is implemented in a similar manner. For the character set illustrated in FIG. 13, video bit 1 is the same as video bit 2 in all cases and video bit 11 is the same as video bit 12. Therefore, only ten logic trees are necessary in the word selector 405 to implement the logic for this particular character set.

Video distributor

The video distributor logic 35 consists of four identical modules, the VDUA 36, VDUB 36', VDUC 36" and the VDUD 36'". Each of these units is modular in the same manner as the main memory units 71 through 71'". FIGURE 10 illustrates the system arrangement of these units.

As illustrated in FIG. 10, each of the VDU units accept video information from the character generator 34 and entry marker intensity signal from the main memory units 71 through 71'". Each video distributor 36, working in conjunction with a main memory unit 71 and a buffer memory unit 72, makes up a terminal memory unit or TMU. For example, TMUA consisting of MMUA 71, BMUA 72, and VDUA 36, generates independent displays for up to eight display terminals.

The video information data being received from the character generator by VDUA is generated in the character generator on the basis of character coded data stored in MMUA and recirculated by BMUA. The data is stored in each main memory by memory rows and displayed in display rows as illustrated by FIG. 35. The function of a video distributor is to partition and distribute sets of display rows to various display terminals according to the S jumper setting. For example, for an S8 jumper setting, the first four display rows are transmitted only to display terminal 1, the next four display rows go to display terminal 2, the next four display rows go to display terminal 3, etc., up to eight display terminals. Therefore, each video distributor has eight video outputs. In other words, each video distributor actually receives 33 display rows of information and divides these rows and distributes them accordingly to each of the display terminals.

Figure 54:
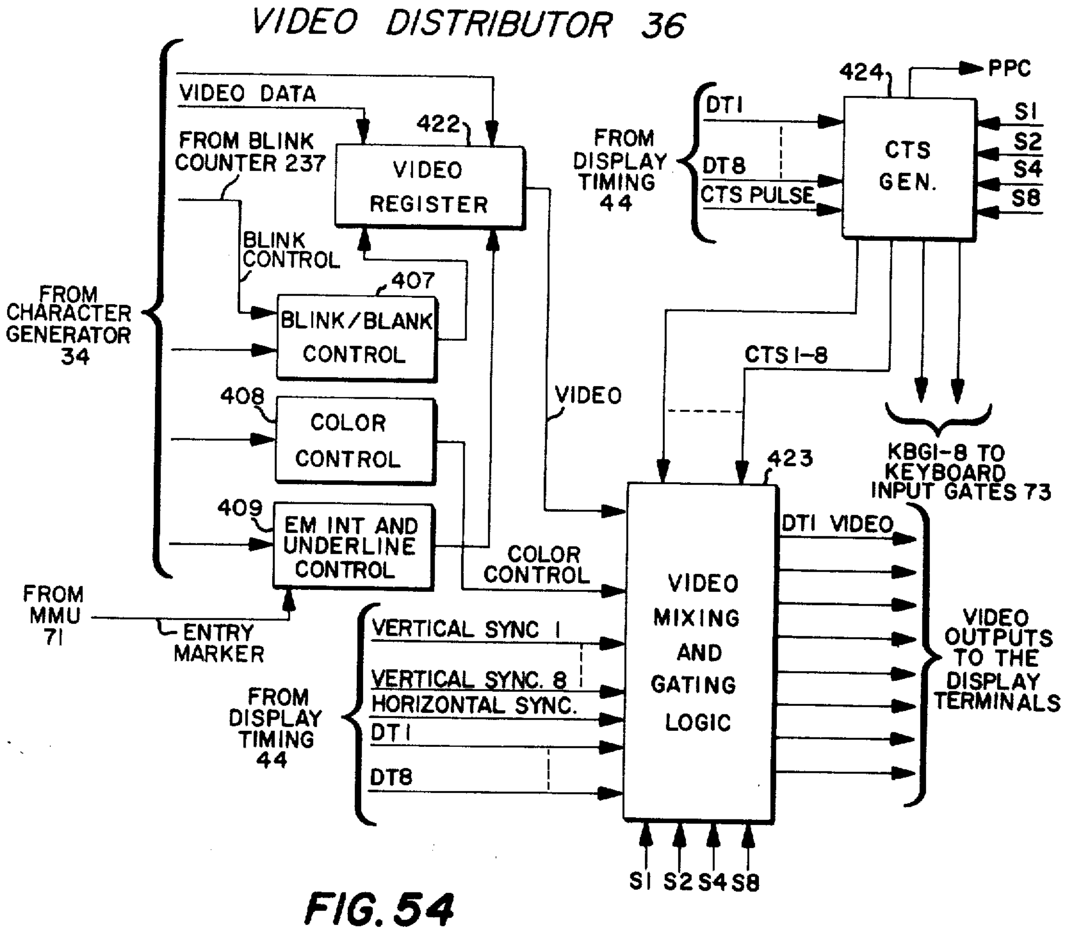
FIG. 54 illustrates in detail the video distribution logic shown in FIG. 10.

FIGURE 54 is a block diagram of a video distributor 36. Video data is received in parallel from the character generator by the video register 422 where it is converted into a serial format prior to display. The output of the video register is received by the video mixing and gating logic 423, which divides up this signal into multiple outputs in accordance with S1, S2, S4 or S8 settings. The video mixing and gating logic also adds to the video signal the correct synchronizing signal in accordance with proper display centering. Another function of the video mixing and gating logic 423 is to add in the Clear-to-Send (CTS) signals which are utilized for proper keyboard sampling.

The CTS signals are generated by the CTS generator 424. Also generated in the CTS generator 424 are the KBG1 through KBG8 signals which are used as selection signals by the keyboard input gates 73 of the keyboard input multiplexer 69.

The video distributor 35 also performs the function of blink/blank control, color control, entry marker intensity and underline control.

Each of these functions will be explained in more detail in the following paragraphs.

Video mixing and gating logic

The video mixing and gating logic 423 as explained hereinbefore takes a single video signal from the video register and divides it into as many as eight different video signals for display. It also adds in other control signals forming a COMPOSITE VIDEO/SYNC AND CTS signal.

Figure 55:
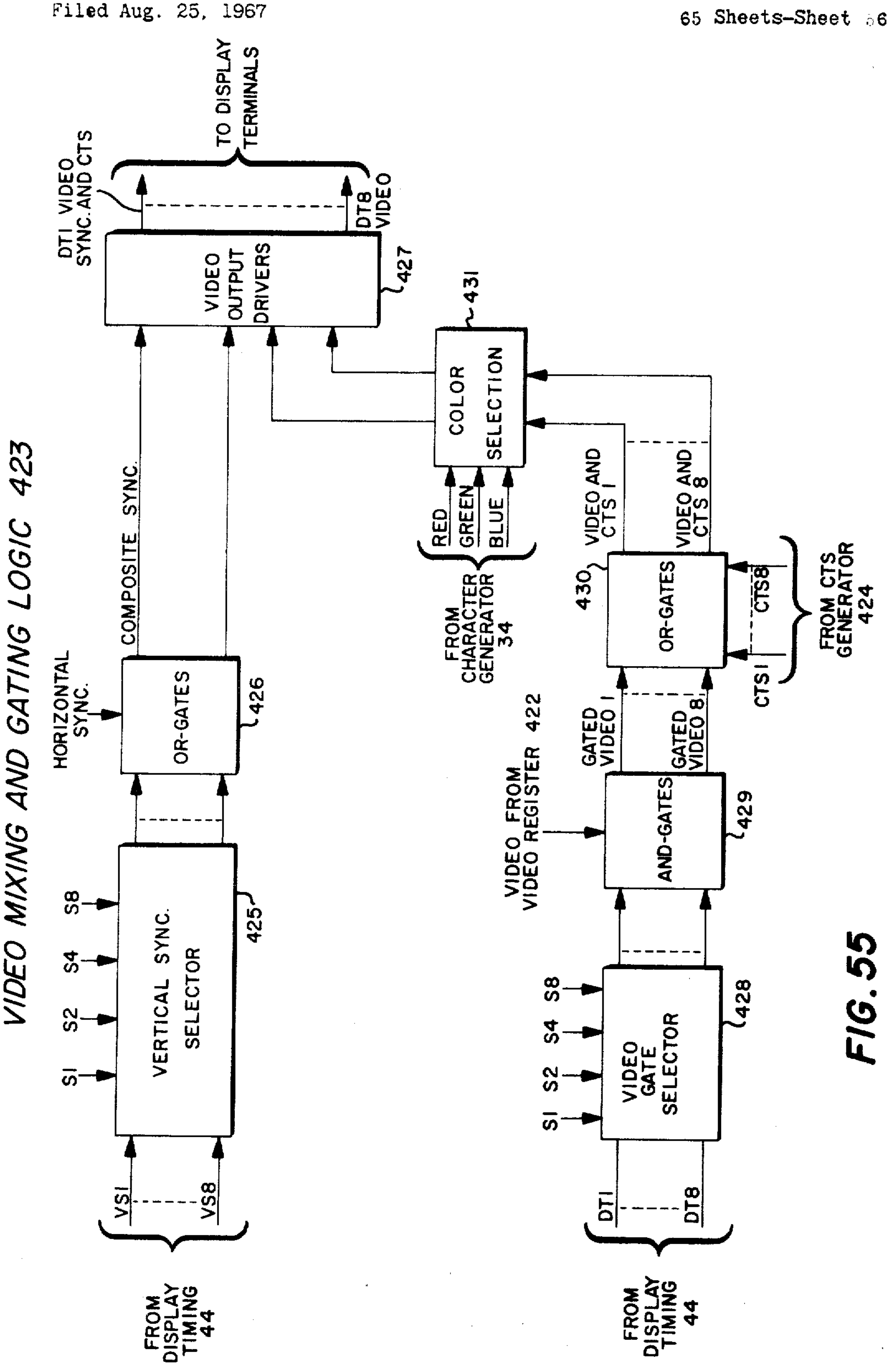
FIG. 55 illustrates in more detail the video mixing and gating logic shown in FIG. 54.

As shown in FIG. 55, the vertical sync selector 425 takes in all eight VERTICAL SYNC signals VS1 through VS8 and generates as many as eight outputs depending on which S jumper is set. The VS1 through VS8 signals are selected by the logic of the vertical sync selector 425 for subsequent transmission to each display terminal. This selection is performed in accordance with FIG. 42*a*. The OR-gates 426 add the HORIZONTAL SYNC signal to each of the VERTICAL SYNC signals generated by the vertical sync selector 425 forming eight composite sync outputs.

These composite sync signals each go to a different video output driver found 427. IF S1 is set, then there will only be one composite sync signal generated and it will be transmitted to display terminal #1 via the DT1 video output driver. If S2 is set, then there will be two composite sync signals which will be transmitted to display terminal #1 and display terminal #2, respectively. If S4 is True, then there will be four composite sync signals generated at the output of OR-gates 426 which will be transmitted to the first four display terminals through the video output drivers. In like manner, if S8 is True, all eight outputs of OR-gate 426 will have composite sync signals on them which will be transmitted to all eight display terminals.

The video gate selector 428 generates either 8, 4, 2 or 1 control signals used for the selection of video information from the video register by AND-gates 429. The video gate selector 428 accepts eight timing signals DT1 through DT8 from the CTS generator 424 and generates the abovementioned control signals in accordance with the S jumper selected. AND-gates 429 are a set of eight individual AND-gates, each of which receives the output signals of the video register and with the signals from each of the eight video gate selector outputs cause conjunction to occur in AND-gates 429. The output terminals of AND-gates 429 can have up to eight different gated video output signals. If S8 is set, then there will be eight different video signals, each consisting of four display rows, while an S4 setting would allow only four of these gated video output terminals to have video where each of the four would contain eight display rows of information. An S2 setting would allow only two of these output terminals to have a video signal present and an S1 setting would allow only one of these output terminals to have a video signal present. The OR-gates 430 provide a means of non-additively mixing the Clear-to-Send (CTS) signals with the video information. Therefore, the outputs of OR-gates 430 consist of video information combined with CTS information.

When these signals at the output of OR-gate 430 are additively mixed with the output signals of OR-gates 426 by the video drivers of 427, a set of television video signals is generated which are capable of driving the display terminals.

The color selection logic 431 accepts three color control signals from the character generator 34 which, when utilized, performs a further division of the video signals generated by the OR-gates 430. This color selection logic 431 takes each video signal from OR-gates 430 and splits it into three different video signals in accordance with the control signals at the color selection inputs labeled red, green and blue. If there are eight active output signals from OR-gates 430, there would actually be 24 video signals transmitted from the color selection logic 431. In this case, there would be 24 video drivers found in the video output driver circuitry 427. In this case, each display terminal receives three different video signals corresponding to the three different colors. When a standard color TV monitor is used as a display device, the display will appear in three different colors where the colors are in accordance with control characters stored in the main memory.

CTS generator

The function of the CTS generator 424 is to generate the CTS signals in accordance with the S settings.

The timing of the CTS generator logic is such that a Clear-to-Send pulse goes to a different keyboard every two milliseconds or every data cycle of the memory for an S8 setting. The CTS generator 424 of each video distributor 36 generates eight Clear-to-Send pulses in sequence and then a second CTS generator of the second video distributor 35′ generates eight pulses in sequence in a similar manner, etc., until each of the video distributors has generated eight CTS signals to the display terminals 20, 22. If S4 is set on a given CTS generator, that CTS generator will generate only four Clear-to-Send pulses. Likewise, if S2 is set, only two CTS signals are generated and if S1 is set, only one CTS signal is generated.

Figure 56:
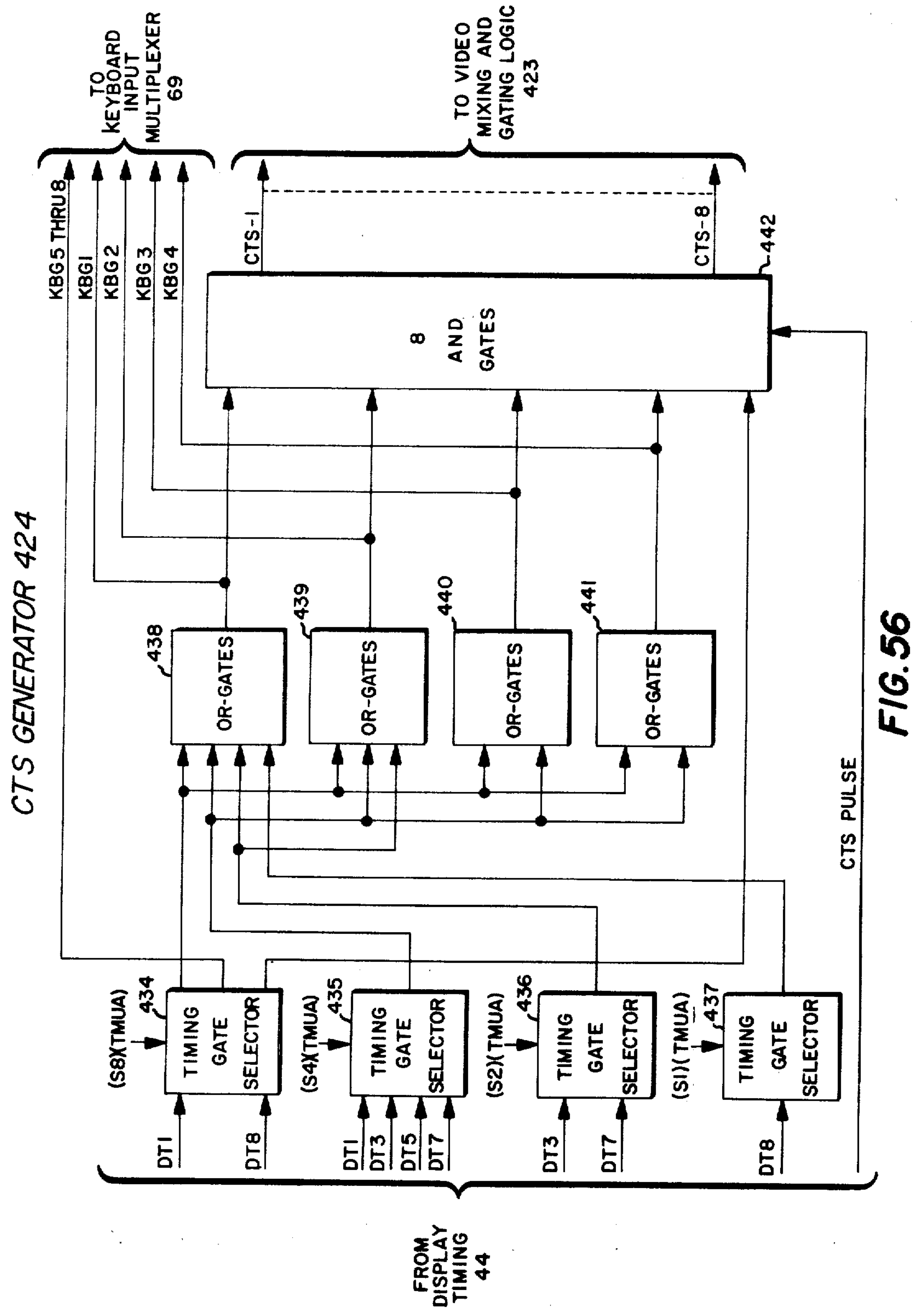
FIG. 56 illustrates in more detail the Clear-to-Send signal generator shown in FIG. 54.

In FIG. 56, the CTS generator 424 shown corresponds to the one found in VDUA 35. It accepts the TMUA timing signal which lasts for 16 milliseconds. The other CTS generators found in VDUB, VDUC and VDUD accept other TMU timing signals TMUB, TMUC and TMUD.

The TMU timing signal is combined with each of the jumper settings S1 through S8. This means that only during the True period of TMUA timing signal can a CTS signal be generated by this particular CTS generator. Also, the signals generated will be different according to which S jumper is set.

Which S setting is True determines which timing gate selector 434 through 437 will be used. The input signals to the timing gate selectors are the timing signals DT1 through DT8 from the display timing logic. If timing gate selector 434 is used because S8 is set, then all DT1 through DT8 timing signals are utilized because eight CTS signals must be generated. Only four of the timing signals are used with S4 in timing gate selector 435 and only two are required with S2 in timing gate selector 436 and only one is required with S1 in timing gate selector 437.

The timing gate selector output signals are transferred through OR-gates 438 through 441. These OR-gate output signals drive eight AND-gates 442. The signals of these eight AND-gates 442, together with the CTS signal pulse which occurs every two milliseconds with the output signals of the OR-gates 438–441, cause conjunction to occur. The output signals of the eight AND-gates 442 form the CTS1 through CTS8 signals which are used by the video mixing and gating logic 423 to form the Clear-to-Send signals.

If jumper S8 is set, there are eight CTS signals to be generated. Timing gate selector 434 is utilized to select DT1 through DT8 timing signals. DT1 through DT4 timing signals are transmitted in sequence from timing gate selector 434 through OR-gates 438 through 441. Timing signal DT1, when selected, causes conjunction to occur in OR-gate 438 and its output signal transferred to the first of the eight AND-gates 442 causing signal CTS1 to be generated. When timing signal DT2 is selected, OR-gate 439 is driven, which energizes the second of AND-gates 442 generating a CTS2 signal. When timing signal DT3 is selected in timing gate selector 434, OR-gate 440 selects the third AND-gate of 442 generating a CTS3 signal. When DT4 is selected by the timing gate selector 434, OR-gate 441 selects the fourth AND-gate of 442 generating a CTS4 signal. The selection of signals DT5 through DT8 directly causes the last four of the AND-gates of 442 to generate signals CTS5 through CTS8.

The timing gate selectors 435, 436 and 437 work in a similar manner to timing gates selector 434 in FIG. 56.

The selection of the various timing gates by signals DT1 through DT8 generates the control signals KBG1 through KBG8 for utilization by the keyboard input multiplexer 69.

Video register

Each video register 422 is essentially a high speed, parallel to serial converter. It converts a twelve bit parellel word which is changing at a one-megacycle bit rate to a serial word at a twelve-megacycle bit rate. For this application, a straightforward, twelve-megacycle shift register was not used since the flip-flop circuits employed in such a register would not work at this speed under all operating conditions. Means are provided for causing the flip-flops of the register to shift at a six-megacycle rate but obtaining an effective twelve-megacycle shift rate for the register.

Figure 57:
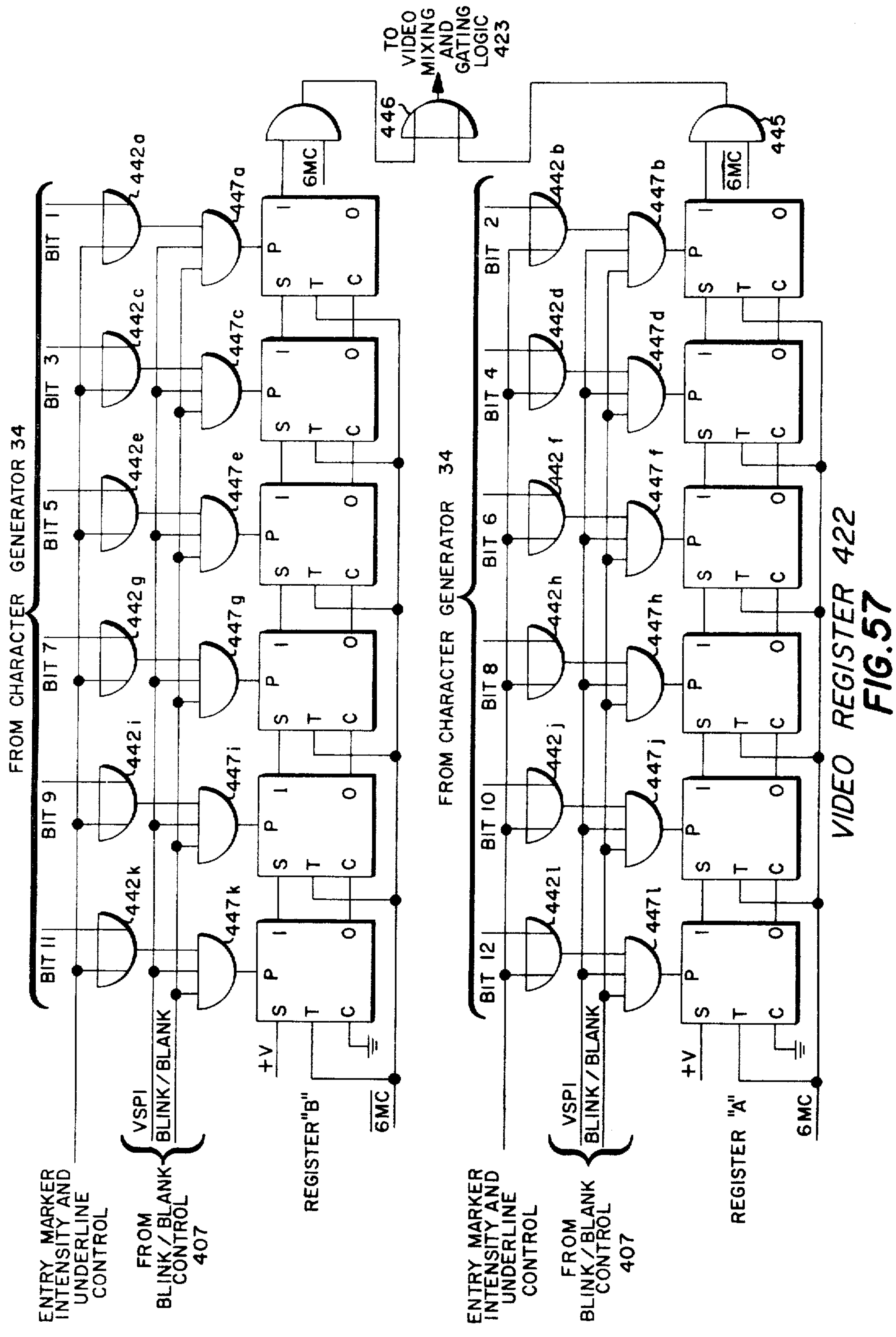
FIG. 57 illustrates in more detail the video register shown in FIG. 54.

FIGURE 57 is a logic diagram of the video register 422. It comprises two six-bit shift registers each of which can shift at a six-megacycle rate. Register A uses 6MC clock pulses as shift pulses, and register B uses $\overline{6MC}$ clock pulses as shift pulses. The output signal of register A is logically combined in AND-gate 445 with the $\overline{6MC}$ clock pulse. The resulting output signal, upon conjunction occurring therein, is transmitted through OR-gate 466 to form a video signal which is transmitted to the video amplifier and mixer 35.

Loading of the video register 422 is accomplished by the input signals transmitted to the preset terminal of each flip-flop of registers A and B. The output signals of AND-gates 447a–447l are inverted by suitable inverters (not shown) before being transmitted as input signals to the preset terminals of the flip-flops of registers A and B. Each output signal of character generator 34, representing a bit, is loaded into a given flip-flop of FIG. 57. Each bit of data is transferred once each microsecond by a one-megacycle clock pulse into register A and register B. The loading takes place while the last bit of the previous word is being shifted out of each register. The resulting video output signal is a serial, twelve-megacycle, non-return to zero binary word.

Blink/blank control

Figure 58:
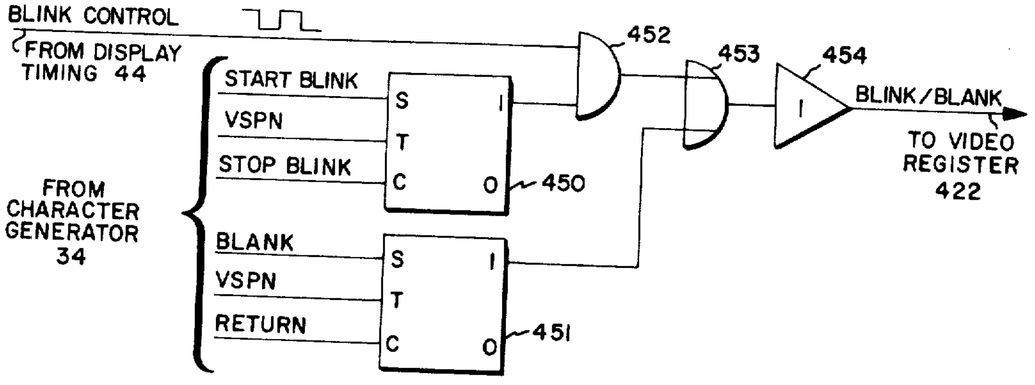
FIG. 58 illustrates in more detail the blink/blank control logic shown in FIG. 54.

The blink/blank control is illustrated in FIG. 58. As can be seen in the figure, the BLINK CONTROL signal received from the display timing logic is a square wave which cycles at a 7½ cycle rate. Flip-flops 450 and 451 receive start and stop signals from the character generator 34. The START BLINK signal received by the S terminal of flip-flop 450 sets that flip-flop causing its 1-output terminal to go low which enables AND-gate 452 and OR-gate 453 during the down time of the BLINK CONTROL signal. A True signal at the output terminal of OR-gate 453, when inverted by the inverter 454, causes a high signal to be fed to the video register 422 blocking video information from being stored there. Whenever the blink control input is high, the output of AND-gate 452 is high and the output of OR-gate 453 is also high, which in turn makes the output of the inverter 454 low, thus not blocking the video information from being stored in the video register 422. Therefore, the blocking and not blocking of data at the rate of the BLINK CONTROL signal will cause the display for that character position to be blinked. All the characters during the time that flip-flop 450 is set in the 1-state will be blinked by the BLINK CONTROL signal. The START BLINK signal at the S input terminal of flip-flop 450 sets that flip-flop and the STOP BLINK signal at the C input clears it. Thus, all characters being displayed between the time the START BLINK signal occurs and the stop blink signal occurs will be blinked on the display 22.

In a similar manner, flip-flop 451 is set and reset by the BLANK and RETURN signals from the character generator 34. The output signal of this flip-flop is not combined with the BLINK CONTROL signal but is transmitted through OR-gate 453 and inverter 454. Thus, any time flip-flop 451 is set, the video register 422 will be blocked which means that the display will be interrupted during the character times appearing between the BLANK signal and the RETURN signal.

Color control

Figure 59:
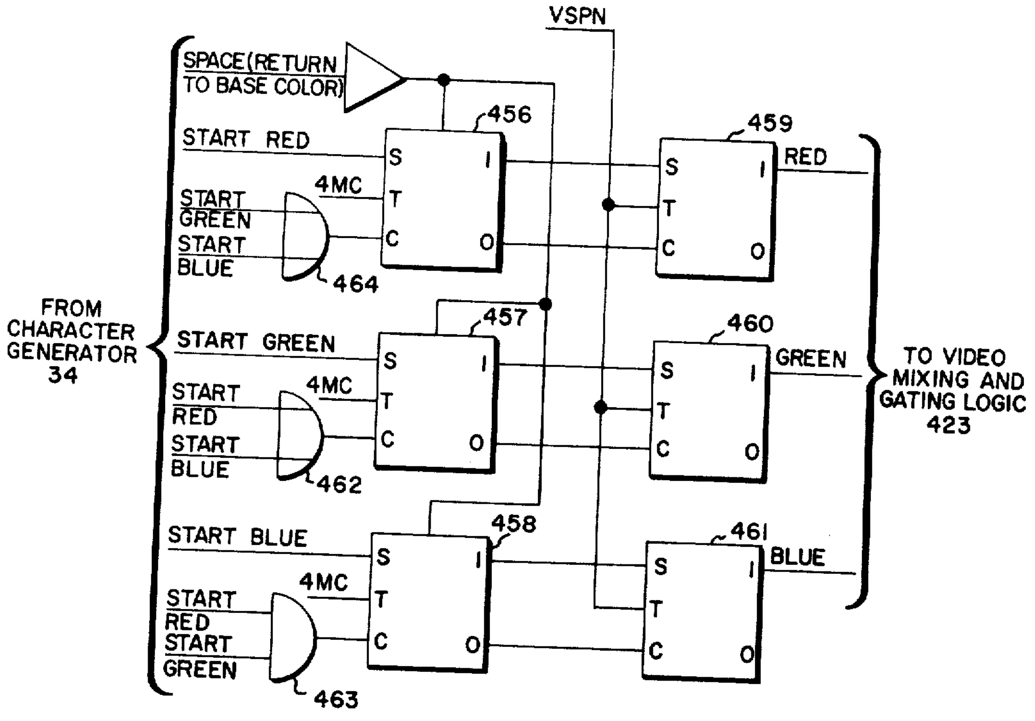
FIG. 59 illustrates in more detail the color control logic of FIG. 54.

FIGURE 59 illustrates the logic of the color control logic 408. The character generator 34 generates start and stop color signals as shown in the figure. The color control logic 408 utilizes the start red, start green, start blue and return to base color signals to generate three different color selection signals which are utilized by the video mixing and gating logic 423. These color selection signals determine which output video cable will be used in transmitting the video signal to the display monitor 22. If the display monitor 22 is operating in the base color or white, then all three color control signals (red, green and blue) are selected. When all are present, then flip-flops 456 through 461 are set.

When a character to be displayed in red is reached, the start red signal is generated by the character generator 34. This signal sets flip-flop 456 and clears flip-flops 457 and 458. Flip-flops 457 and 458 are cleared through OR-gates 462 and 463.

The VSPN signal which triggers flip-flops 459 through 461 transfers the states of flip-flops 456 through 458 into flip-flops 459 through 461, respectively. This transfer from one set of flip-flops to the other with this timing pulse guarantees that a color change between characters occurs at the exact video bit time required.

If the start green signal then occurs, flip-flop 457 will be set and flip-flops 456 and 458 will be cleared via OR-gates 464 and 463. As long as flip-flop 457 remains in a set state, all characters following will appear green. If at a later time the start blue signal occurs, flip-flop 458 is set and flip-flops 456 and 457 are cleared via OR-gates 464 and 462. Following this signal, all characters will appear on the display as blue until one of the other start color signals occurs or the return to base signal occurs.

Entry marker intensity and underline control

Figure 60:
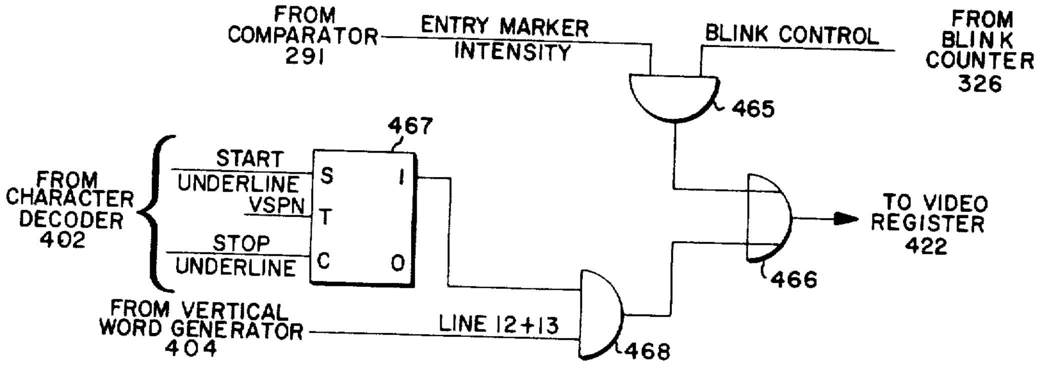
FIG. 60 illustrates in more detail the intensity and underlining logic shown in FIG. 54.

FIGURE 60 illustrates the logic of the entry marker intensity and underline control 409. As can be seen in the figure, the ENTRY MARKER INTENSITY signal from the comparator 291 (FIG. 33) of the main memory unit 71 is ANDed with the BLINK CONTROL signal from the blink counter 326. The output signal of this AND-gate 465 is then transmitted through OR-gate 466 to the video register 422 to be displayed as the entry marker symbol. The conjunction in AND-gate 465 of the BLINK CONTROL signal and the ENTRY MARKER INTENSITY signal causes the displayed entry marker symbol to blink. It will blink because the ENTRY MARKER INTENSITY signal never reaches the display during the up time of the BLINK CONTROL signal. Hence it will be displayed during a 132 millisecond interval and then not displayed for a 132 millisecond interval, thus causing the entry marker symbol to blink.

Flip-flop 467 is set and reset by the start underline and stop underline signals from the character decoder 402 of the character generator 34. When flip-flop 467 is set, then AND-gate 468 is enabled during line counts 12 and 13. Thus, the video register 422 through OR-gate 466 will be loaded during line counts 12 and 13 if flip-flop 467 is set. Therefore, raster lines 12 and 13 will be intensified from the time of the start underline signal which sets flip-flop 467 until the stop underline signal occurs which clears flip-flop 467. With this circuitry, one or more characters can be underlined by specifying where the start underline signal will occur and where the stop underline signal will occur.

Video output drivers

The video output drivers 427, shown in FIG. 55, consist of a set of video amplifier and mixer circuits. This circuit performs the functions of combining into a set of composite television video signals the synchronizing signals from OR-gates 426 and the video and CTS output signals from OR-gates 430 for subsequent transfer to each of the display monitors tied to this video distributor 36.

If the color selection function is provided, the video and CTS signals are received from the color selection logic 431. In this case, there will be three video amplifier and mixer circuits driving each color display monitor, one for each color input to the monitor.

The video output drivers 427 also perform the additional function of driving a coaxial line so that each television monitor 22 may be remotely located. The composite video signal available at each output of the video output drivers 427 is such that standard television studio signal distribution techniques can be used to drive more than one monitor on each output placed several thousand feet from the display controller.

It will be recognized by those skilled in the art that for television monitors requiring separate synchronizing the synchronizing and video signals can be fed to the television monitor on separate cables.

Figure 61:
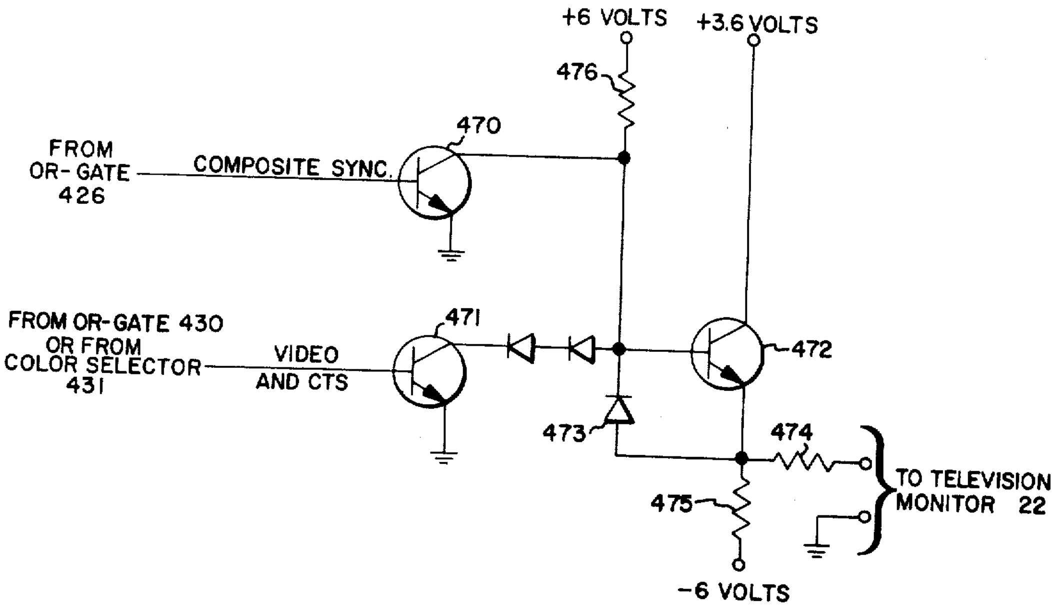
FIG. 61 illustrates in more detail one of the video output drivers illustrated in FIG. 55.

A detailed diagram of each video amplifier and mixer input signals, the mixing function can be eliminated and circuit is shown in FIG. 61. The composite sync signal is applied to the base of transistor 470 which amplifies and combines the composite synchronizing signal with the video signal through transistor 471.

Transistor 472, diode 473 and resistors 474 and 475 make up a video driver which amplifies the combined signal across resistor 476 to a signal suitable for driving the television monitor 22. Resistor 474 establishes a minimum value for external load resistance and protects the circuit against accidental short circuiting of the output line.

Page print controller

The page print controller 23, shown in FIG. 1, is a block of logic which provides an interface with the display controller 21 and optional hard copy printer 24. For each page print controller 23 added to the system, a new printer 24 can be tied into the system. Each page print controller 23 occupies the memory space of one display terminal 20, 22. All page print controllers in the system operate independently of each other as do the display terminals.

The page print controller 23 interfaces with the other display controller logic through the keyboard input multiplexer 69.

When a page print controller 23 and printer 24 are utilized in the system, a display terminal operator may compose a message through his keyboard 20 onto his display 22, transmit that message to the processor 19 as a message to be printed and the processor 19 will retransmit that message with appropriate changes if necessary to the page print controller's memory section to be printed. Also, with this arrangement, the processor 19 may transmit an already established file of data to the printer upon request of a display terminal 20, 22 operator. In this case, the data printed is not actually generated at the keyboard 20 by the display terminal operator.

With this approach to printing, there are many advantages. The operator may generate a message to be printed, request a printout be made and have the processor 19 add other data to the message such as dates, titles, etc. Also, an operator may send a series of short messages to be printed and have the processor 19 string these short messages into one long page. This particular advantage avoids the limitation of the number of lines that can be displayed at one time. Also, the operator may transmit a message for printing and have that message reformatted. For example, the display page in this case is 46 characters per line and a printout could be requested where the processor 19 reformats the data to be printed into 80 character lines.

A major advantage to this approach is that a systems arrangement is allowed where there are many display terminals and only one printer. In this case, all display terminals 20, 22 may request the printout simultaneously and each message to be printed will be transmitted to the processor 19 at high speed where they are queued for later retransmission back to the printer. The printer 24, being much slower than the communication 16, will print each message one at a time at a much slower rate. The queueing of the messages in the processor 19 memory allows each of the operators requesting a printout to go on to other business after his message has been transferred at high speed to the processor. In this way, the operators do not have to wait for each other's messages to be printed.

Figure 62:
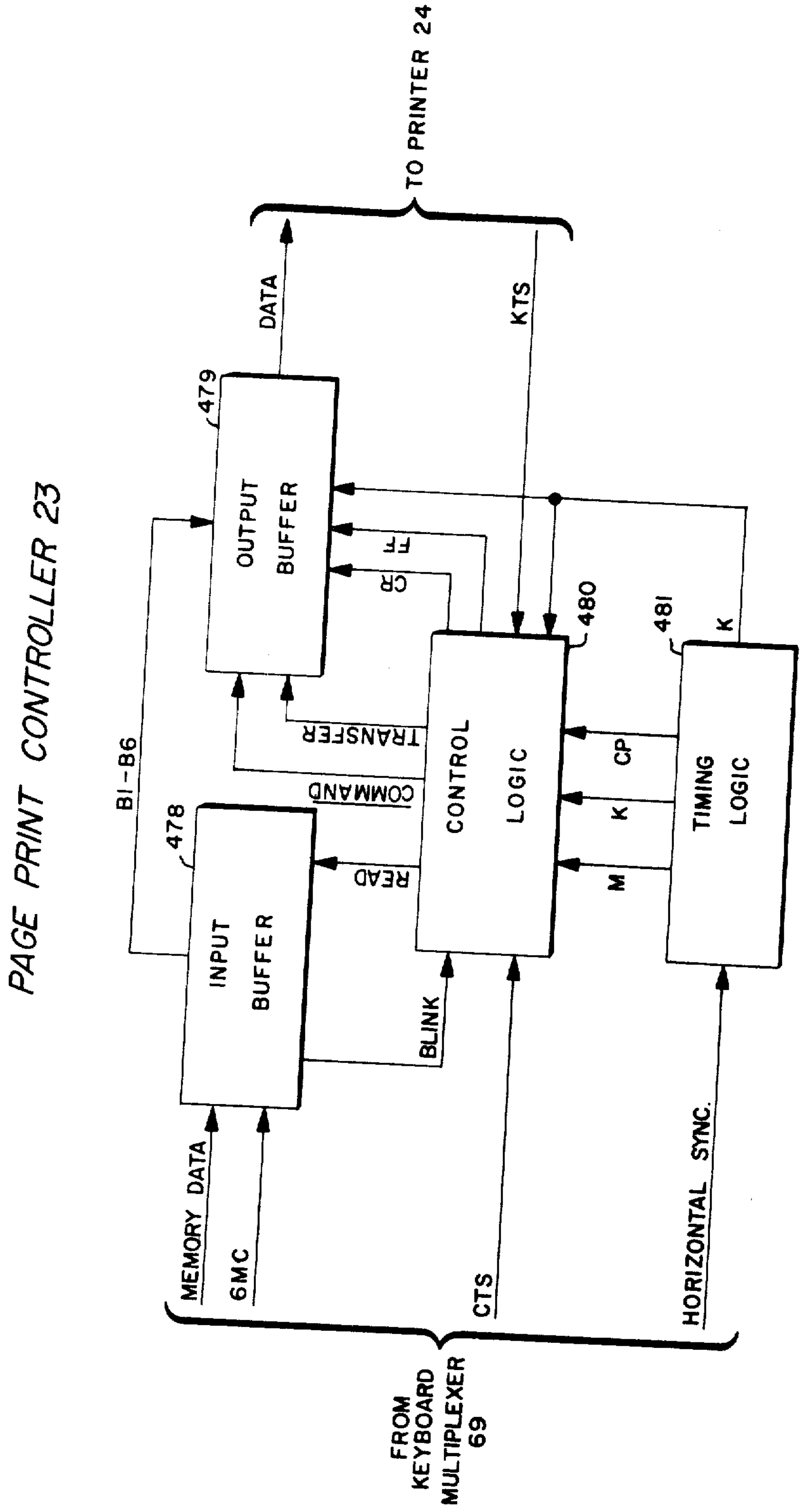
FIG. 62 illustrates in block diagram form page print controller logic.

The page print controller is shown in block diagram form in FIG. 62. The page print controller 23 consists of an input buffer 478 and an output buffer 479 with control logic 480 for receiving and transmitting and timing logic 481 for synchronization.

The input buffer 478 receives data from the main memory units at a 6MC rate. It accepts one character at a time from the main memory unit 71 via the keyboard input multiplexer 69. As soon as it receives a character, it transfers it to the output buffer 479 for transmission to the printer 24. As soon as the character has transferred from the input buffer 478 to the output buffer 479, the input buffer 478 begins searching main memory units 71–71''', via the keyboard input multiplexer 69 for the next character to be printed. When it finds the next character to be printed, it accepts it, stores it until the output buffer 479 becomes empty again, and then transfers it to the output buffer.

The input buffer 478 monitors the main memory units 71–71''' for control bits as an indication that there is data to be printed. If data is to be printed, it searches for the character stored at the location of the entry marker.

The input buffer 478 continues to read character data for printing a character at a time until the blink code is found in main memory units 71–71'''. The blink code is an indication to the page print controller 23 to stop printing action with no further motion of the print carriage. If desired, the program may format the print message with no blink code for full page printouts. In this case, after the last character position of the memory is printed, carriage return and line feed codes are generated to the printer set and then printing stops. Using this capability, a continuous printout of many lines of text can be programmed with a series of print messages. For example, those print messages in the series which are full page messages would have no blink codes inserted by the processor 19. Those which have fewer than a full page of text lines would have a blink code in the first character position of the line following the last line of text to be printed. Thus, each message in the series would always end with a carriage return and line feed which would always start the new message at the beginning of the text line following the last line of the preceding message.

In cases where it is desired to form feed the printer paper for tear-off purposes or for message separation, the inclusion of a second blink code at the end of a print message is an indication to the page print controller to form feed the paper. When the page print controller 23 completes the printing of a message, it automatically transmits a message back to the processor 19 indicating that the printer 24 is now free to process another message.

If a new message is received by the page print controller 23 while it is processing the previous message, a busy signal will be returned automatically to the processor station 19. If a print message is received by the page print controller 23 when the Clear-to-Send (CTS) line from the printer set is off, indicating power off or other error condition on the printer, a busy signal will also be automatically transmitted to the processor 19.

The control logic 480 utilizes the CTS signal from the keyboard multiplexer 69 as an indication of when it may access the memories. In this way, the page print controller logic 23 actually utilizes the keyboard input multiplexer logic for access to main memory units 71–71'''. It actually appears to the keyboard input multiplexer 69 as another keyboard source 20. The control logic 480 performs the function of interpreting the blink codes as read from main memory units 71–71''', controls the transfer of data from the input buffer 478 to the output buffer 479, generates special commands not stored in main memory units 71–71''', and controls the data transmission from the output buffer 479 to the printer 24.

The output buffer 479 transmits data serially to the printer 24 at a slow data rate consistent with the speed of the printer.

The timing logic 481 utilizes the HORIZONTAL SYNC signal as a clock input to generate the necessary timing signals to the other portions of the page print controller 23.

Page print controller input buffer

Figure 63:
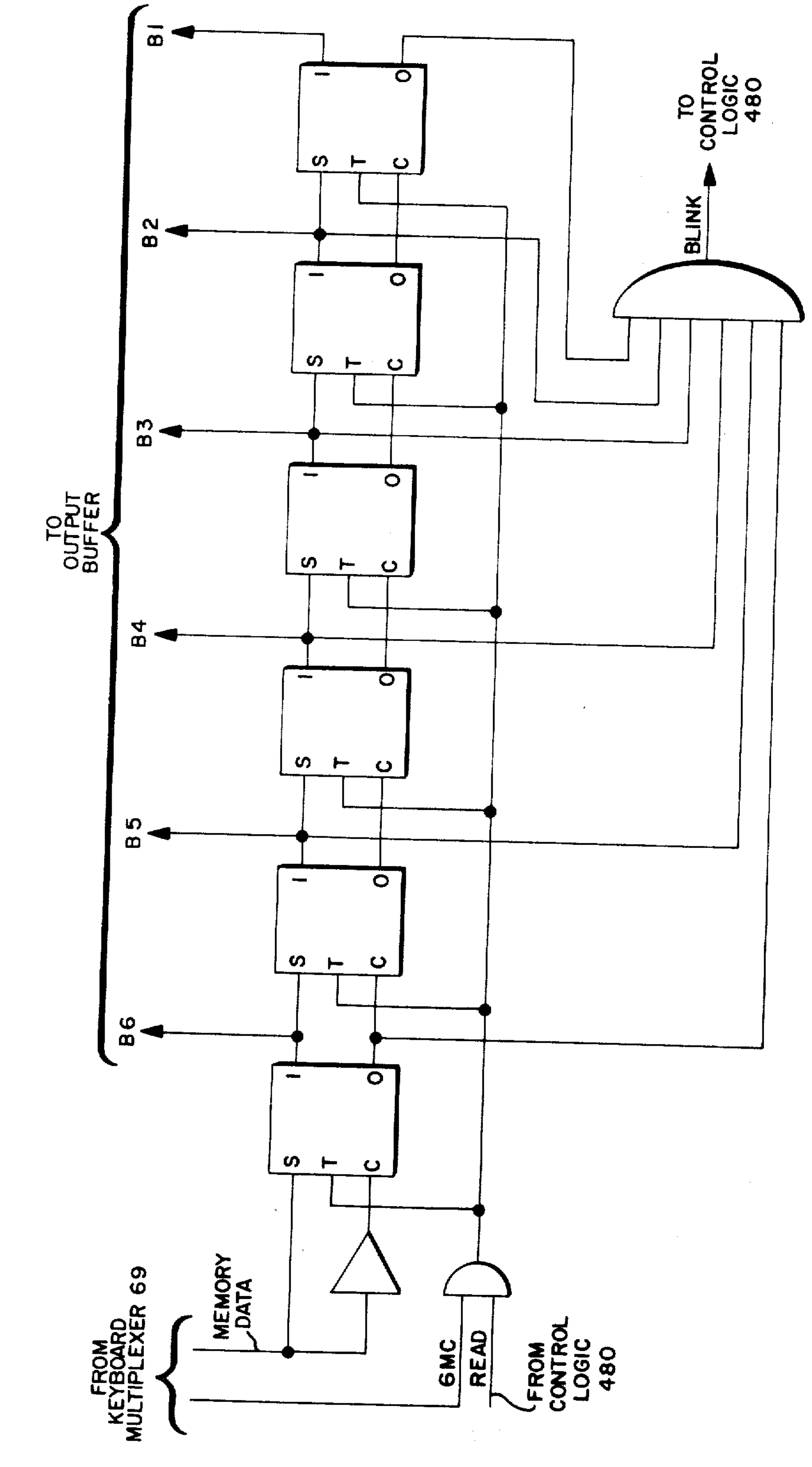
FIG. 63 illustrates in more detail the page print controller input buffer.

FIGURE 63 shows the simplified logic form, the details of the page print controller input buffer 478. As can be seen in the figure, it is simply a six flip-flop serial register which reads memory data via the keyboard input multiplexer 69 at a 6MC data rate. It has logic for the decoding of the blink code which it transmits to the control logic 480. Its signal outputs feed in parallel to the output buffer 479. This register is loaded under the control of the control logic 480 by the read signal. Each time it loads a new character of information, the data stored from the last character received is automatically cleared by virtue of the shifting action.

Output buffer

Figure 64:
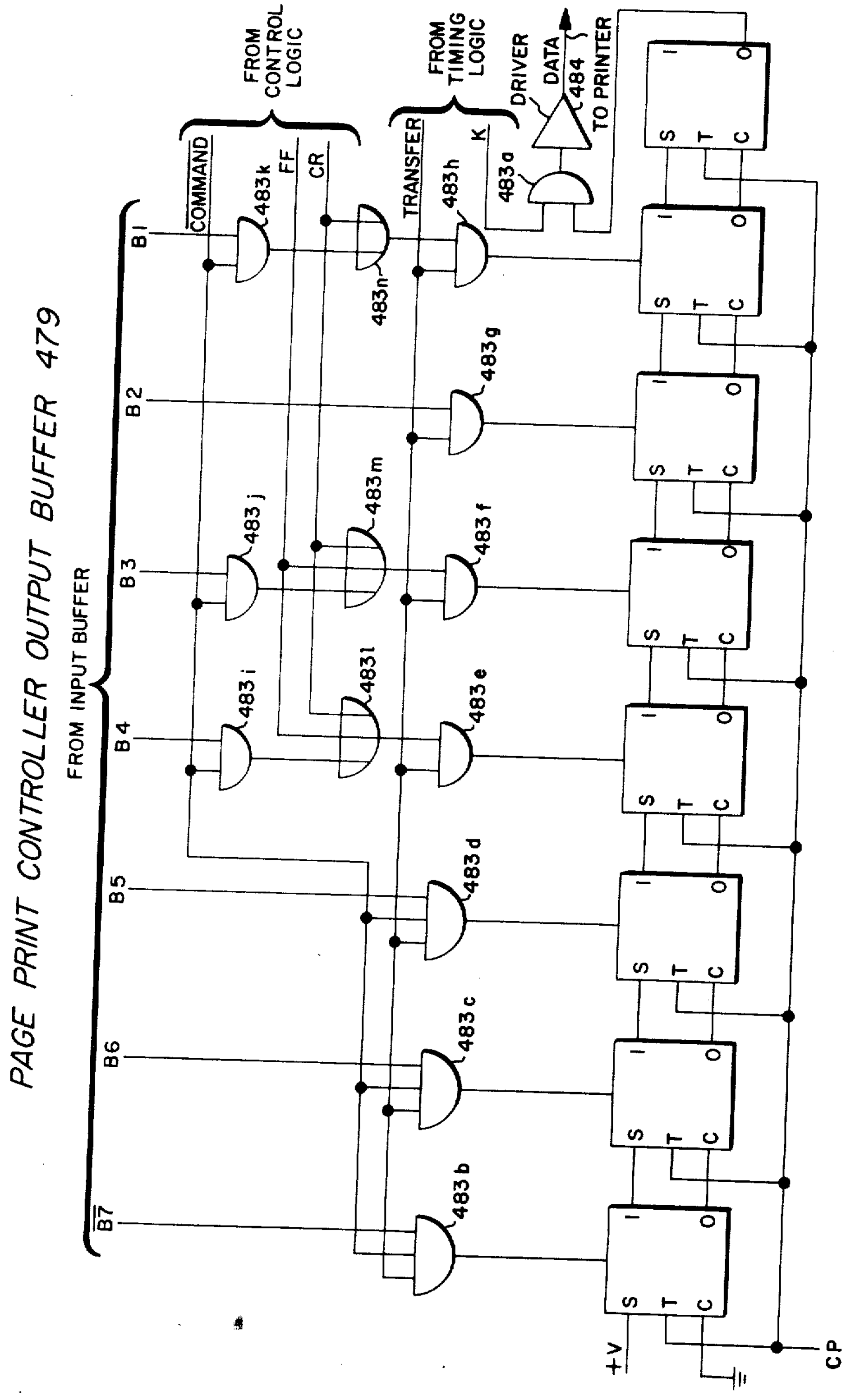
FIG. 64 illustrates in more detail the page print controller output buffer.

The output buffer logic 479 is illustrated in FIG. 64. As can be seen, the output buffer logic consists of an eight flip-flop serial shift register which can be loaded in parallel from the input buffer 478 via a set of AND-gates and OR-gates **483*b* through 483*h*. Loading is accomplished from the input buffer 478 to the output buffer 479** by the transfer signal as shown in the figure.

Other gating logic **483*i* through 483*n* which receives input signals from the control logic 480** is utilized for the loading of command data such as form feed and carriage return codes.

The timing logic 481 generates a clock signal CP which feeds through the trigger input of all stages of this flip-flop register causing it to shift serially to the printer 24. The K signal is a control signal which enables AND-gates **483*a* allowing the data to pass through to the driver 484 and on to the printer 24**.

Page print controller timing logic

Figure 65:
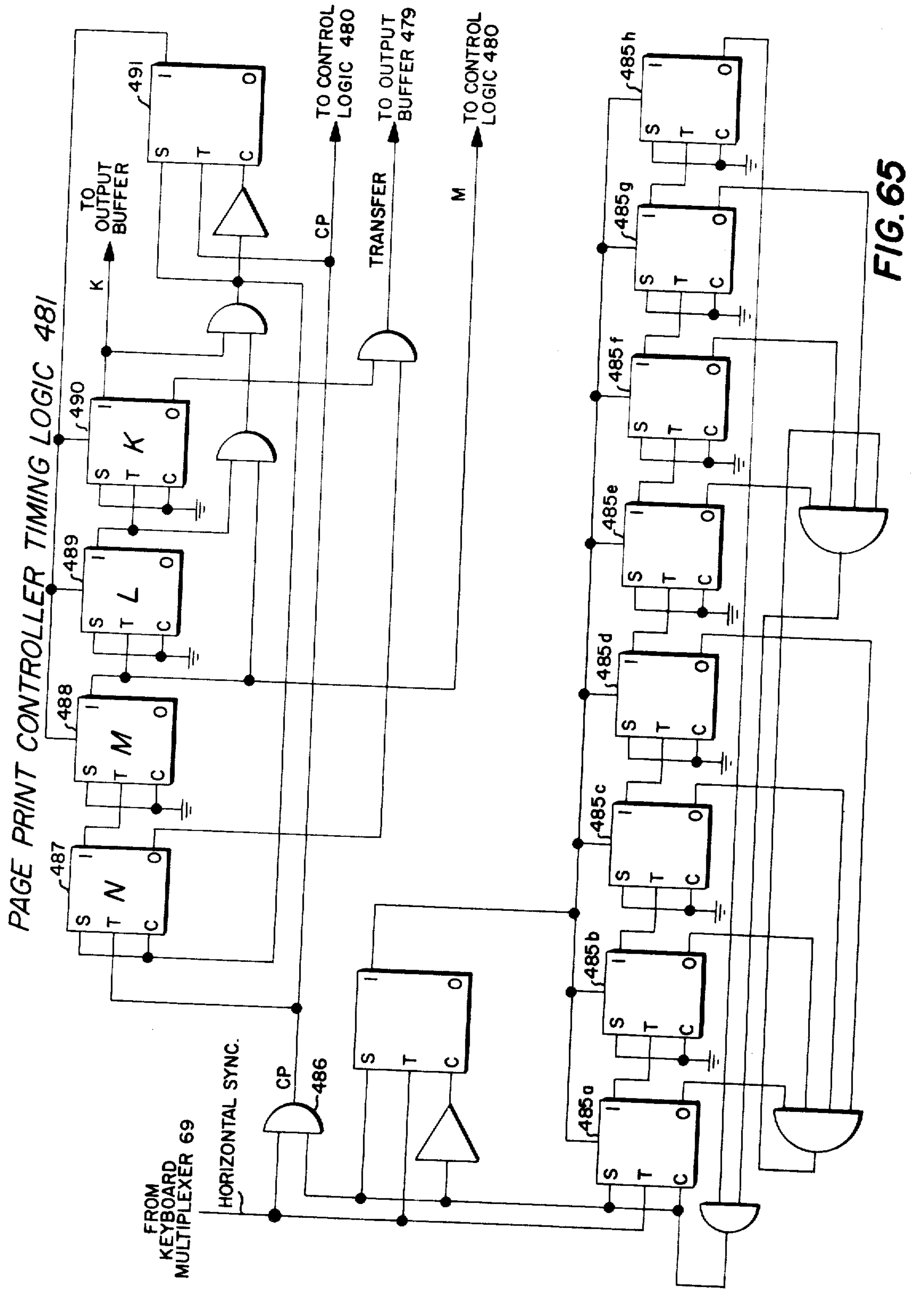
FIG. 65 illustrates in more detail the page print controller timing logic.

FIGURE 65 illustrates the page print controller timing logic 481. This logic generates the K signal to gate data out of the output buffer 479, the CP signal for shifting the output buffer 479 and the transfer signal for loading the output buffer 479. The page print controller timing logic 481 consists of basically two counters. One counter comprising flip-flops **485*a* through 485*h* counts down the 1575KC HORIZONTAL SYNC signal received from the keyboard input multiplexer 69 to 110 cycles per second. The 110 cycles per second correspond to the 110 bits per second at which the printer is able to receive data. This counted down HORIZONTAL SYNC is the CP signal which appears at the output terminal of AND-gate 486. The CP signal drives the second counter made up of flip-flops 487 through 491**. This second counter counts down the CP signal further to generate the K signal and the transfer pulse.

Page print controller control logic

Figure 66:
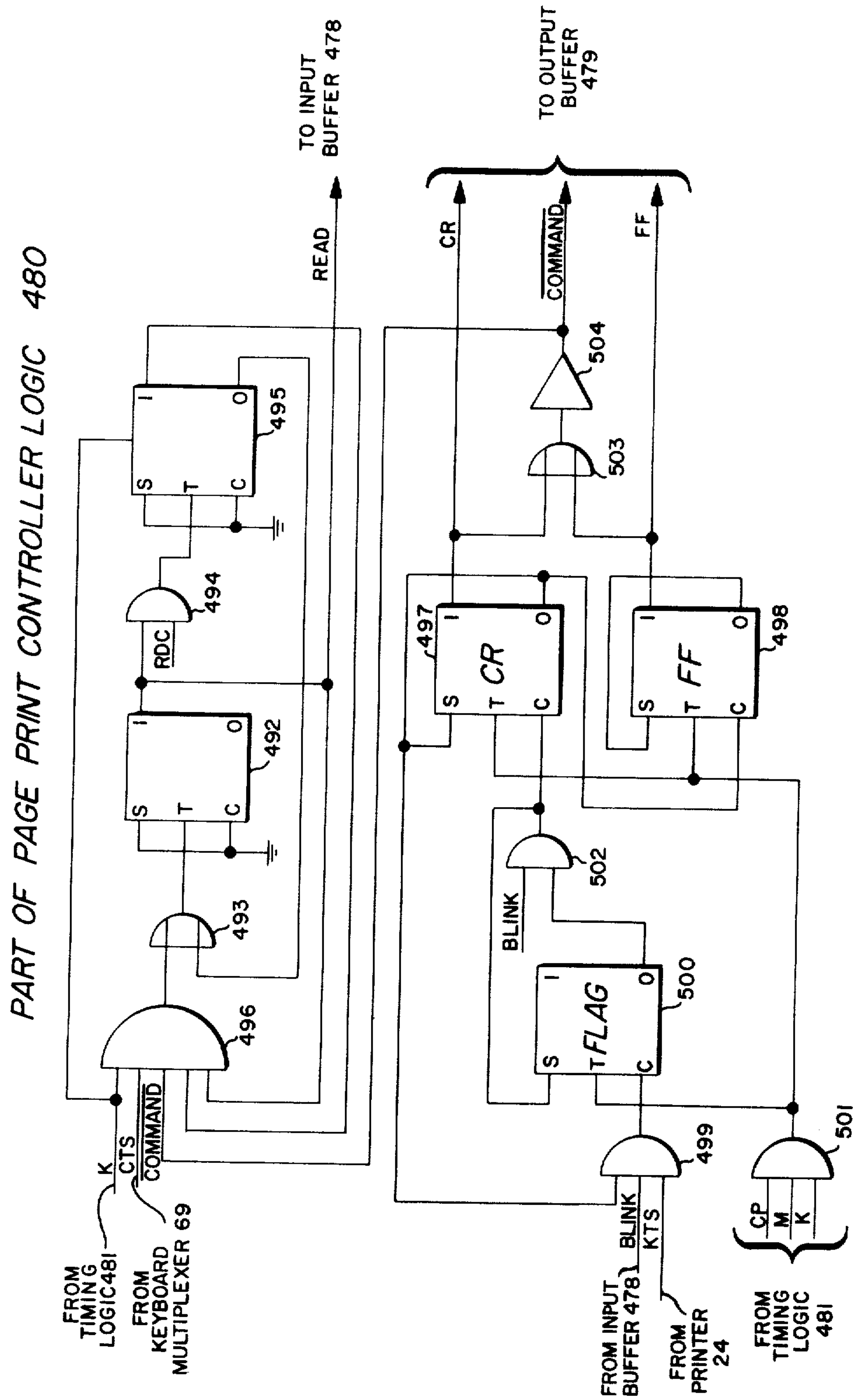
FIG. 66 illustrates in more detail the page print controller control logic.

FIGURE 66 illustrates a portion of the page print controller control logic 480. This logic shows the generation of the read signal, the CR signal and the FF signal.

The read signal is generated after the presence of the CTS and K signal occur. This causes flip-flop 492 to be set in the 1-state through OR-gate 493. After flip-flop 492 has been set to the 1-state and the RDC signal occurs, which is after the character has been read to the input register, AND-gate 494 is enabled which toggles flip-flop 495 which in turn feeds back through OR-gate 493 from its 0-output terminal which again toggles flip-flop 492 back to its previous state. Thus, the 1-output terminal of flip-flop 492 has gone low and then returned back to a high condition for reading into the input buffer 478. When flip-flop 495 was toggled from the 1-state to the 0-state, its 1-output terminal transmits a signal back into AND-gate 496 blocking it from further enabling. At the time of the next K signal, flip-flop 495 is set back to the 1-state again.

Flip-flops 497 and 498 are used in the generation of the carriage return and form feed signals for transmission to the printer 24. The carriage return signal is generated and transmitted to the printer when two blink codes in sequence are read from main memory units 71–71'''. The first blink code enables AND-gate 499 which clears the flag flip-flop 500 upon the next occurrence to the CP signal with the M and K signals present. When the signals CP, M and K are transmitted together to AND-gate 501, conjunction occurs and an output signal is generated which triggers the flag flip-flop 500. The presence of the first blink code along with this trigger signal causes the flap flip-flop to be cleared.

When the flag flip-flop 500 is cleared, its 0-output terminal goes low and if the next character to be read from memory is also a blink code, AND-gate 502 will be enabled. The enabling of AND-gate 502 will set the flag flip-flop 500. However, at the same time the flag flip-flop is reset, the CR flip-flop 497 will be cleared. The clearing of the CR flip-flop 497 causes the generation of the CR signal to the output buffer 479. The CR signal is transmitted through OR-gate 503 and inverted by inverter 504 which is the $\overline{\text{COMMAND}}$ signal which blocks the reading of the next character by disabling AND-gate 496. The next character must be blocked because a line feed must be generated automatically by other logic not shown in this figure during the time the next character would normally be read from memory.

The CR signal that was generated caused a carriage return to be generated at the printer 24. Following this, the FF flip-flop 498 is cleared, generating the FF signal. The FF flip-flop 498 is cleared by virtue of the fact that the CR flip-flop was cleared previously. The FF signal generated causes a form feed character to be transmitted to the printer which causes the paper on the printer to be fed automatically a fixed number of lines.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A system for converting information in digital character form into video signals suitable for controlling more than one television raster scan display device, the combination comprising: a first means coupled to receive and convert said information into video information signals, each of said signals representing a digitally coded video picture segment, a second means coupled to said first means for receiving said video information signals and cyclically combining said video information signals into television video signals, and a third means for transmitting said video information signals simultaneously to more than one display device.

2. A system for converting information in digital character form into video signals suitable for controlling more than one television raster scan display device, the combination comprising: a first means coupled to receive and convert said information into video information signals, each of said signals representing a digitally coded video picture segment, a second means coupled to said first means for receiving said video information signals and cyclically combining said video information signals into television video signals, and a third means for transmitting said video information signals to more than one display device.

3. The combination set forth in claim 2 wherein said third means comprises video mixing and gating logic for transmitting video information signals to more than one display device.

4. A system for generating and converting information in digital character form into video signals for suitably controlling more than one television raster scan display device, the combination comprising: a multiplexer, a plurality of first means coupled to said multiplexer for transmitting digitally coded data to a second means on a time multiplex basis, a second means for receiving said digitally coded data from said multiplexer for converting said digitally coded data into a plurality of groups of television video signals, and a third means for transmitting said television video signals to more than one display device.

5. The combination set forth in claim 4 wherein said third means comprises a distributor for simultaneously transmitting different television video signals to more than one display device.

6. The combination set forth in claim 4 wherein said third means comprises video mixing and gating logic for transmitting on a time multiplex basis to a group of display terminals said television video signals.

7. The combination set forth in claim 4 wherein said display devices are display terminals and said third means comprises video mixing and gating means for transmitting television video signals simultaneously to more than one group of display terminals and on a time multiplex basis transmitting said television video signals to different display terminals of each of said groups.

8. A system for generating and converting information in digital character form into video signals for controlling more than one television raster scan display terminal, the combination comprising: a multiplexer, a plurality of keyboards coupled to said multiplexer for transmitting digitally coded data to a first means on a time multiplex basis, each of said keyboards being associated with a different one of the display terminals, a first means coupled to receive said digitally coded data from said multiplexer and for converting said digitally coded data into a plurality of groups of television video signals, and a second means coupled to said first means for transmitting said groups of television video signals to more than one display terminal.

9. A message exchange system for storage and display of digital data received from a plurality of sources preparatory to communicating with an external device, the combination comprising: a memory coupled to receive said digital data for storage, a first means coupled to said memory for receiving said digital data and for converting said digital data into television video signals, a second means for transmitting said television video signals to more than one display terminal, and a third means for transmitting from said memory to said external device said digital data and digital data representative of the data characters being displayed on one or more of said display terminals.

10. The combination as set forth in claim 9 wherein said third means comprises a multiplexer for transmitting from said memory to said external device signals representative of the data characters being displayed on said display terminals on a time multiplex basis.

11. A message exchange system for storage and display of digital data received from a plurality of sources preparatory to communicating with an external device, the combination comprising: an input register for receiving and translating data into a plurality of signals representing data characters received from a plurality of keyboards on a time multiplex basis, a memory coupled to receive from said input register and from said external device signals representative of said data characters, a first means coupled to said memory for receiving said signals and for converting said signals into television video signals, a second means for transmitting said television video signals to more than one display terminal, and a third means for transmitting from said memory to said external device signals representative of the data characters received from said keyboards and signals representative of the data being displayed on one or more of said display terminals.

12. A message exchange system for converting information in digital character form into video signals suitable for controlling a plurality of television raster scan display devices, the combination comprising: an input register for receiving and translating information into a plurality of signals representing data characters received from a plurality of stations on a time multiplex basis, a source of timing signals, a memory coupled to receive from said input register groups of signals representative of a set of data characters, means actuated by said timing signals for recycling said representative signals through said memory, a character generator coupled to cyclically receive from said memory signals representative of the signals recycling therethrough and timing signals from said source representative of raster lines of the display devices, said character generator encoding the signals received into video information signals, each of said video information signals being representative of a portion of a character to be displayed on said display devices, means coupled to said character generator for receiving said video information signals for cyclically combining said video information signals into television video signals, and means for transmitting said television video signals to each of said display devices.

13. The combination set forth in claim 12 wherein said means for transmitting said video information signals comprises a distributor for simultaneously applying said video information to each of said display devices.

14. The combination set forth in claim 12 wherein said latter means comprises video mixing and gating logic for transmitting on a time multiplex basis to a group of display terminals television video signals.

15. The mesage exchange system set forth in claim 12 in further combination with an interfacing means, and means for connecting said interfacing means to other sources of information and to said memory.

16. A message exchange system for converting information in digital character form into video signals suitable for controlling a plurality of television keyboard display devices, the combination comprising: an input register for receiving and translating information into a plurality of signals representing data characters received from a plurality of keyboard display devices on a time multiplex basis, a source of timing signals, a memory coupled to receive from said input register said signals and to store said signals from all of said keyboard display devices, means actuated by said timing signals for recycling said representative signals through said memory, a character generator coupled to cyclically receive from said memory signals representative of the signals recycling therethrough and timing signals from said source representative of raster lines of the display devices, said character generator encoding the signals received into video information signals, each of said video information signals being representative of a portion of a character to be displayed on said display devices, means coupled to said character generator for receiving said video information signals for cyclically combining said video information signals into television video signals, and means for transmitting said television video signals simultaneously to each of said display devices.

17. A combination for recording messages on a display member having properties of providing a visual display of such messages comprising: means for receiving sequences of signals in a coded form to represent a message, means responsive to the signals in the sequence for converting such signals into the information represented by such signals, means operatively coupled to the converting means for displaying the information in the message on a display member, memory means for storing signals representing a binary address identifying the location of a visual marking on a particular position on the display member, means operatively coupled to said memory means for converting the binary address into a displayable signal, said latter means comprising a comparator and a video distributor for generating and distributing said displayable signal, and means operatively coupled to said memory means for providing a positional change of the visual marking on the display member by modifying the binary address.

18. A combination for recording messages on a plurality of display members having properties of providing a visual display of such messages comprising: means for receiving sequences of signals in a coded form to represent a message, means responsive to the signals in the sequence for converting such signals into the information represented by such signals, means operatively coupled to the converting means for displaying the information in the message on display members, memory means for storing a group of signals representing a plurality of binary addresses identifying the locations of a plurality of visual markings as to particular positions on different display members, means operatively coupled to said memory means for converting said binary addresses into displayable signals, said latter means comprising a comparator and a video distributor for generating and distributing said displayable signals, and means operatively coupled to said memory means for providing a positional change of the visual marking to a new position on the display members by modifiying said binary addresses.

19. A combination for recording messages on a display member having properties of providing a visual display of such messages comprising: means for receiving sequences of signals in a coded form to represent a message, means responsive to the signals in the sequence for converting such signals into the information represented by such signals, means operatively coupled to the converting means for displaying the information in the message on a display member, memory means for storing signals representing binary address identifying the location of a visual marking as to a particular position on the display member wherein information is being received at each instant, means operatively coupled to said memory means for converting said binary address into a displayable signal, said latter means comprising a comparator and a video distributor for generating and distributing said displayable signal, and means operatively coupled to said memory means for providing an advance of the visual marking to the next position on the display member by adding to said binary address.

References Cited

UNITED STATES PATENTS

| | | | |
|---|---|---|---|
| 3,307,156 | 2/1967 | Durr | 340—172.5 |
| 3,388,391 | 6/1968 | Clark | 340—324 |
| 3,396,377 | 8/1968 | Strout | 340—324 |

RAULFE B. ZACHE, Primary Examiner

U.S. Cl. X.R.

340—324